(12) United States Patent
Hatakeyama

(10) Patent No.: US 8,804,243 B2
(45) Date of Patent: Aug. 12, 2014

(54) ZOOM LENS AND IMAGING APPARATUS

(75) Inventor: Takeshi Hatakeyama, Chiba (JP)

(73) Assignee: Sony Corporation, Tokyo (JP)

( * ) Notice: Subject to any disclaimer, the term of this patent is extended or adjusted under 35 U.S.C. 154(b) by 200 days.

(21) Appl. No.: 13/137,769

(22) Filed: Sep. 12, 2011

(65) Prior Publication Data

US 2012/0099202 A1 Apr. 26, 2012

(30) Foreign Application Priority Data

Oct. 21, 2010 (JP) .................................. 2010-236619

(51) Int. Cl.
*G02B 27/64* (2006.01)
*G02B 15/14* (2006.01)
*G02B 15/00* (2006.01)

(52) U.S. Cl.
CPC .............. *G02B 27/646* (2013.01); *G02B 27/64* (2013.01); *G02B 15/14* (2013.01); *G02B 15/00* (2013.01)
USPC ............................ 359/557; 359/554; 359/676

(58) Field of Classification Search
CPC ........ G02B 15/00; G02B 15/14; G02B 27/64; G02B 27/646; G03B 2205/0007
USPC .................. 359/554–557, 676–692
See application file for complete search history.

(56) References Cited

U.S. PATENT DOCUMENTS

| | | | | |
|---|---|---|---|---|
| 6,002,519 | A * | 12/1999 | Hayashi et al. | 359/557 |
| 7,336,429 | B2 * | 2/2008 | Shibayama | 359/690 |
| 7,525,729 | B2 * | 4/2009 | Suzaki et al. | 359/557 |
| 2011/0149119 | A1 * | 6/2011 | Matsui | 348/240.3 |

FOREIGN PATENT DOCUMENTS

| | | | | |
|---|---|---|---|---|
| EP | 1 870 757 A1 * | 12/2007 | | 359/557 |
| JP | 07-128619 A | 5/1995 | | |
| JP | 07-199124 | 8/1995 | | |
| JP | 2006-276475 | 10/2006 | | |
| JP | 2006-330341 | 12/2006 | | |
| JP | 2008-134334 | 6/2008 | | |

* cited by examiner

*Primary Examiner* — Thong Nguyen

(74) *Attorney, Agent, or Firm* — Rader, Fishman & Grauer PLLC

(57) ABSTRACT

Provided is a zoom lens that has a plurality of lens groups and performs zooming by changing spaces between the plurality of lens groups. A final lens group closest to an image side includes, in order from an object side to an image side: a first partial lens group that has a negative refractive power; a second partial lens group that has a positive refractive power; and a third partial lens group that has a positive refractive power. Image blur is corrected by shifting the second partial lens group in a direction substantially perpendicular to an optical axis. Assuming that a focal length of the first partial lens group is fGF, a focal length of the second partial lens group is fGS, and a focal length of a whole lens system of the lens groups in a telephoto end state is ft, the following expressions are satisfied: −0.24<fGF/ft<−0.09; and 0.12<fGS/ft<0.32.

7 Claims, 61 Drawing Sheets

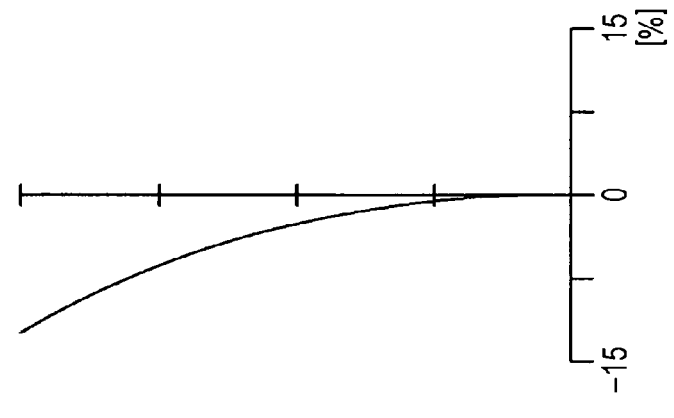

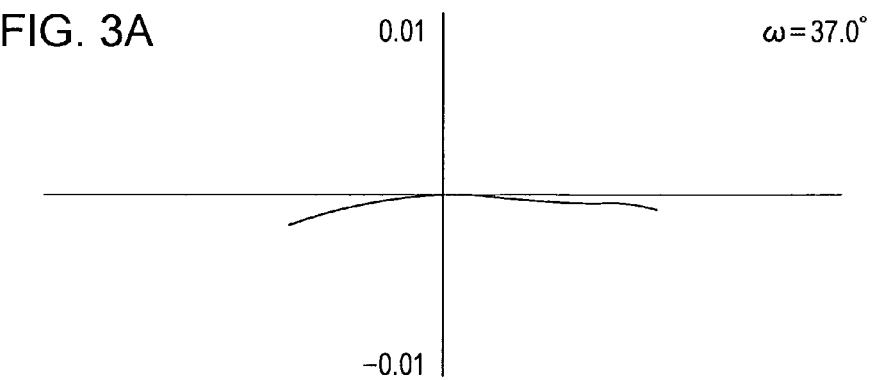
FIG. 3A  ω=37.0°
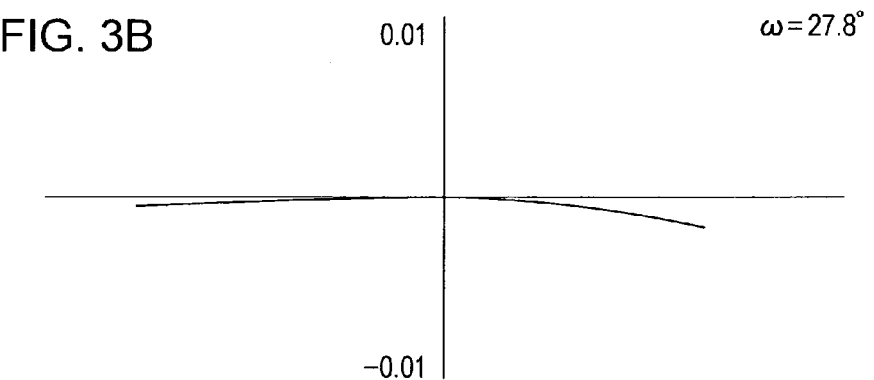
FIG. 3B  ω=27.8°
FIG. 3C  ω=0°

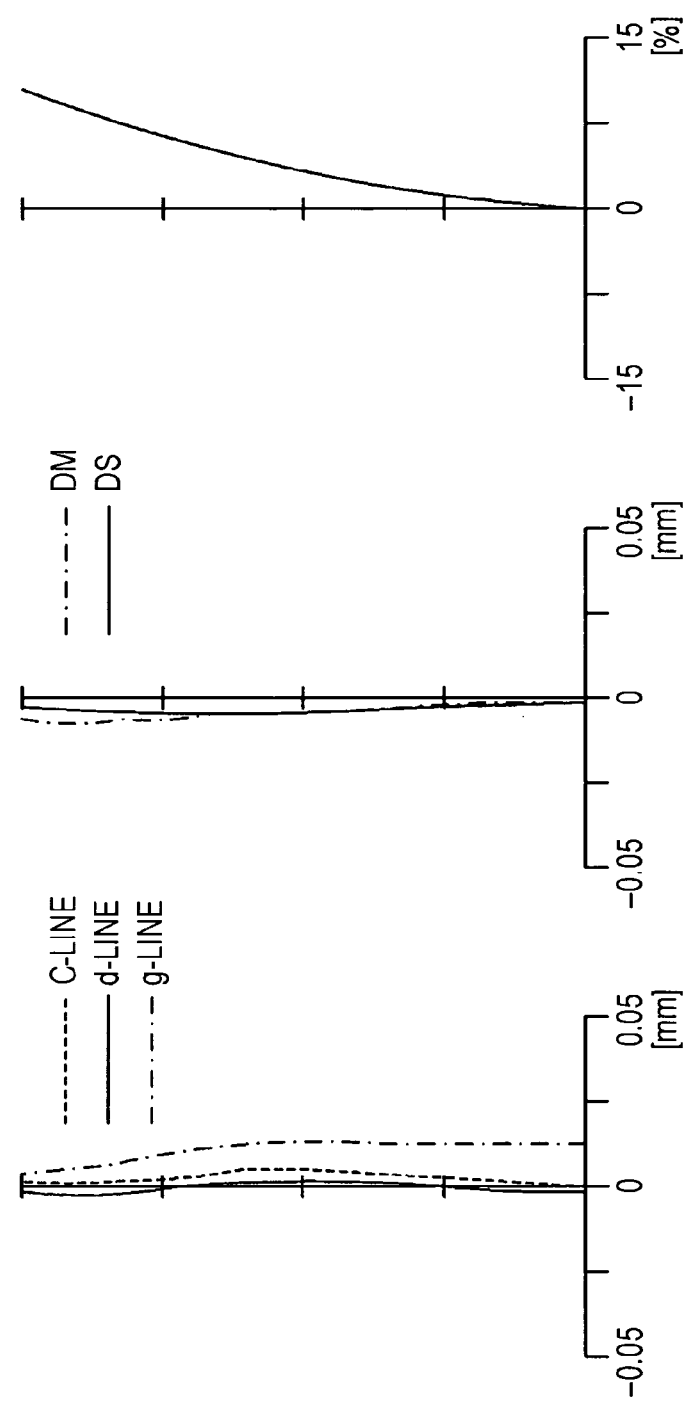

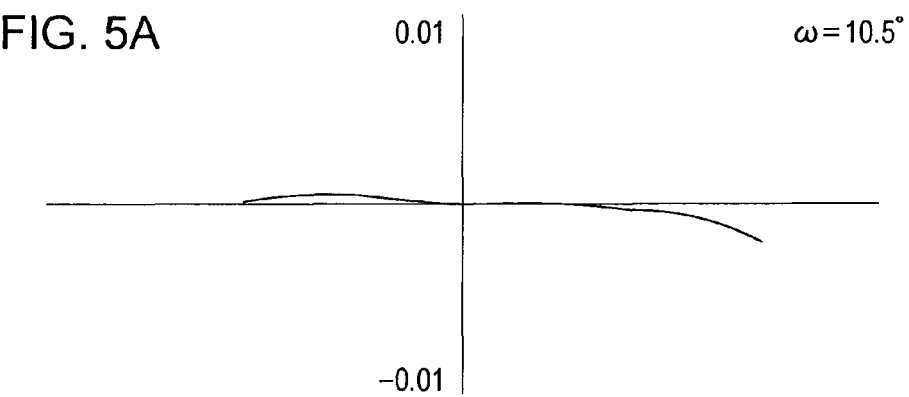
FIG. 5A    0.01    ω=10.5°
−0.01
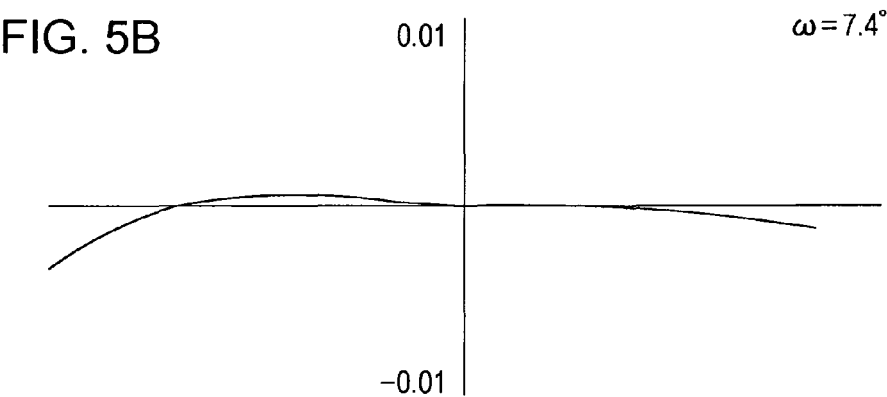
FIG. 5B    0.01    ω=7.4°
−0.01
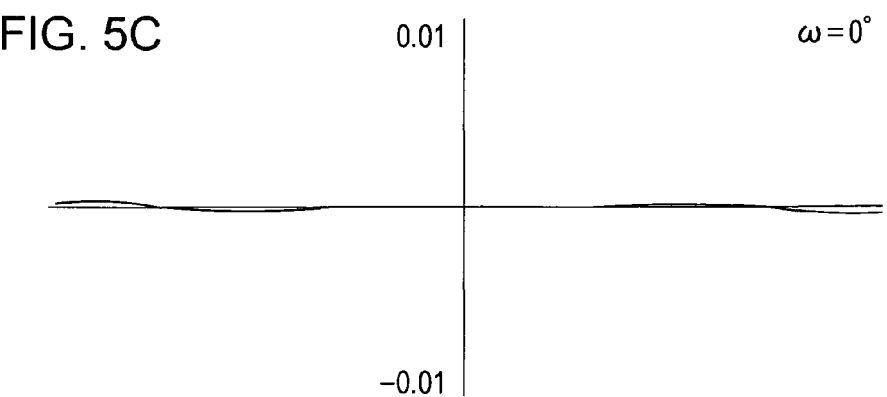
FIG. 5C    0.01    ω=0°
−0.01

DISTORTION
ω=3.0°

ASTIGMATISM
ω=3.0°

SPHERICAL ABERRATION
Fno=3.48

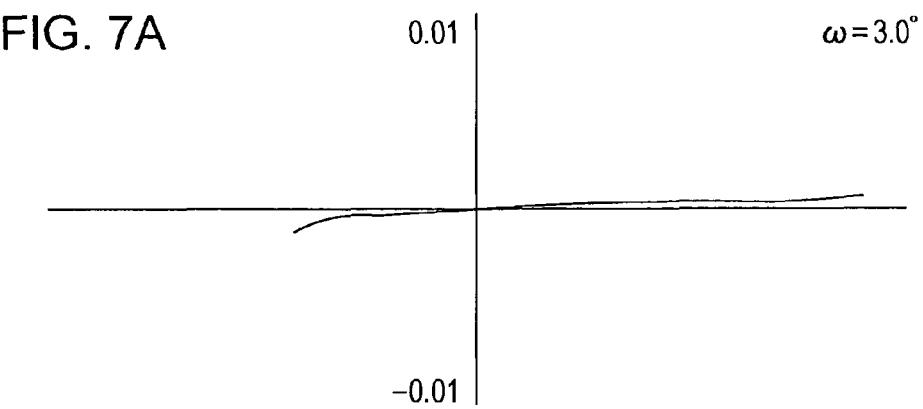
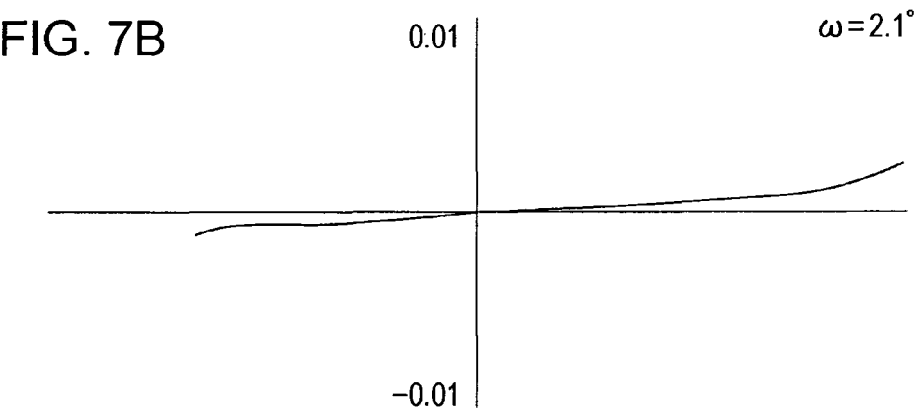
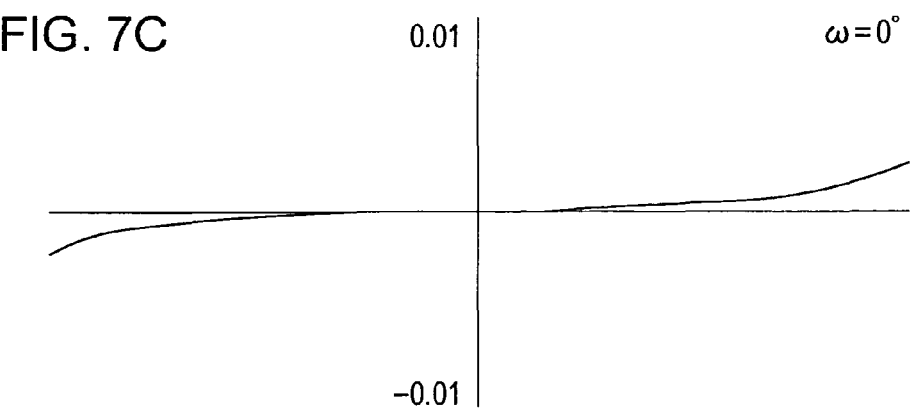

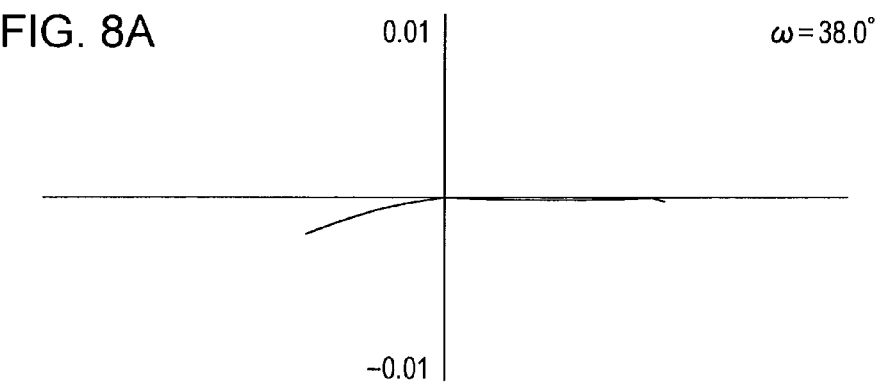
FIG. 8A    0.01    ω=38.0°
−0.01
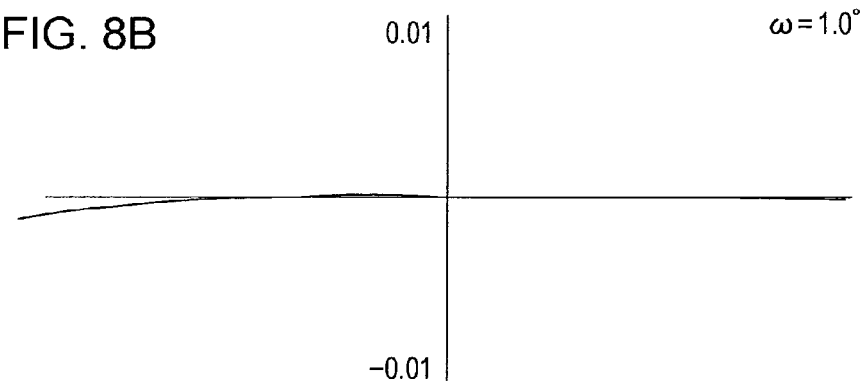
FIG. 8B    0.01    ω=1.0°
−0.01
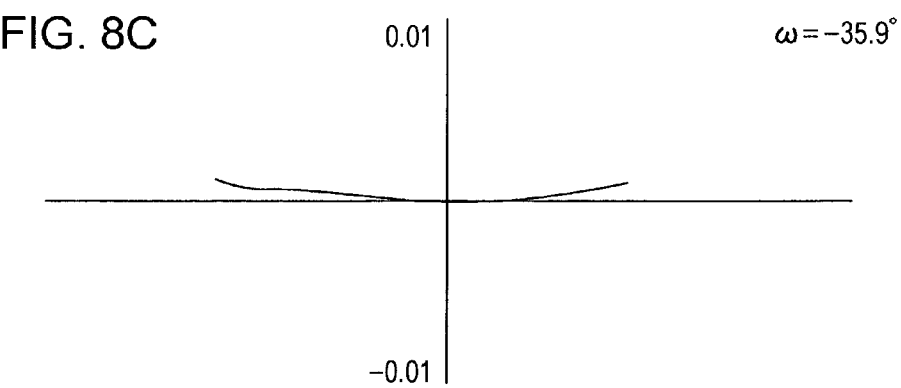
FIG. 8C    0.01    ω=−35.9°
−0.01

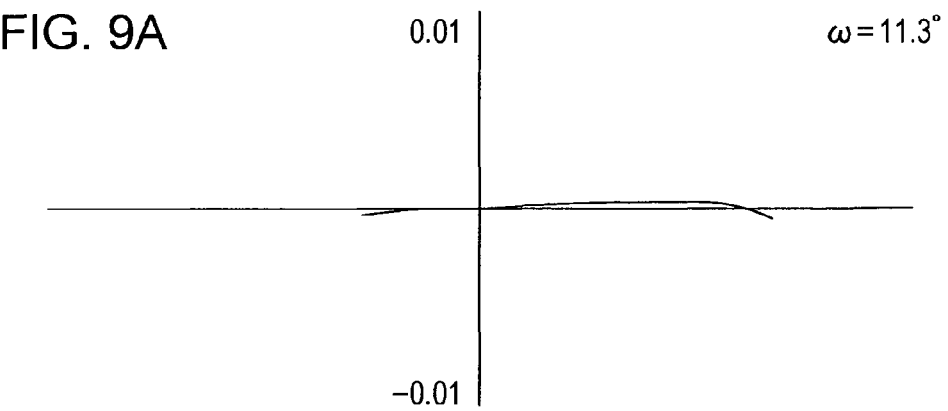
FIG. 9A  0.01  ω=11.3°
       -0.01
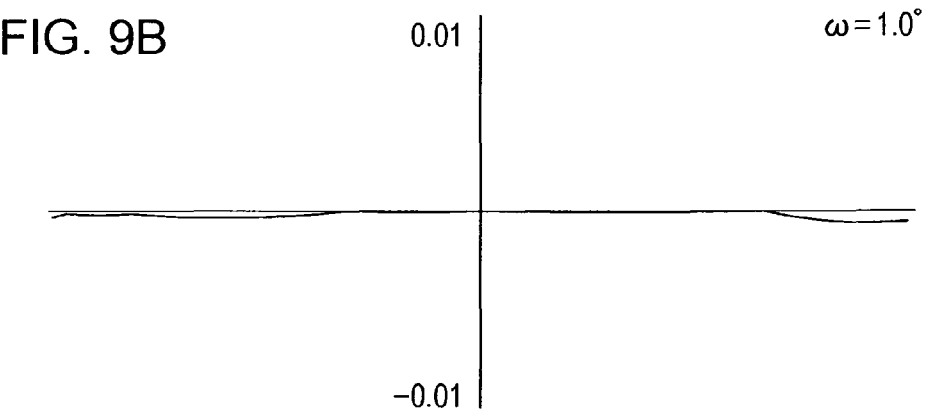
FIG. 9B  0.01  ω=1.0°
       -0.01
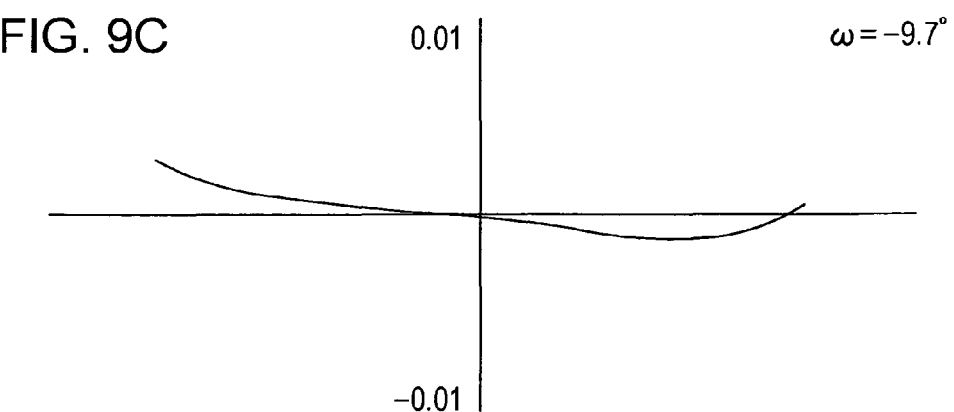
FIG. 9C  0.01  ω=-9.7°
       -0.01

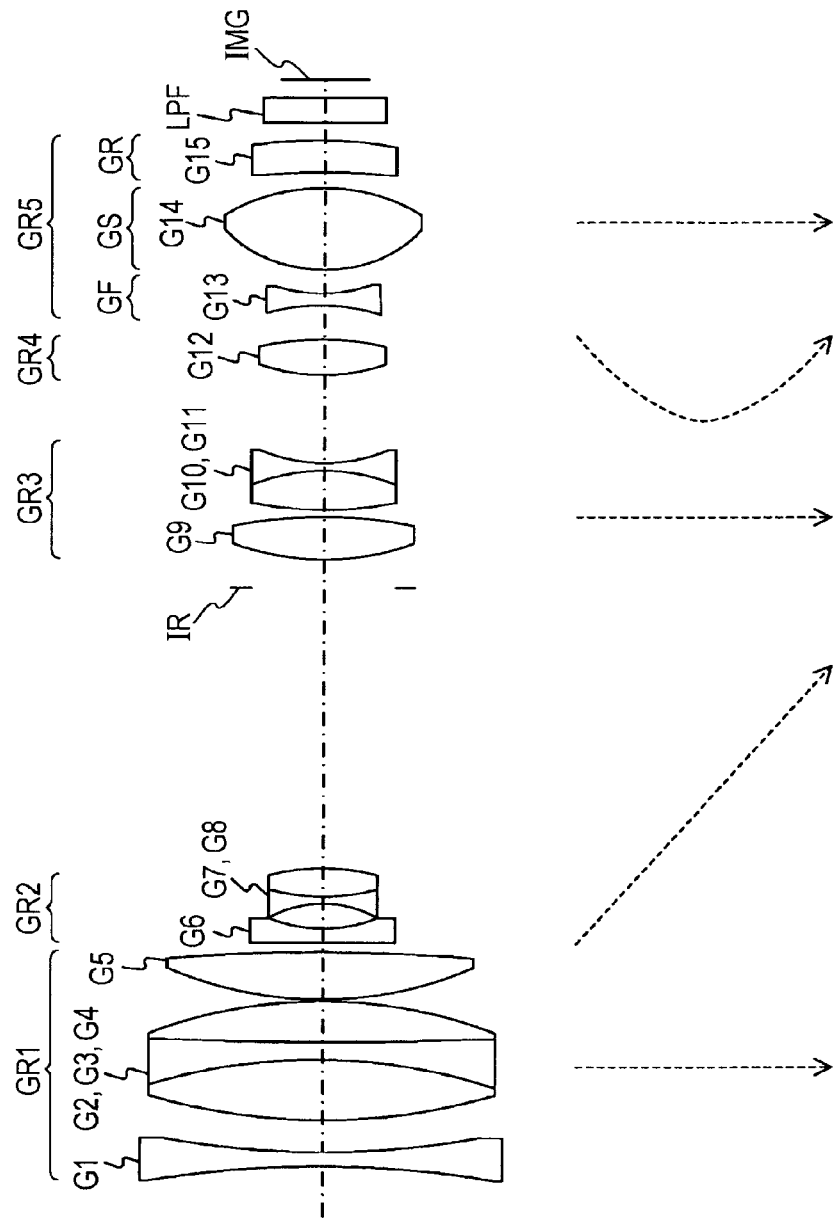

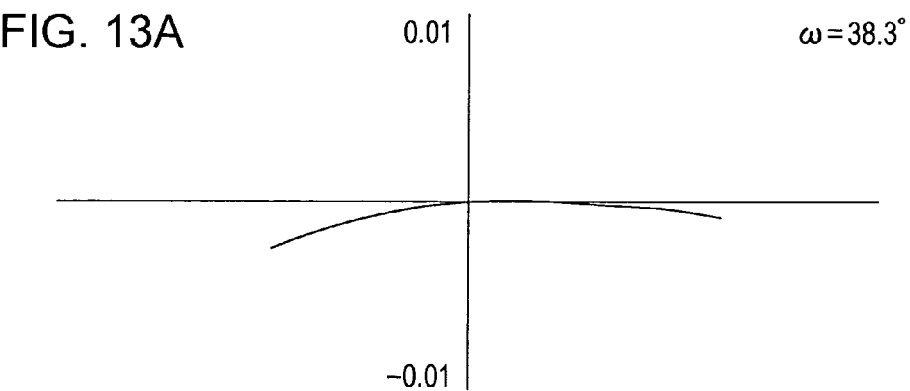
FIG. 13A  ω=38.3°
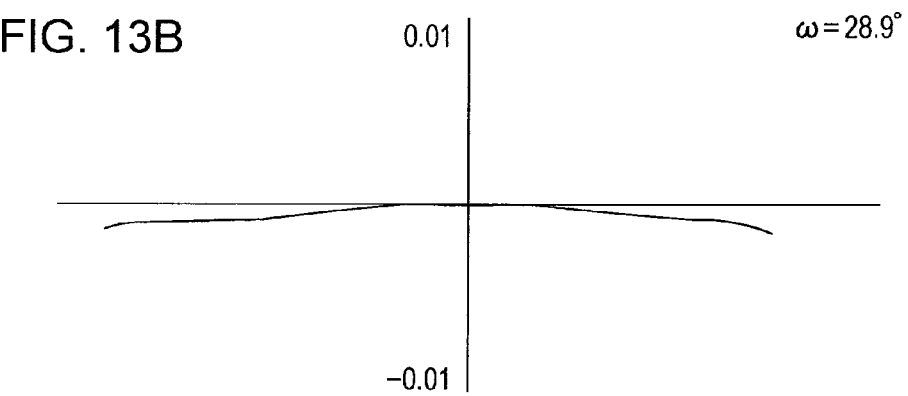
FIG. 13B  ω=28.9°
FIG. 13C  ω=0°

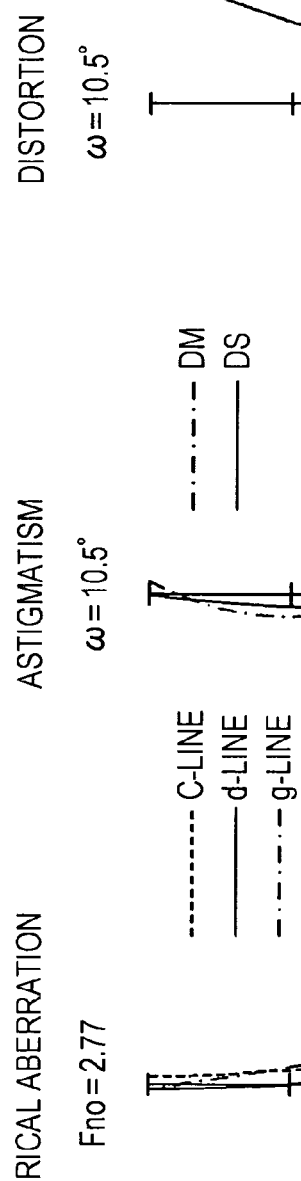
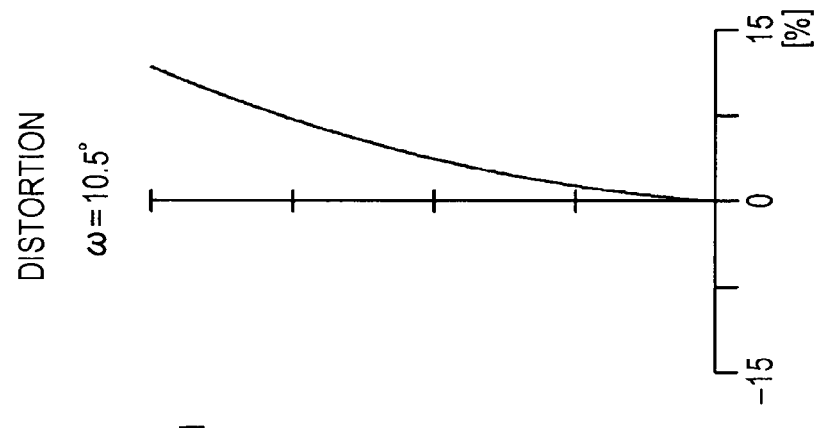

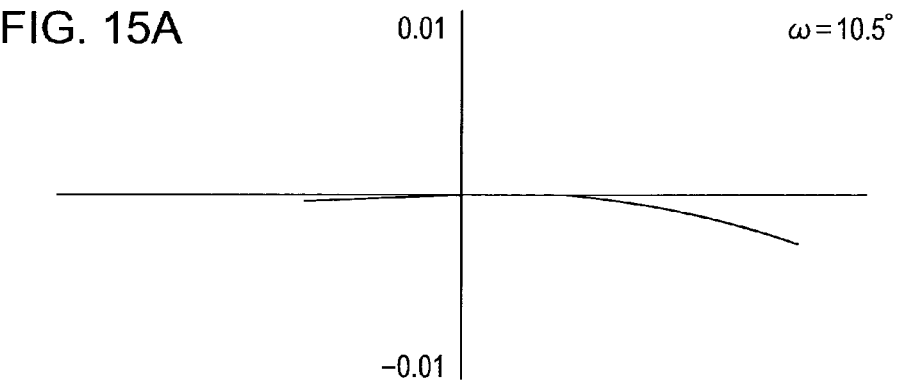
FIG. 15A  0.01  ω=10.5°
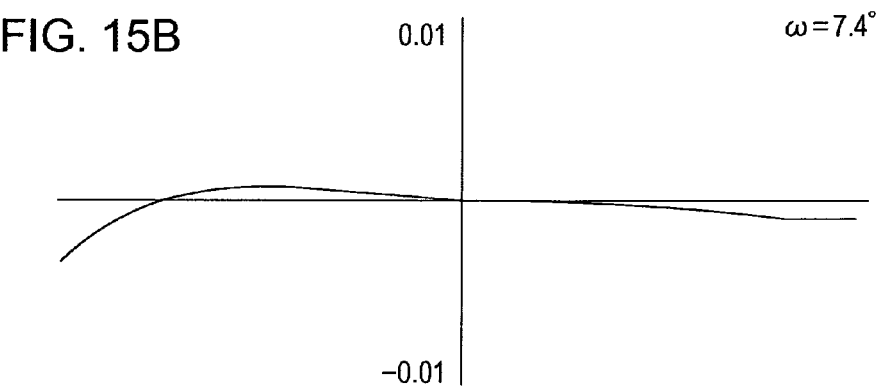
FIG. 15B  0.01  ω=7.4°
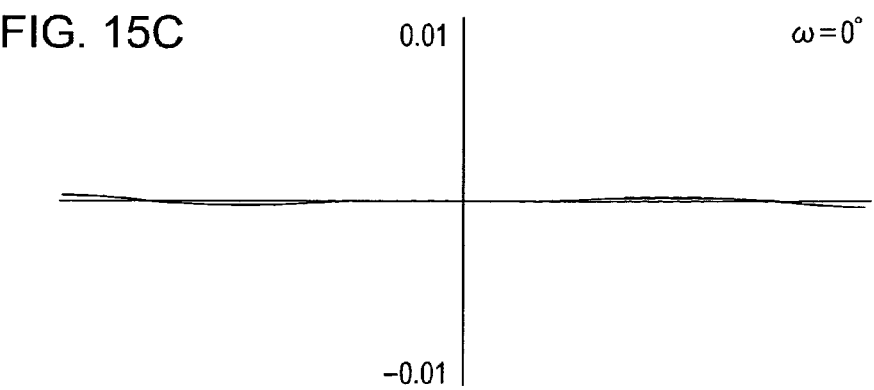
FIG. 15C  0.01  ω=0°

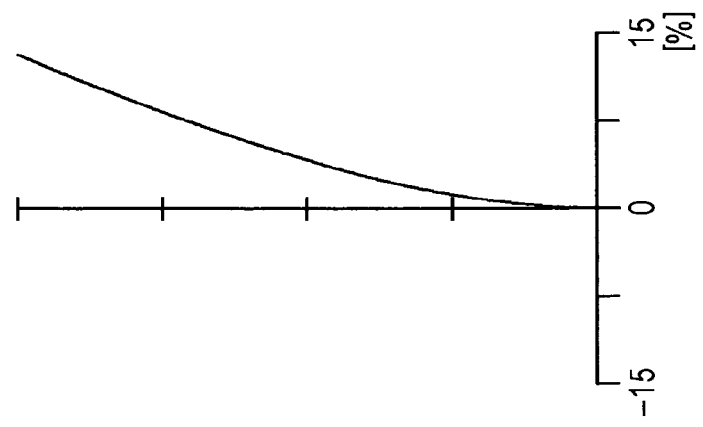
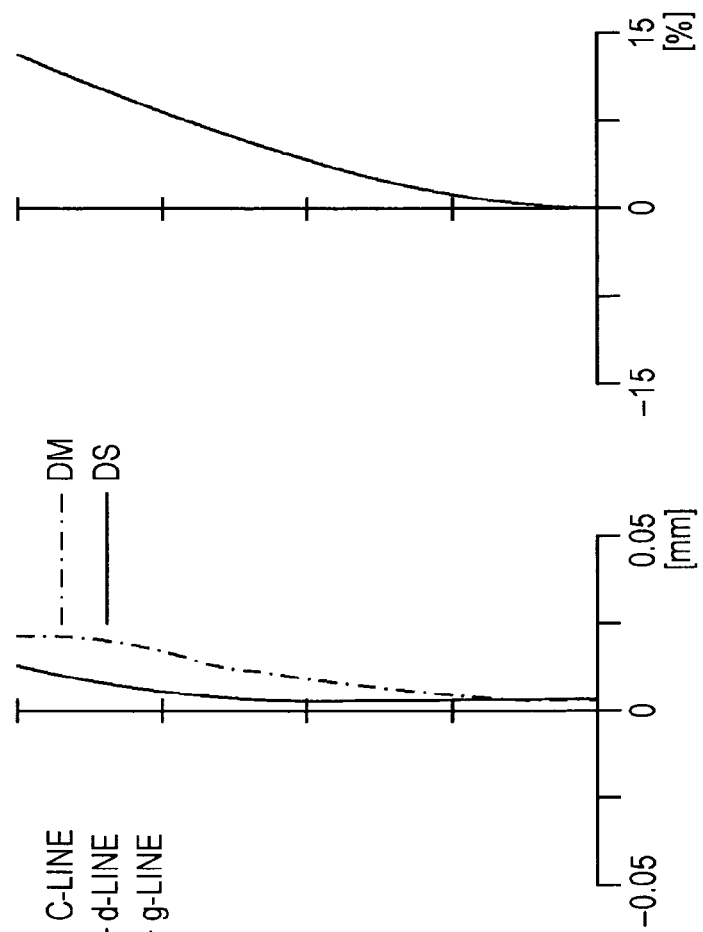
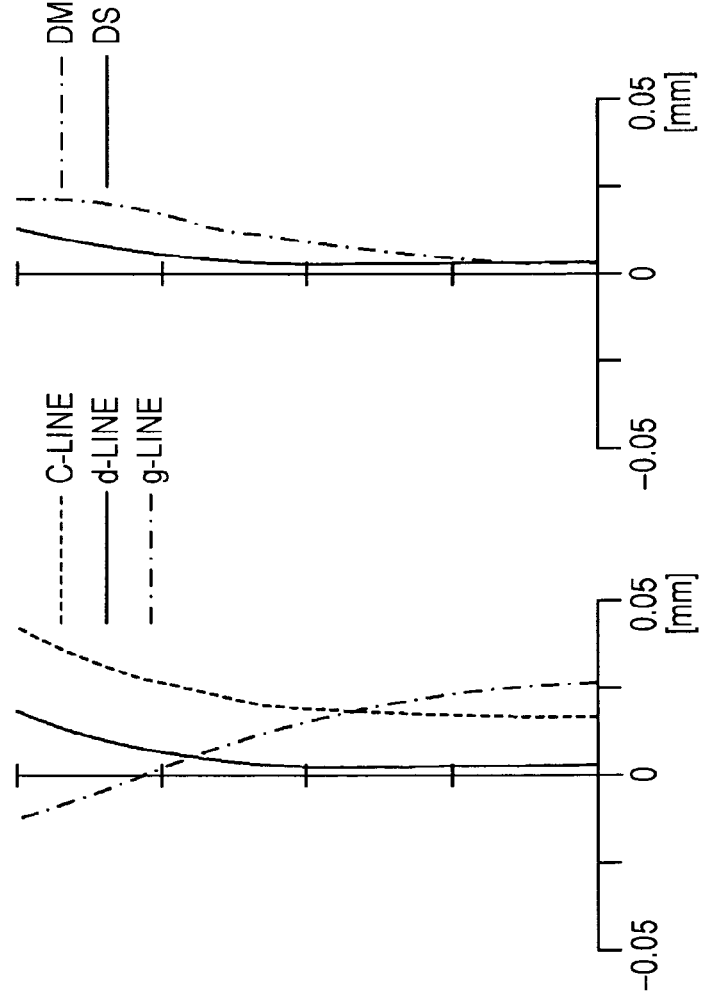

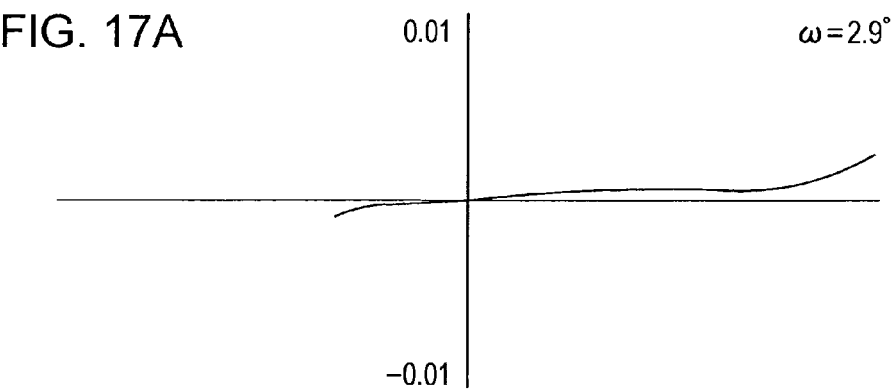
FIG. 17A  ω=2.9°
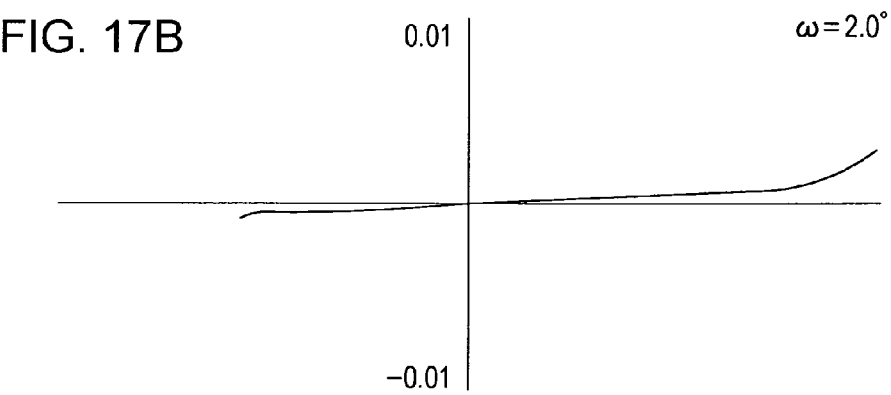
FIG. 17B  ω=2.0°
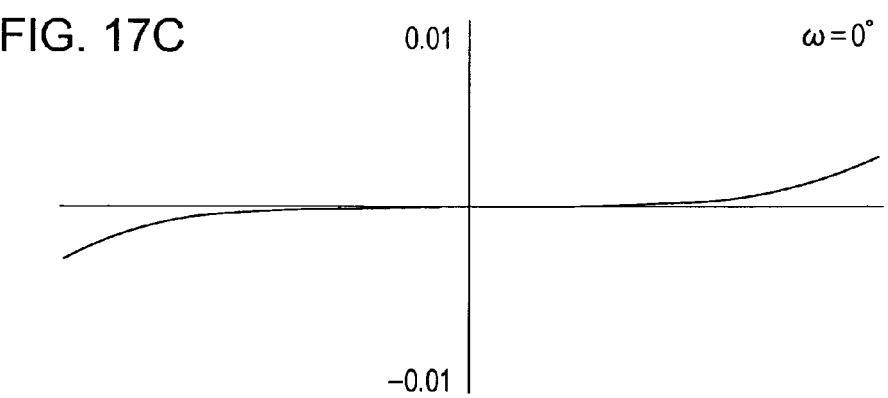
FIG. 17C  ω=0°

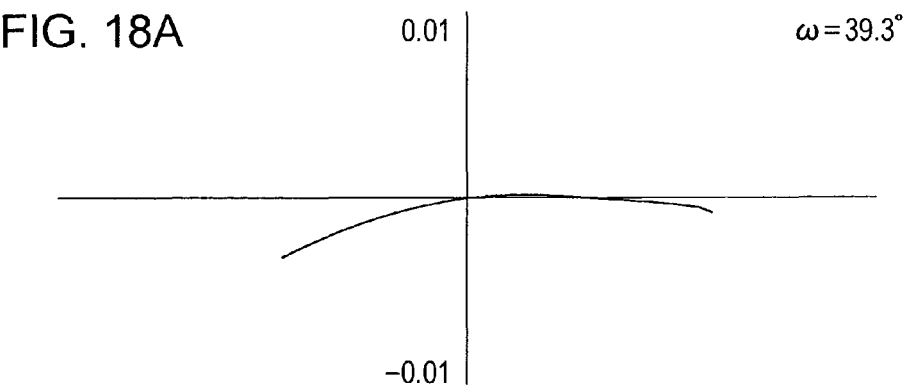
FIG. 18A  0.01  ω=39.3°
−0.01
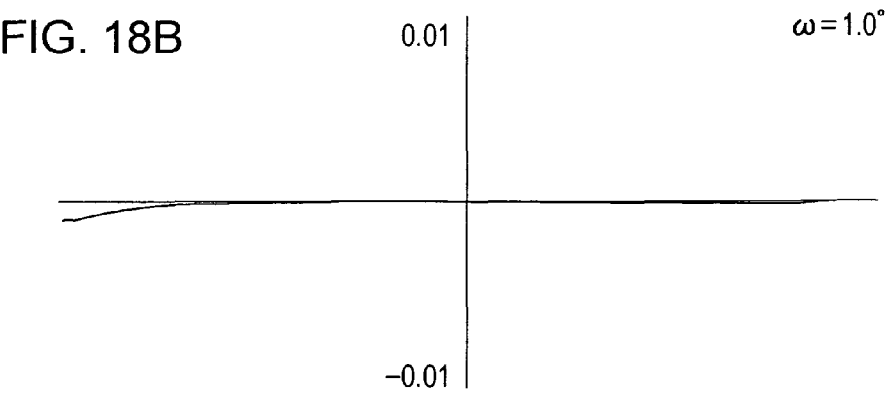
FIG. 18B  0.01  ω=1.0°
−0.01
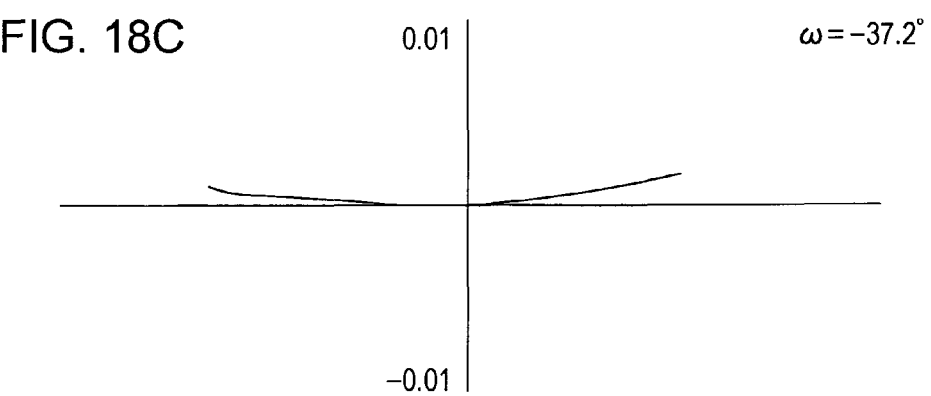
FIG. 18C  0.01  ω=−37.2°
−0.01

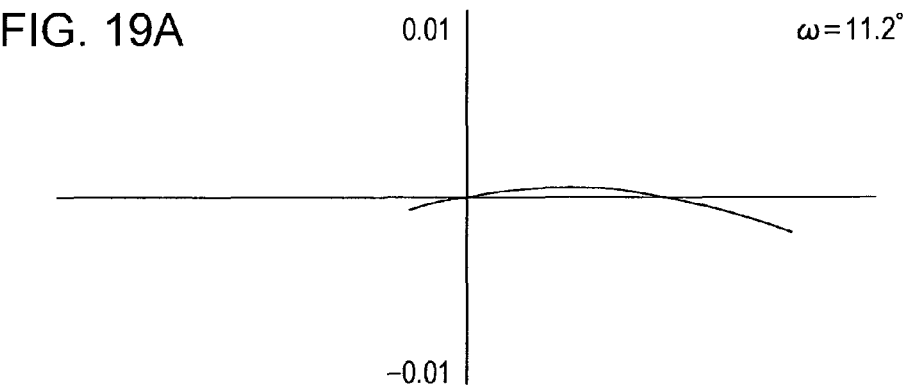
FIG. 19A  ω=11.2°
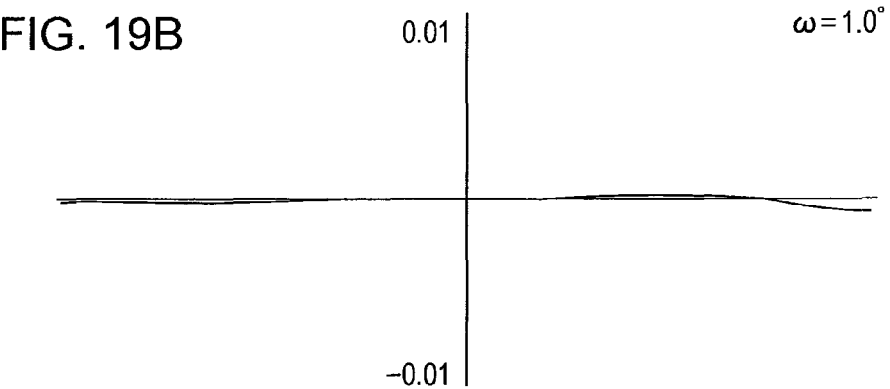
FIG. 19B  ω=1.0°
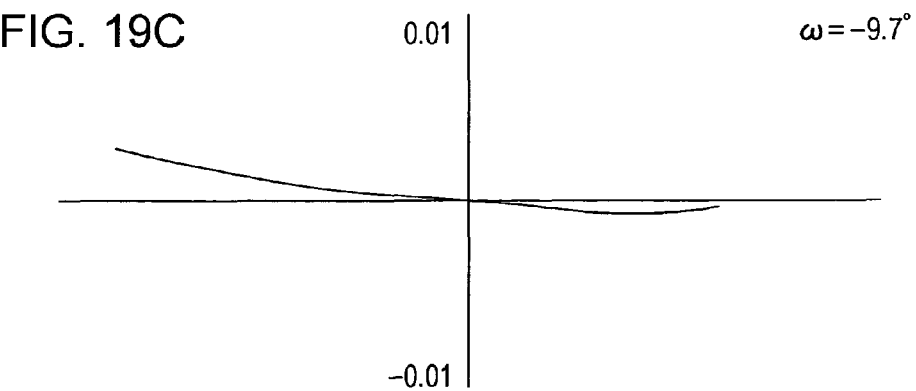
FIG. 19C  ω=-9.7°

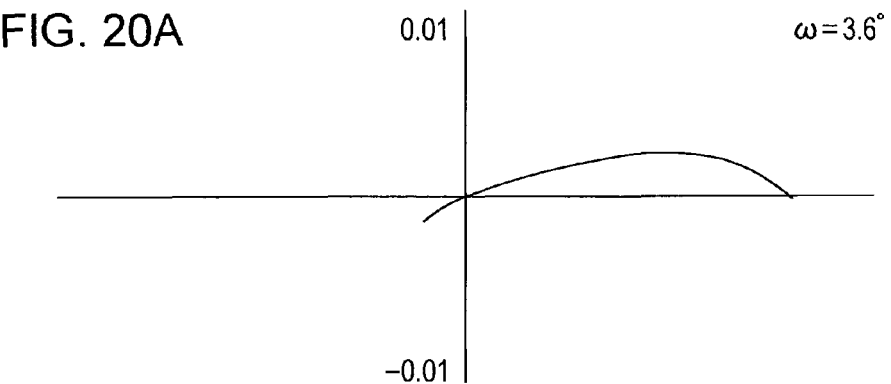
FIG. 20A  ω=3.6°
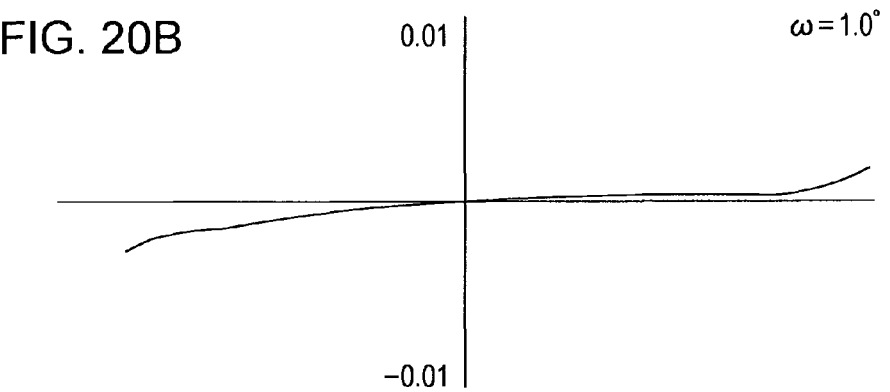
FIG. 20B  ω=1.0°
FIG. 20C  ω=−2.0°

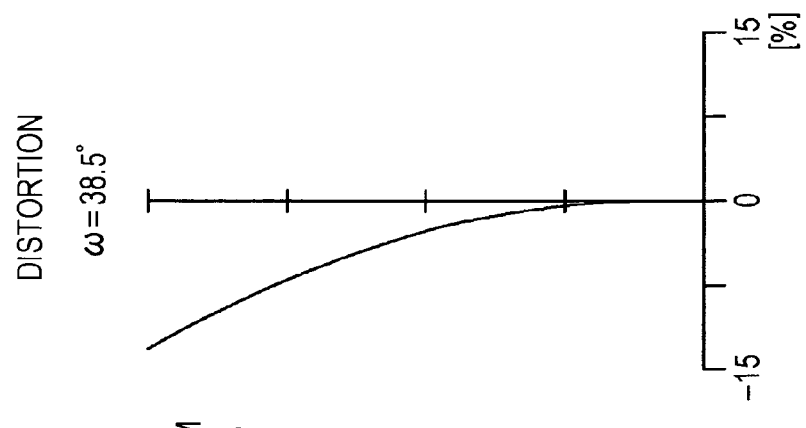
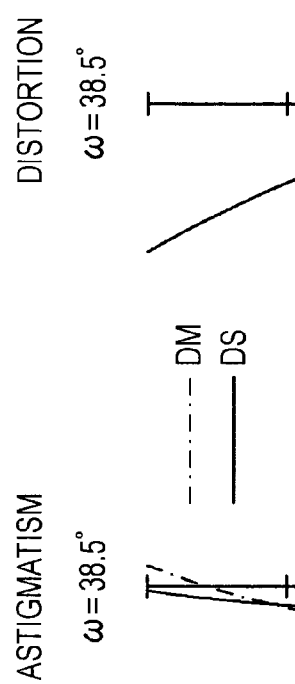

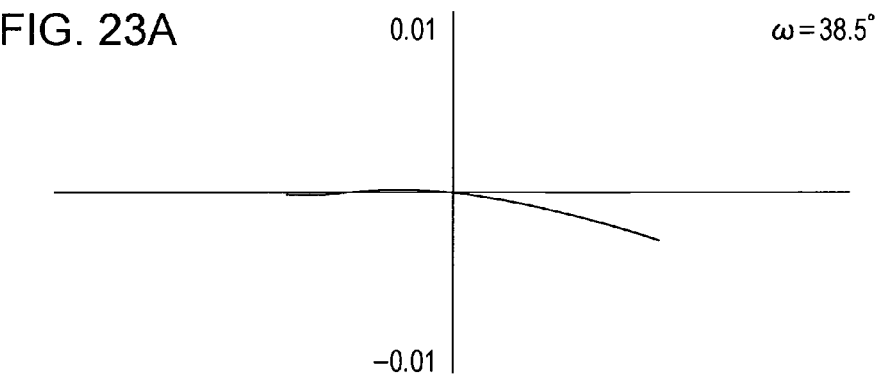
FIG. 23A  ω=38.5°
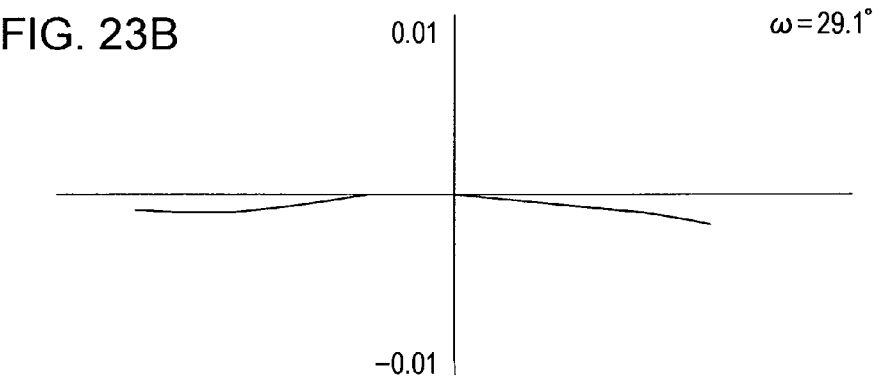
FIG. 23B  ω=29.1°
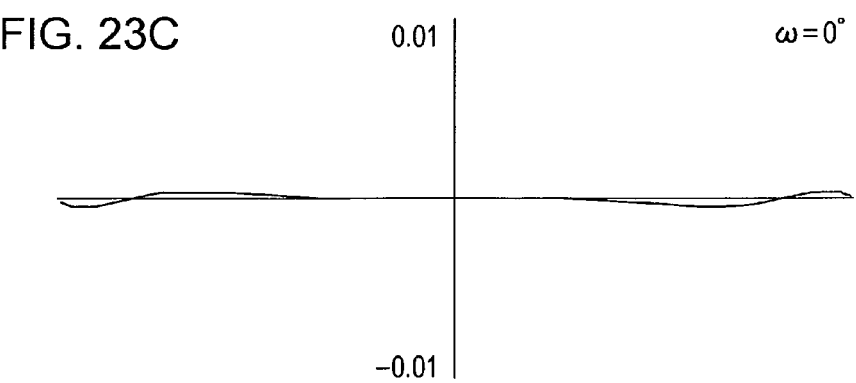
FIG. 23C  ω=0°

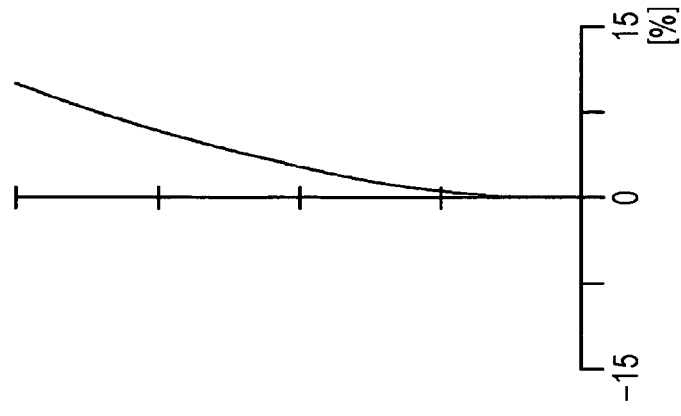
FIG. 24A SPHERICAL ABERRATION
FIG. 24B ASTIGMATISM
FIG. 24C DISTORTION FIG. 28A  0.01  ω=39.6°
−0.01
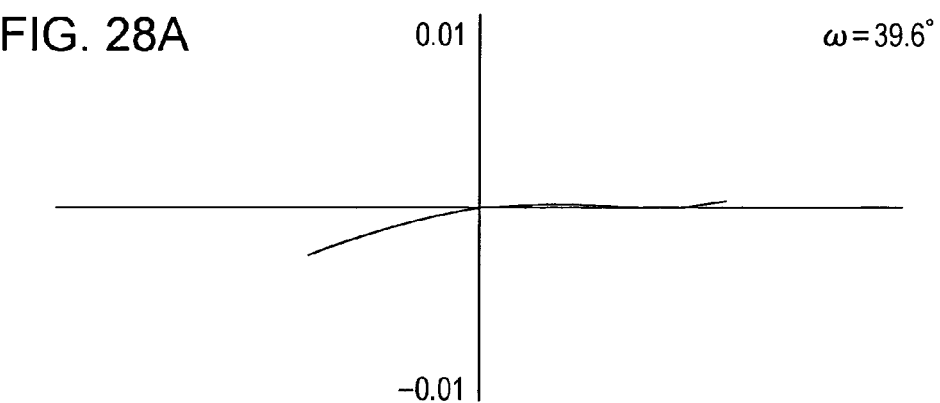
FIG. 28B  0.01  ω=1.0°
−0.01
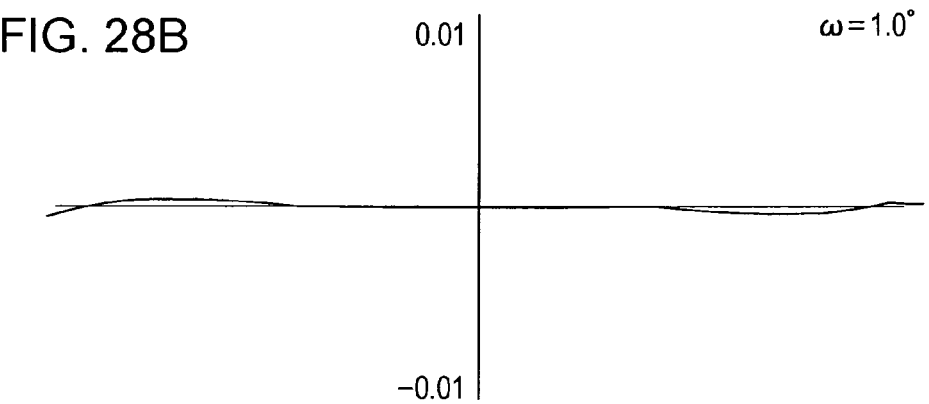
FIG. 28C  0.01  ω=−37.4°
−0.01
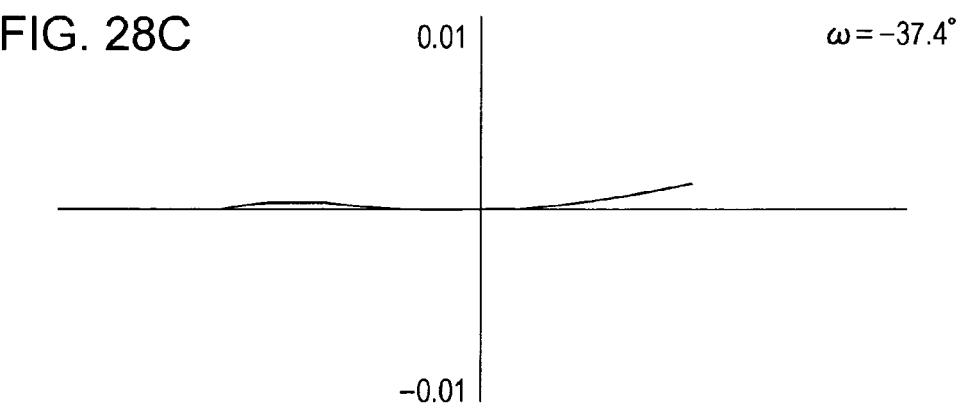

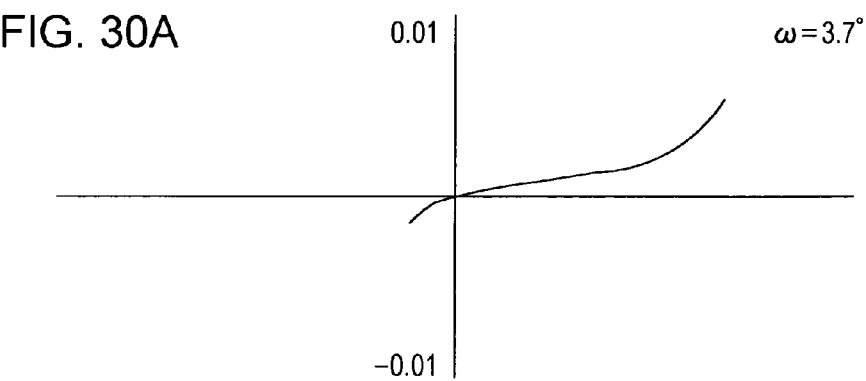
FIG. 30A  ω=3.7°
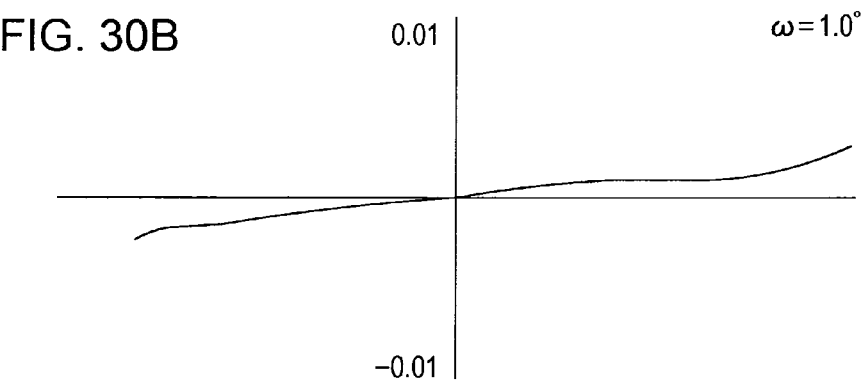
FIG. 30B  ω=1.0°
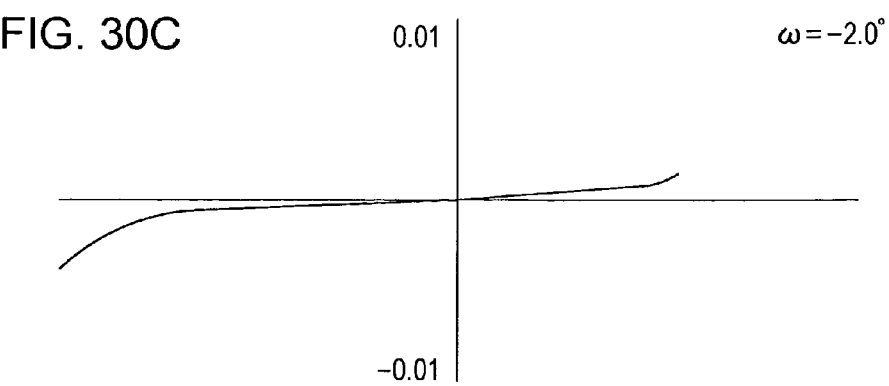
FIG. 30C  ω=−2.0°

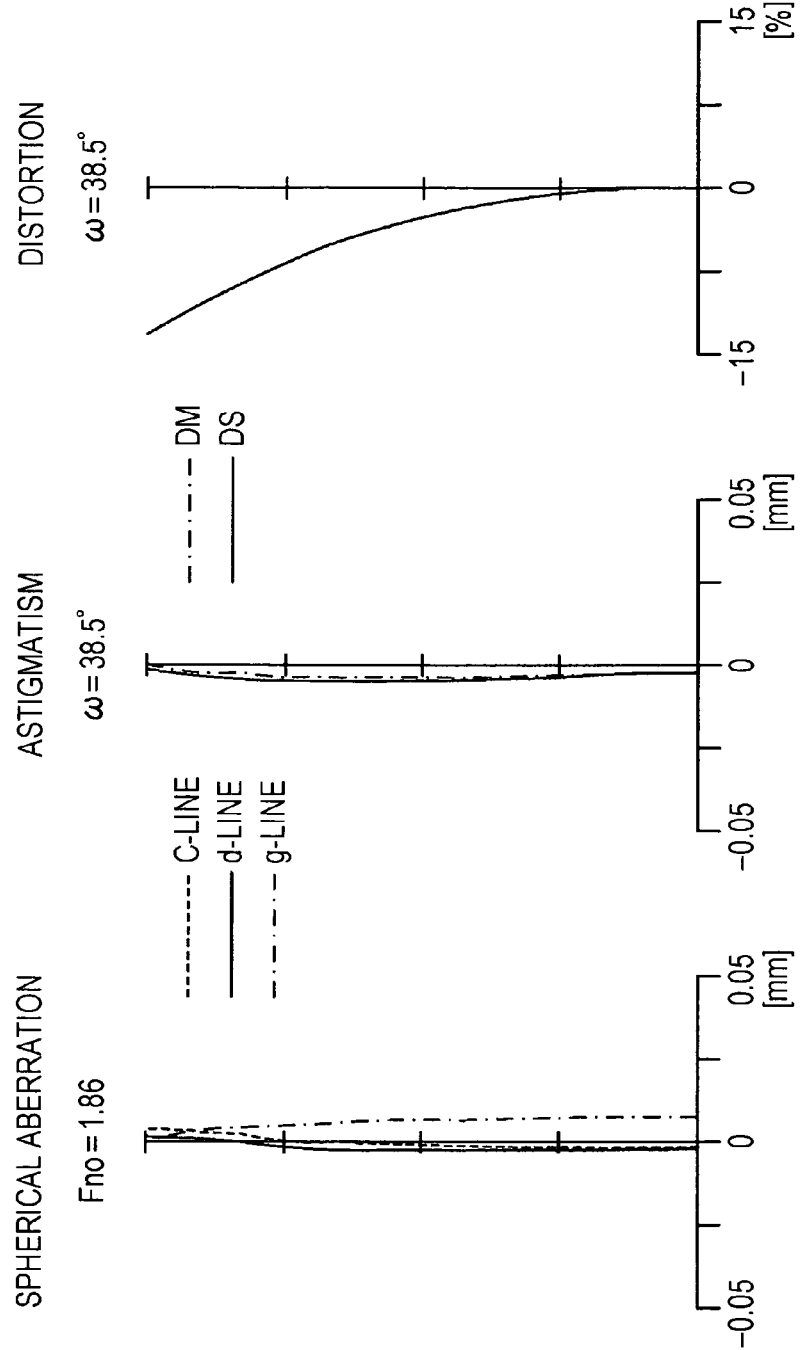

FIG. 33A   0.01   ω=38.5°
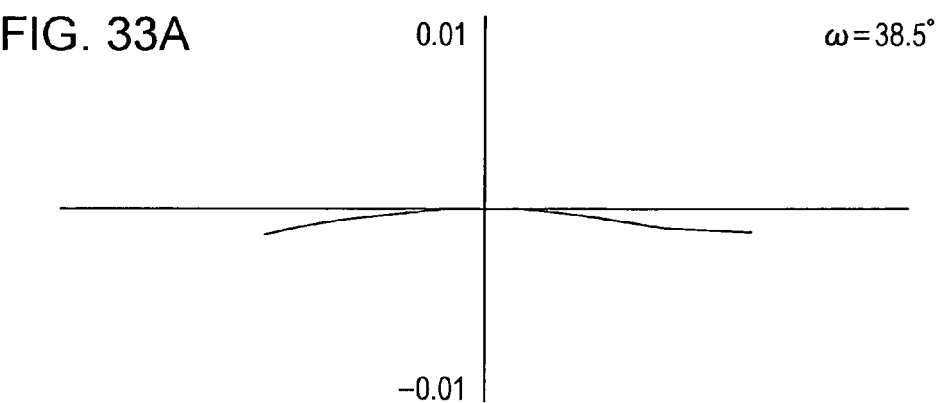
−0.01
FIG. 33B   0.01   ω=29.1°
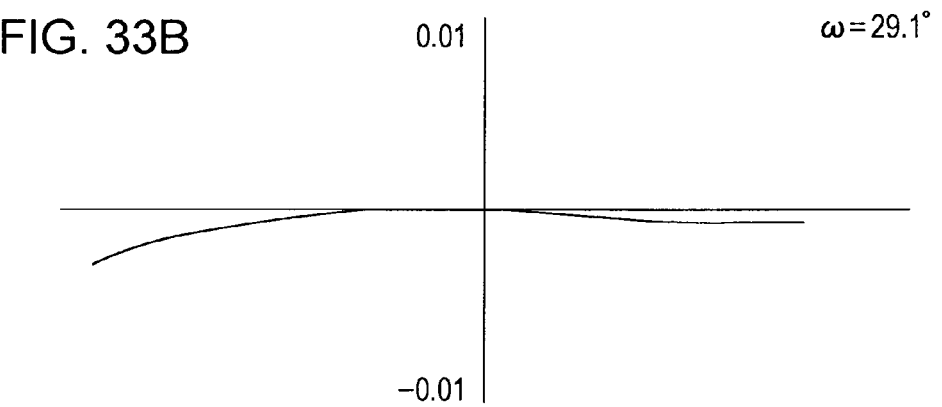
−0.01
FIG. 33C   0.01   ω=0°
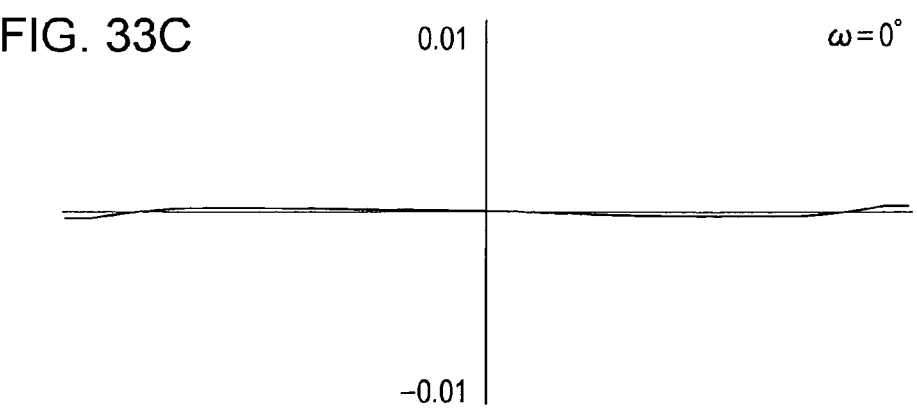
−0.01

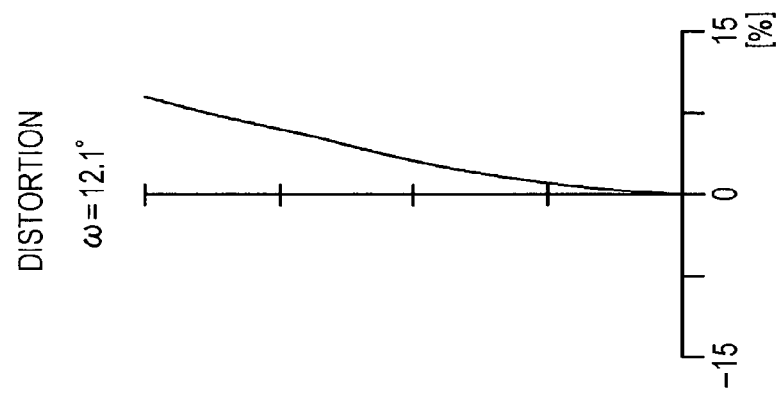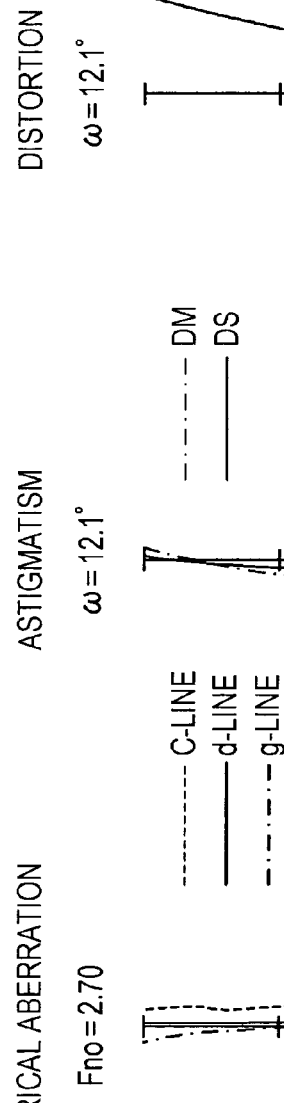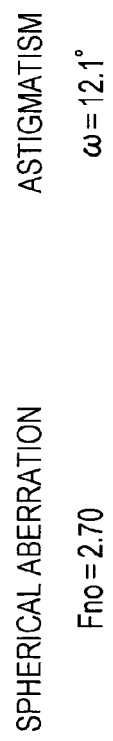

FIG. 35A  ω=12.1°
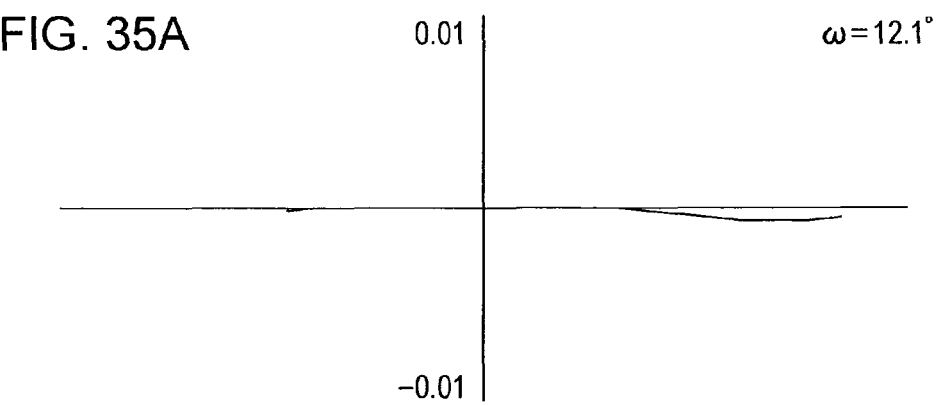
FIG. 35B  ω=8.5°
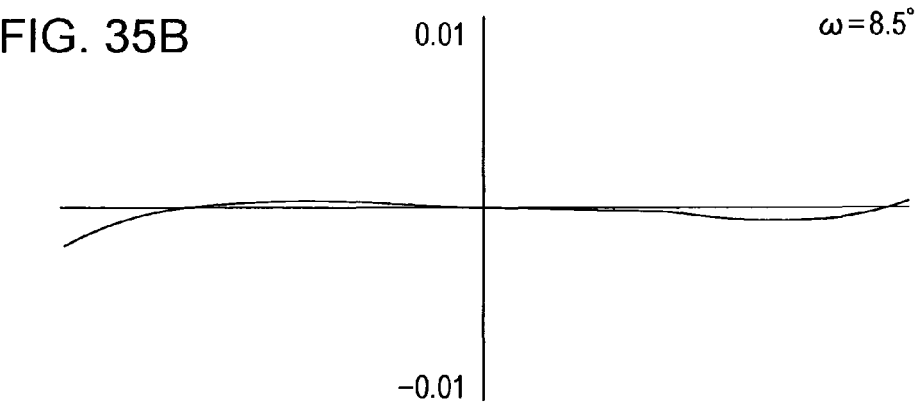
FIG. 35C  ω=0°
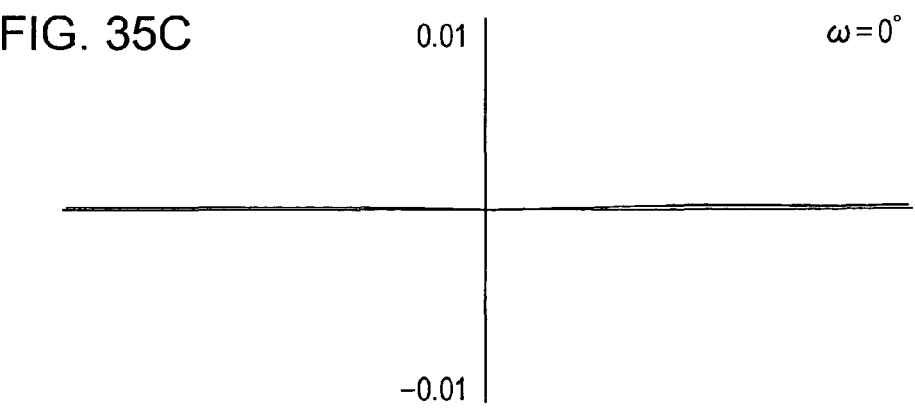

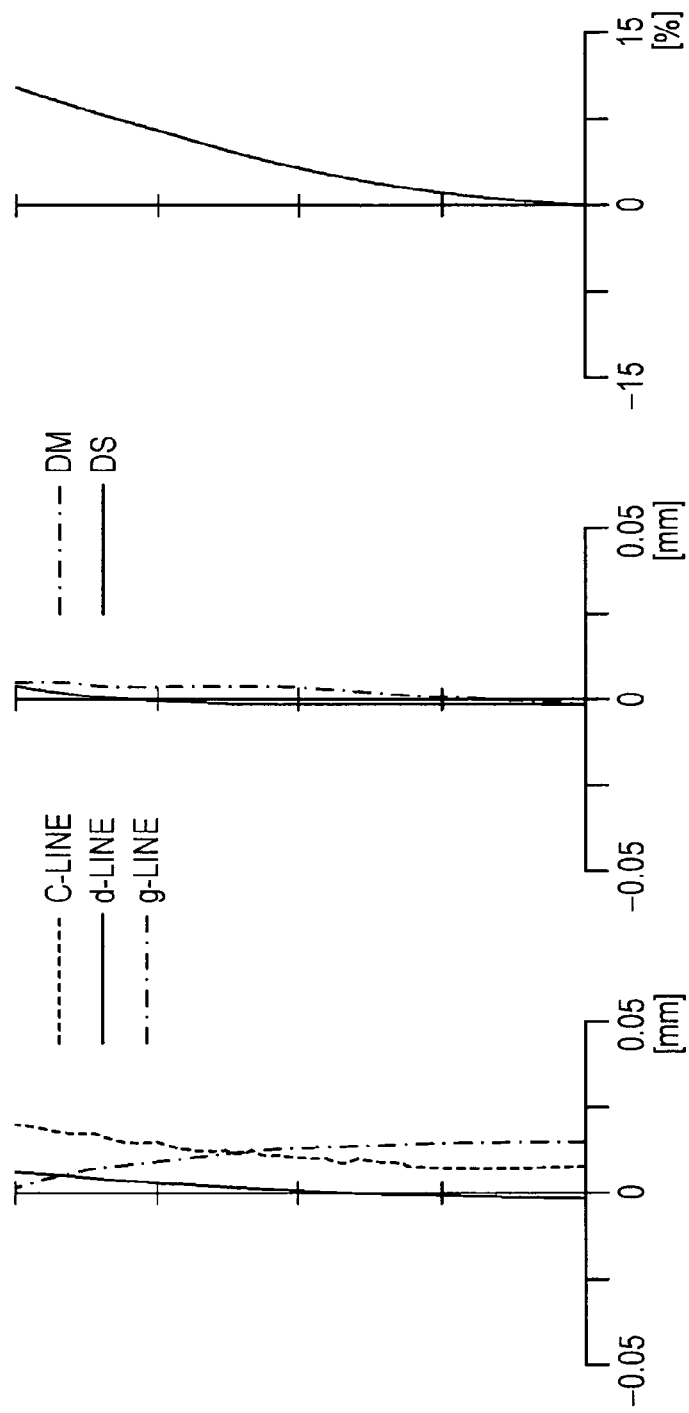
FIG. 36A SPHERICAL ABERRATION Fno=3.52
FIG. 36B ASTIGMATISM ω=3.8°
FIG. 36C DISTORTION ω=3.8°

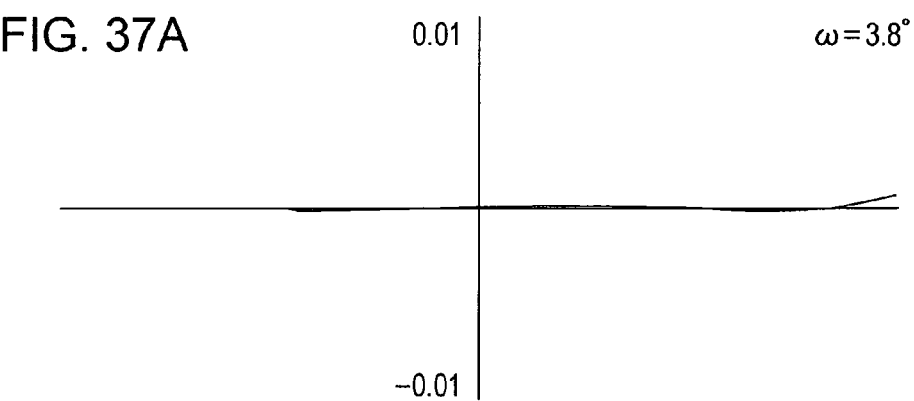
FIG. 37A    ω=3.8°
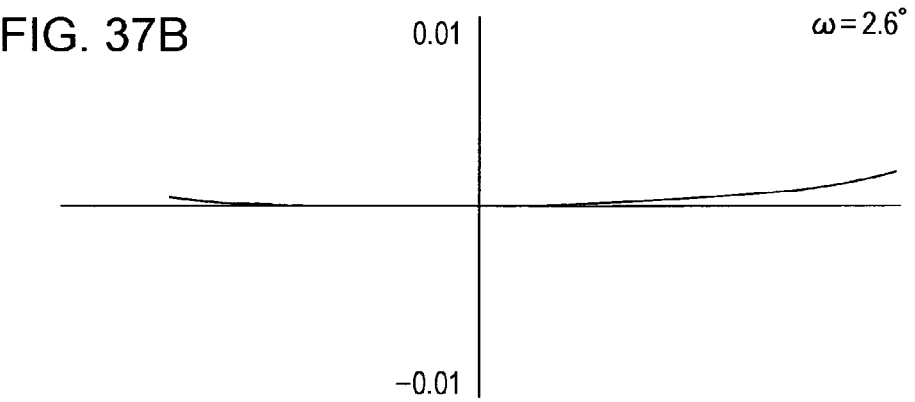
FIG. 37B    ω=2.6°
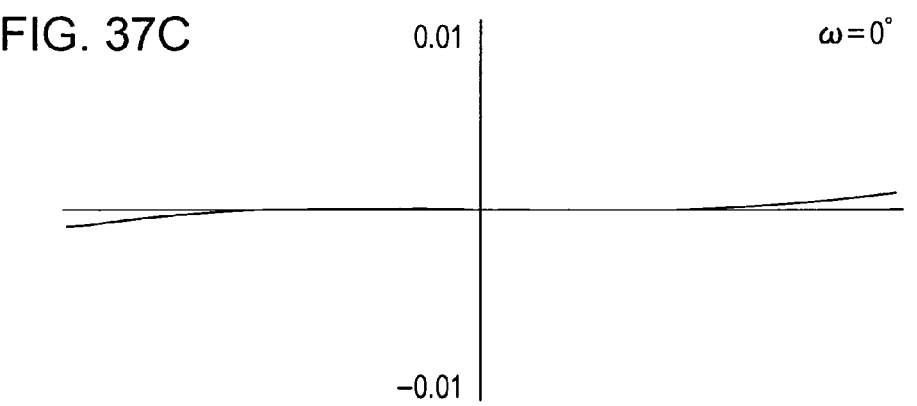
FIG. 37C    ω=0°

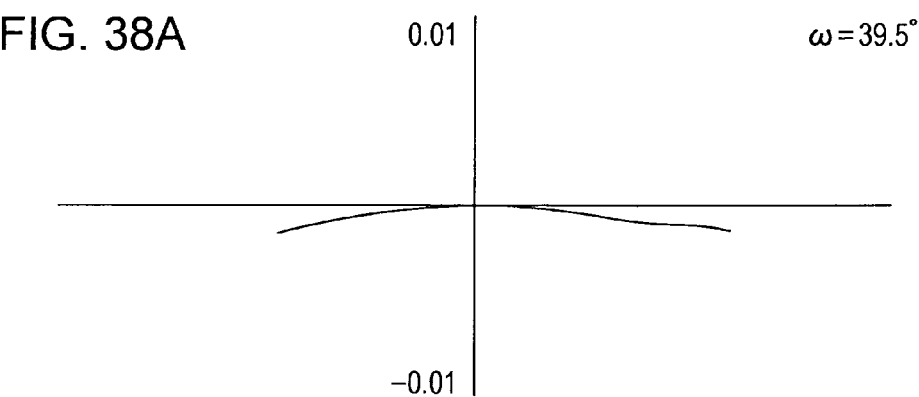
FIG. 38A   0.01   ω=39.5°
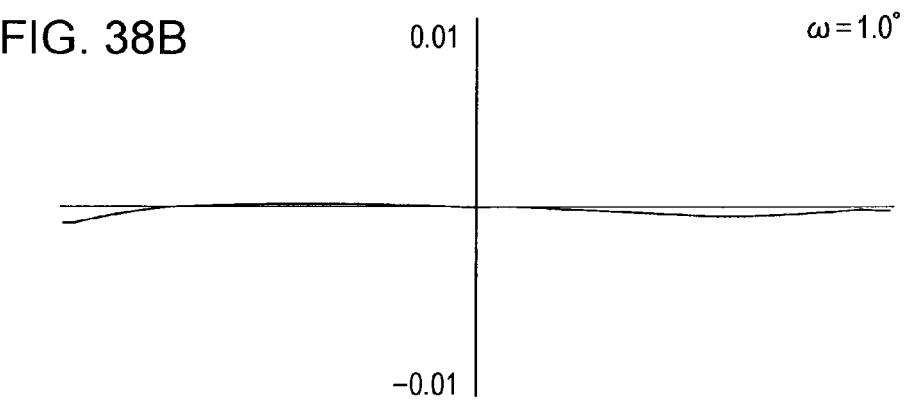
FIG. 38B   0.01   ω=1.0°
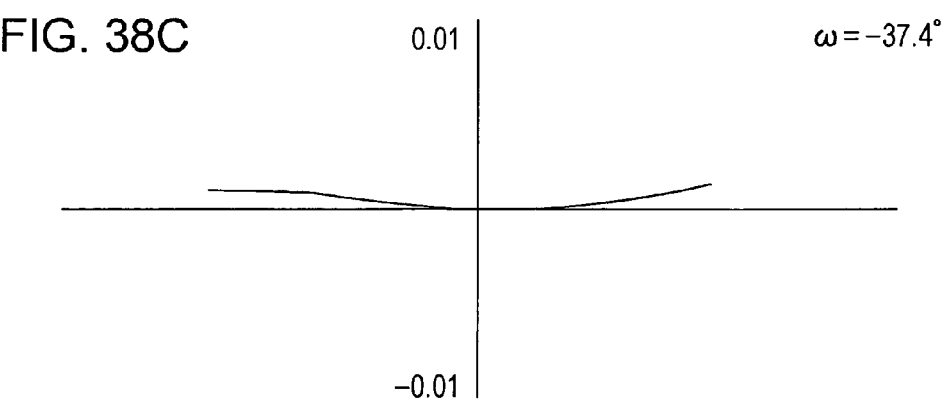
FIG. 38C   0.01   ω=−37.4°

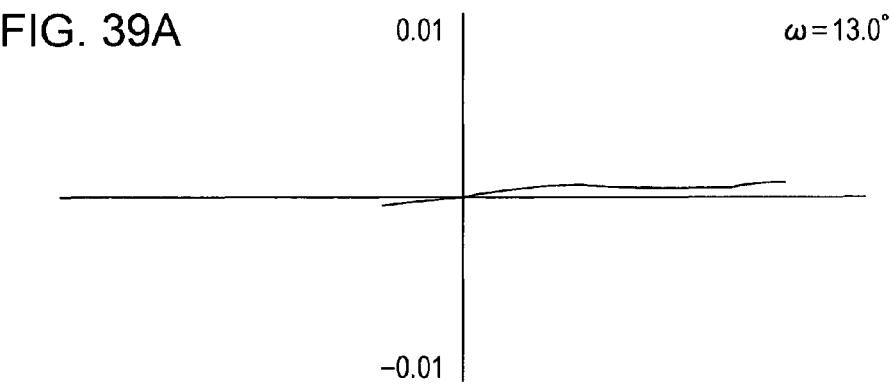
FIG. 39A  ω=13.0°
FIG. 39B  ω=1.0°
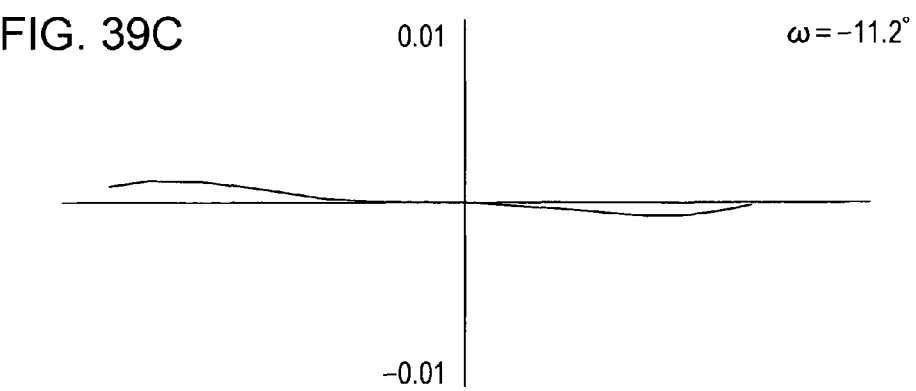
FIG. 39C  ω=−11.2°

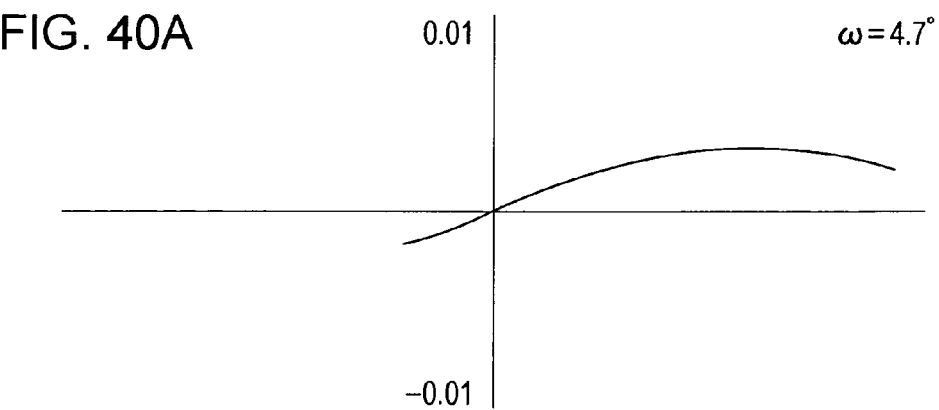
FIG. 40A  ω=4.7°
FIG. 40B  ω=1.0°
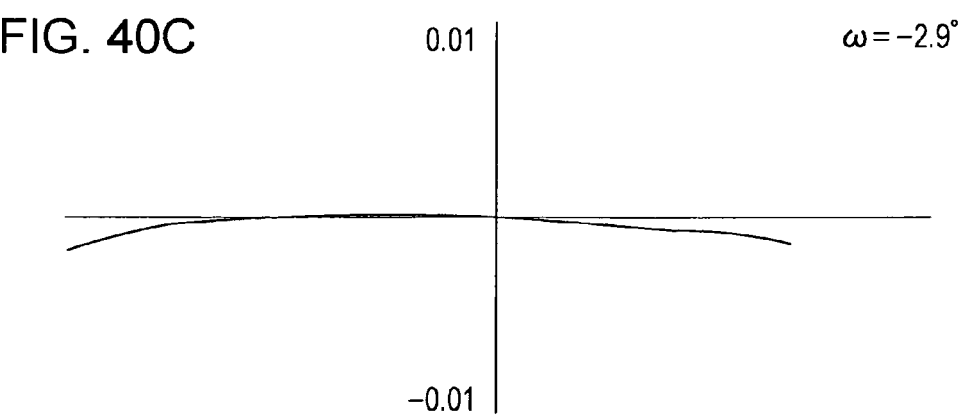
FIG. 40C  ω=-2.9°

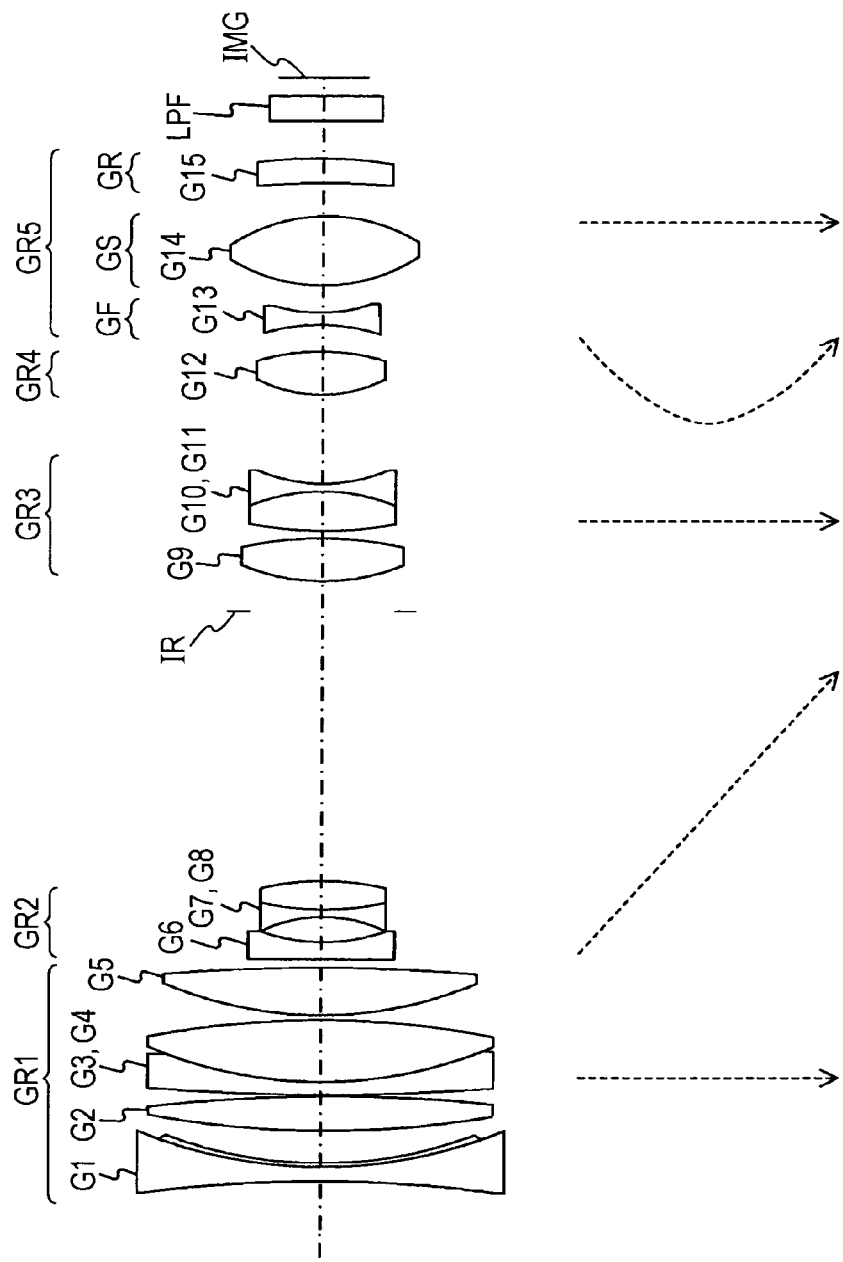

FIG. 42A SPHERICAL ABERRATION Fno=1.86
FIG. 42B ASTIGMATISM ω=38.7°
FIG. 42C DISTORTION ω=38.7°

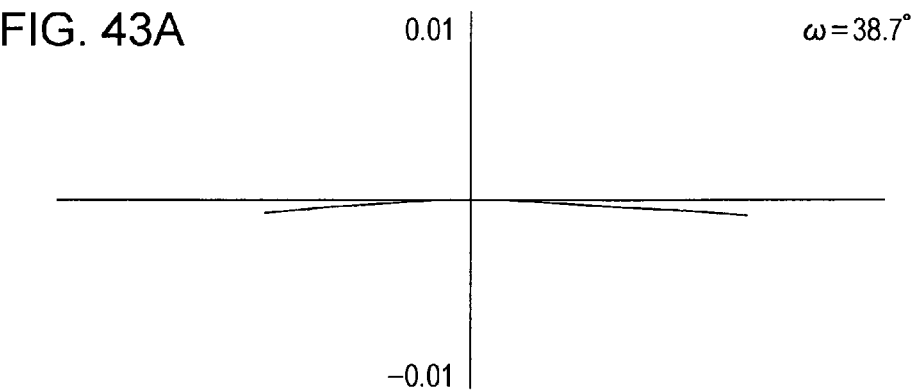
FIG. 43A  0.01  ω=38.7°
−0.01
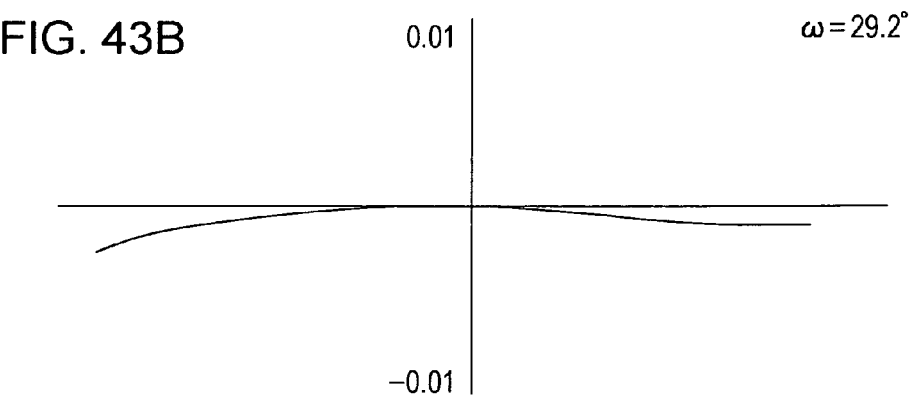
FIG. 43B  0.01  ω=29.2°
−0.01
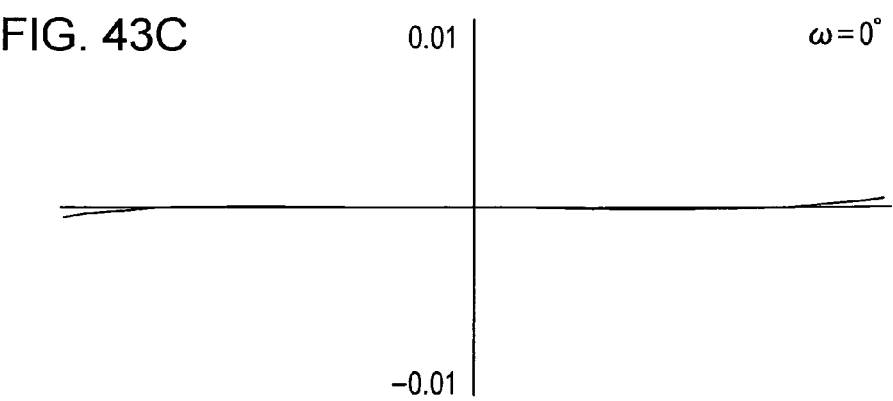
FIG. 43C  0.01  ω=0°
−0.01

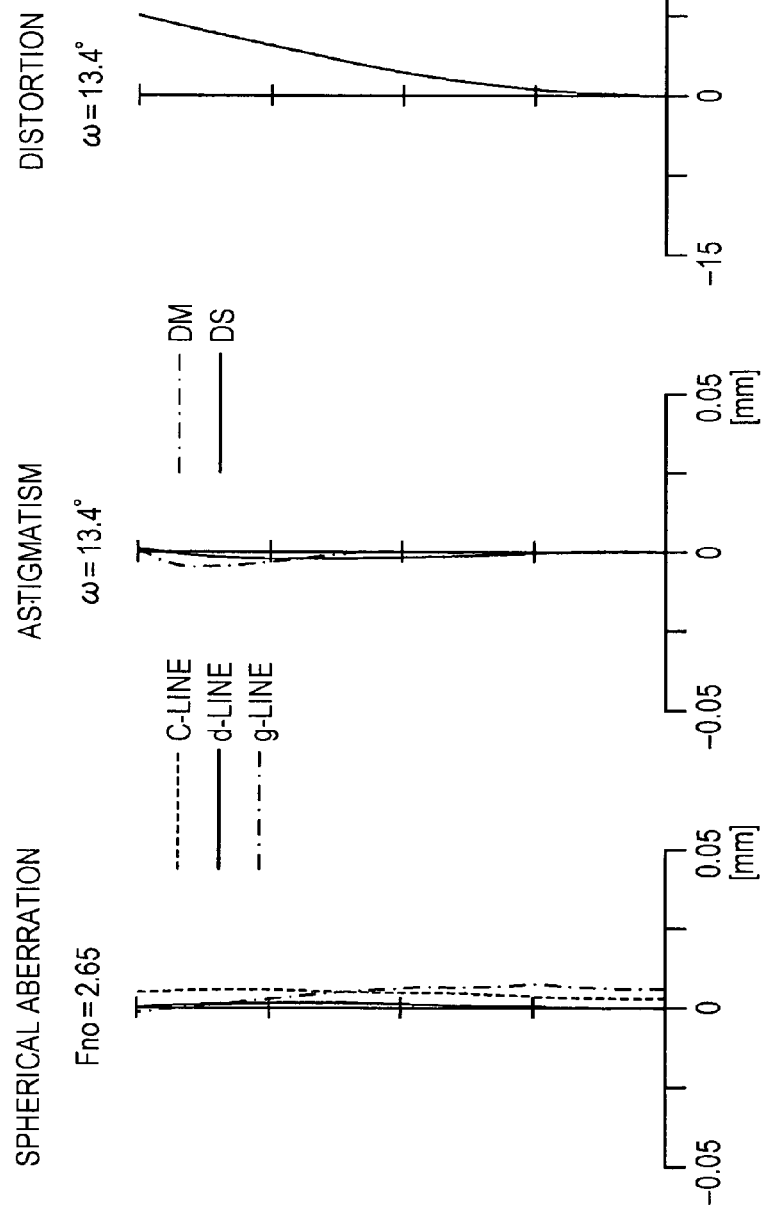

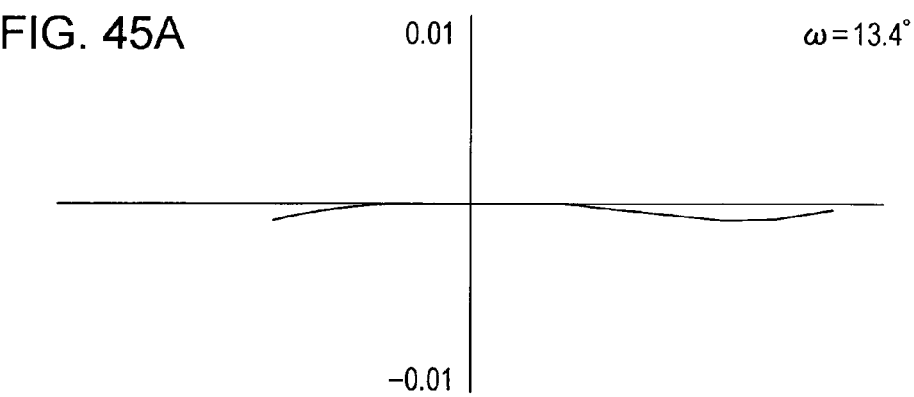
FIG. 45A  ω=13.4°
FIG. 45B  ω=9.5°
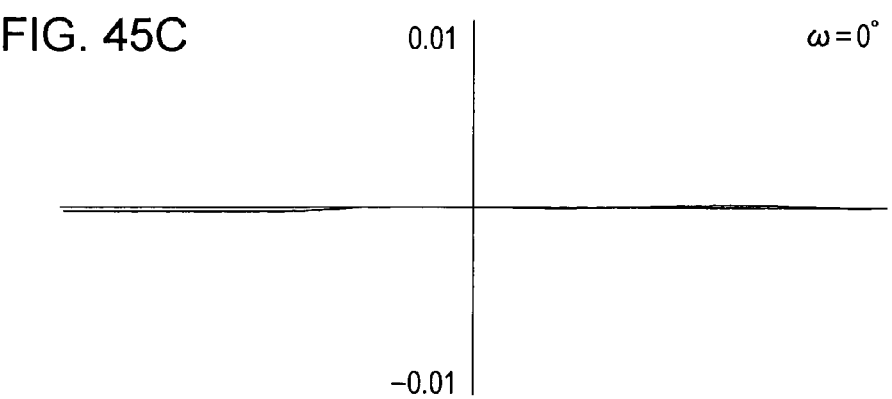
FIG. 45C  ω=0°

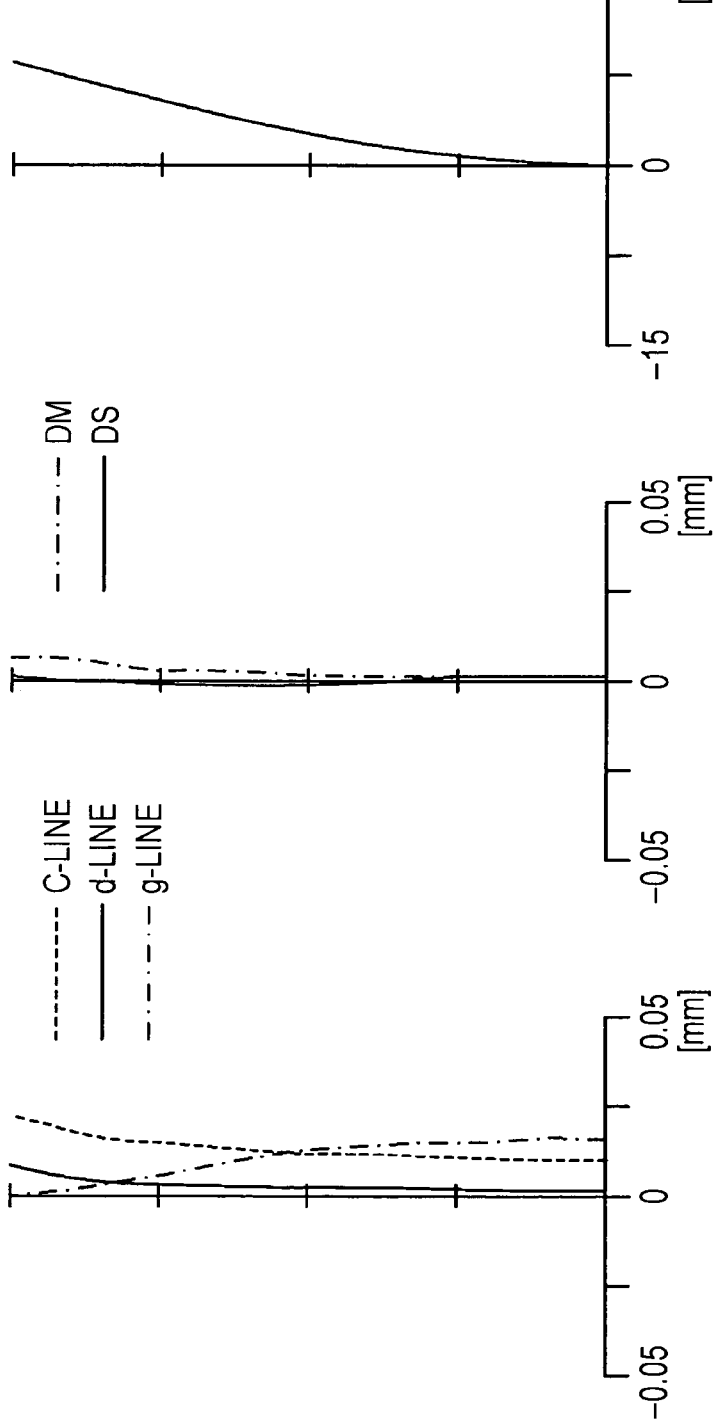
FIG. 46A SPHERICAL ABERRATION
FIG. 46B ASTIGMATISM
FIG. 46C DISTORTION

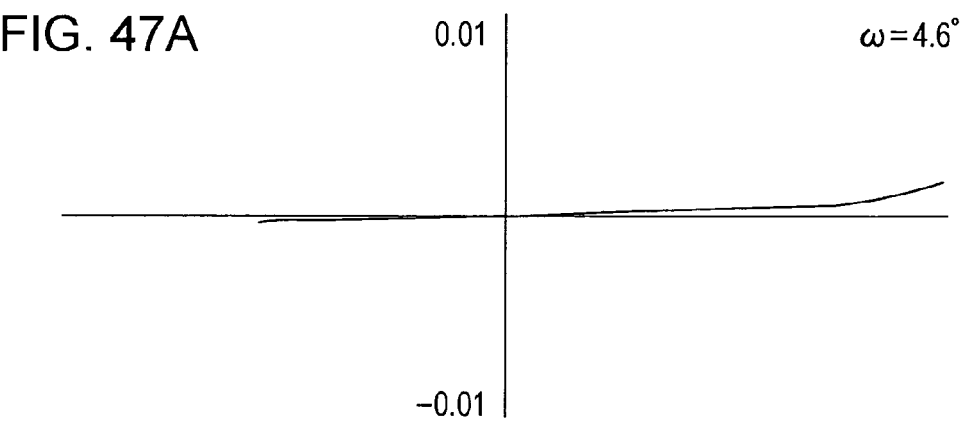
FIG. 47A  ω=4.6°
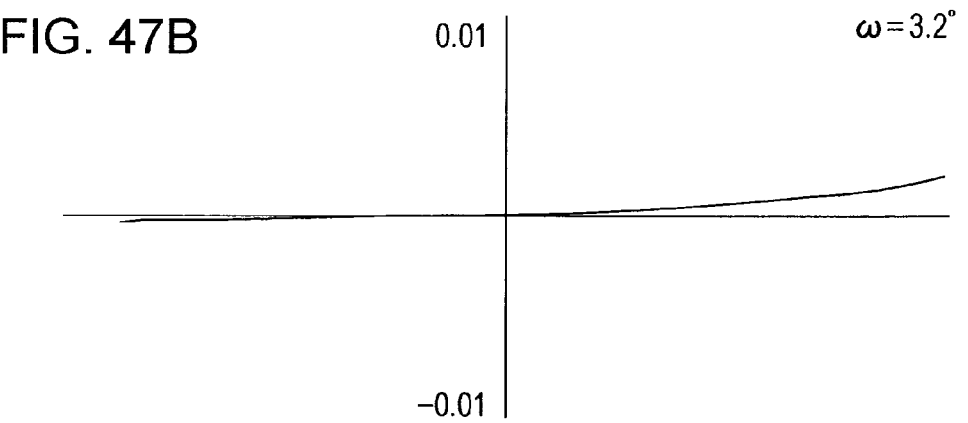
FIG. 47B  ω=3.2°
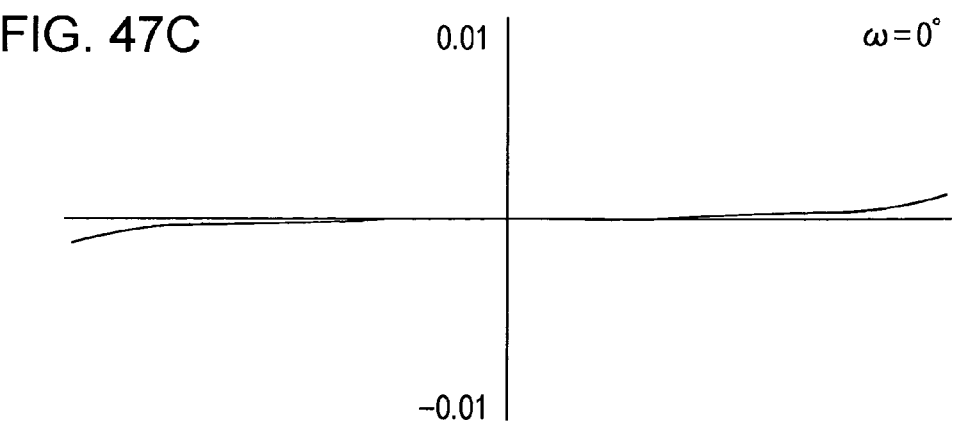
FIG. 47C  ω=0°

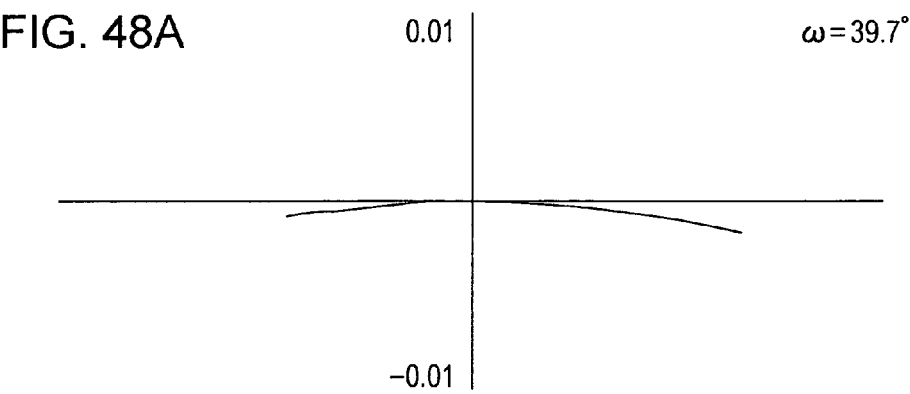
FIG. 48A  0.01  ω=39.7°
FIG. 48B  0.01  ω=1.0°
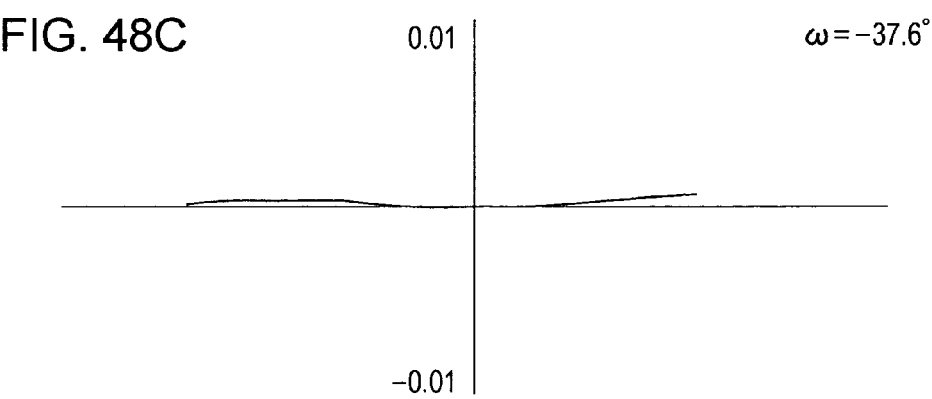
FIG. 48C  0.01  ω=−37.6°

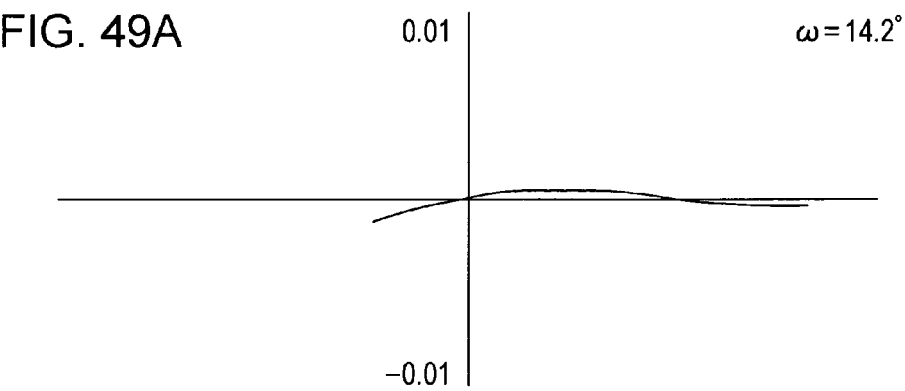
FIG. 49A  0.01  ω=14.2°
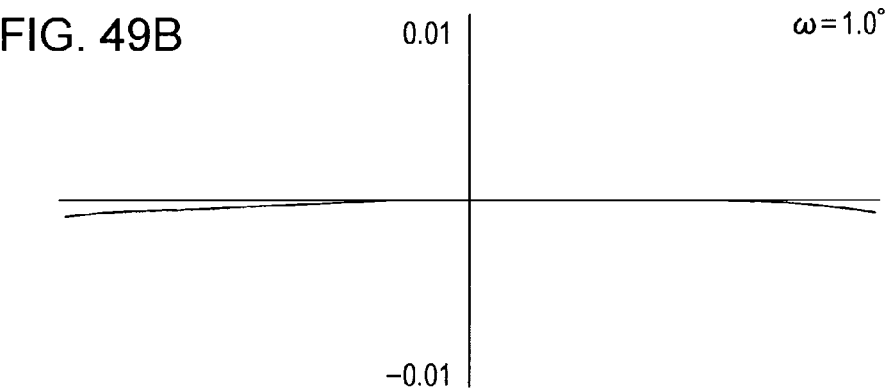
FIG. 49B  0.01  ω=1.0°
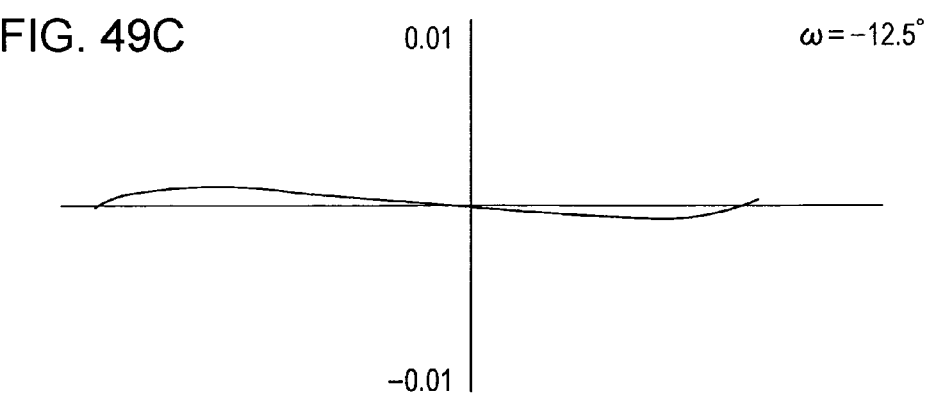
FIG. 49C  0.01  ω=−12.5°

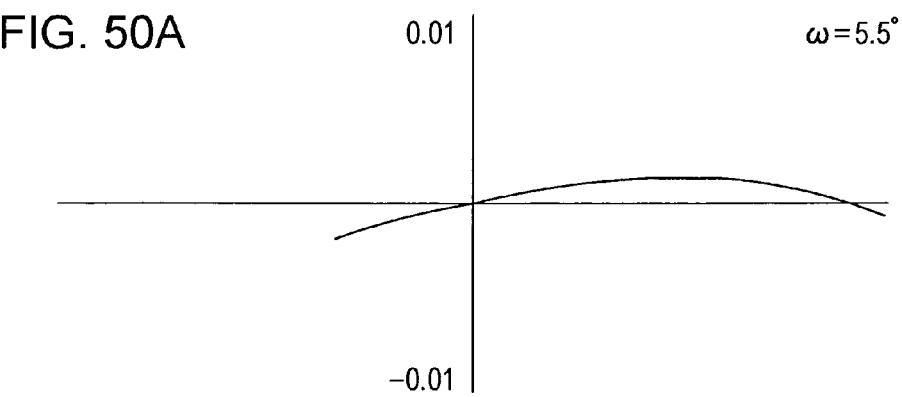
FIG. 50A  0.01  ω=5.5°
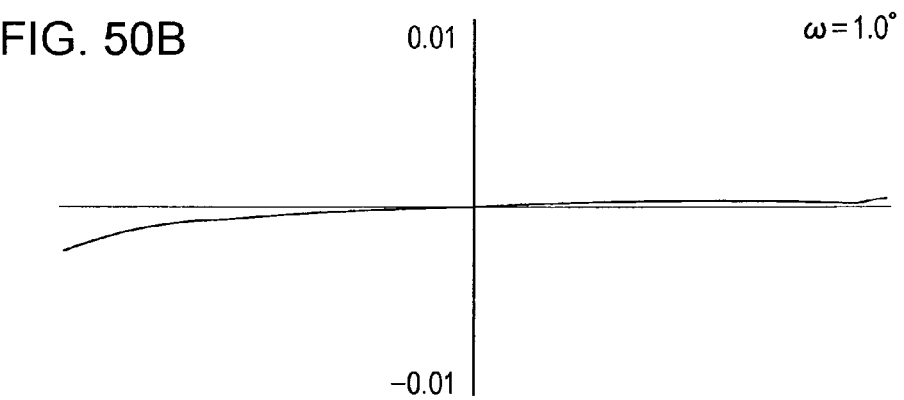
FIG. 50B  0.01  ω=1.0°
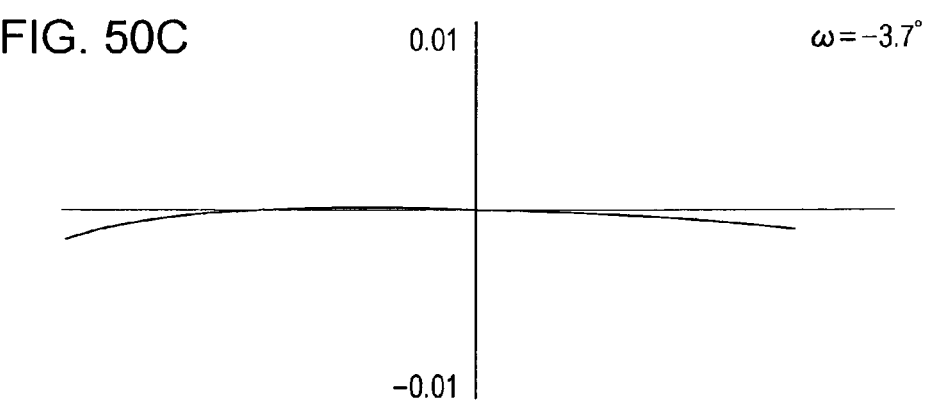
FIG. 50C  0.01  ω=−3.7°

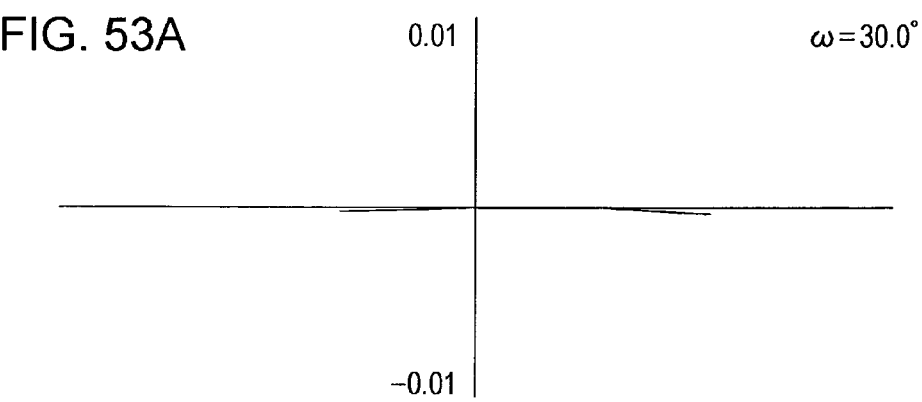
FIG. 53A    0.01    ω=30.0°
    −0.01
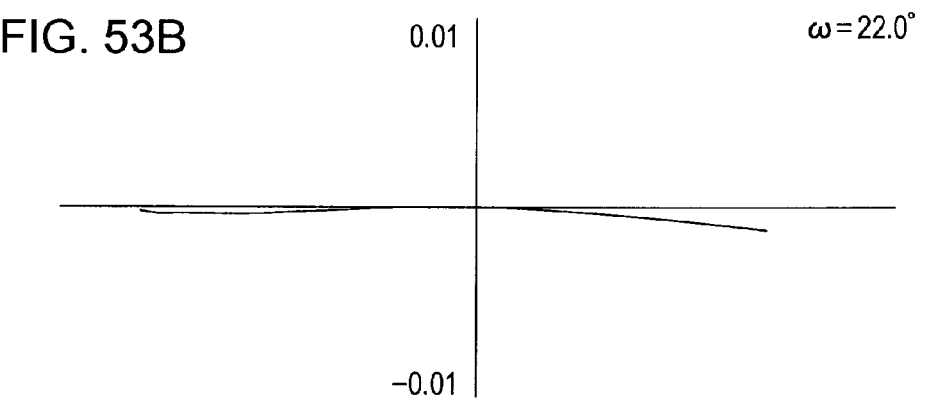
FIG. 53B    0.01    ω=22.0°
    −0.01
FIG. 53C    0.01    ω=0°
    −0.01

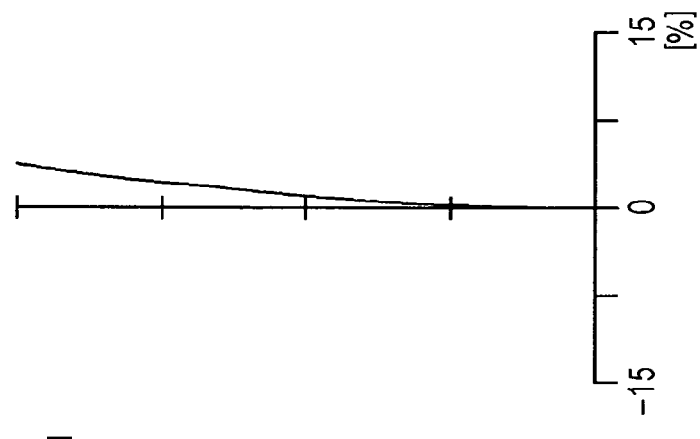

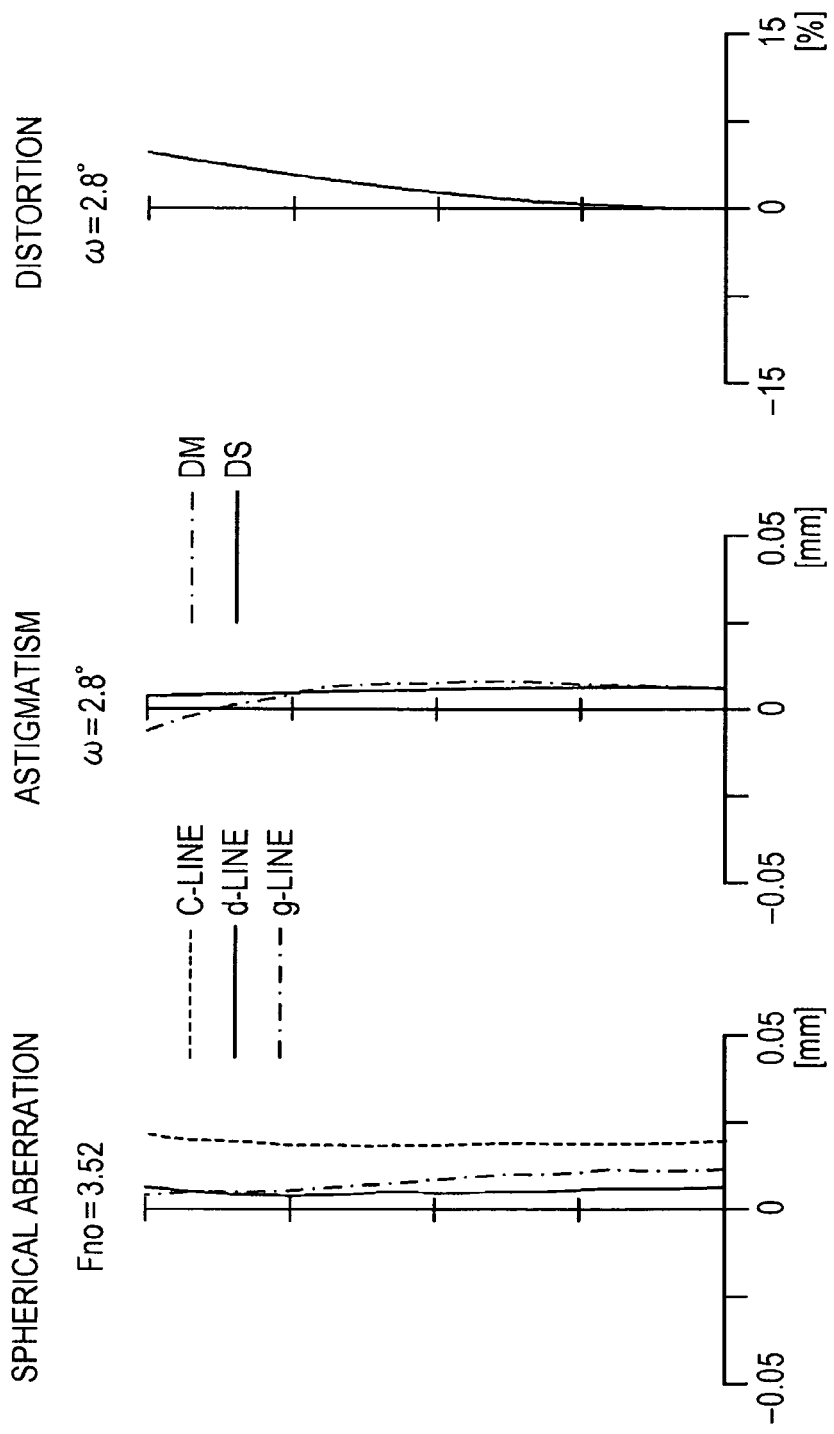

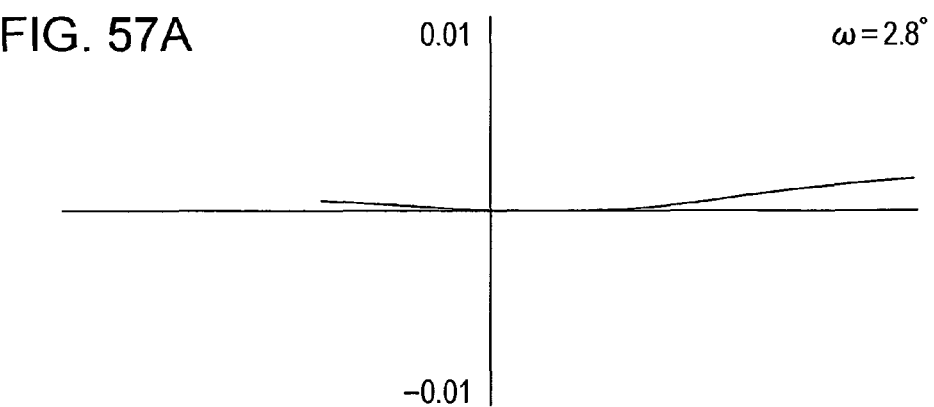
FIG. 57A  ω=2.8°
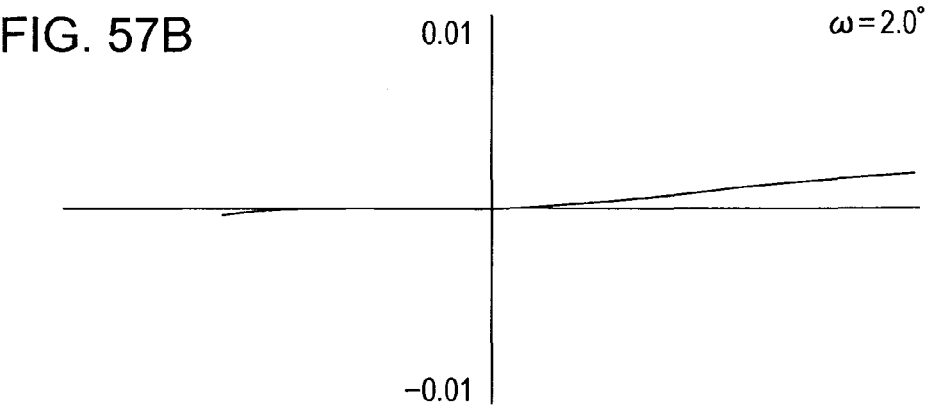
FIG. 57B  ω=2.0°
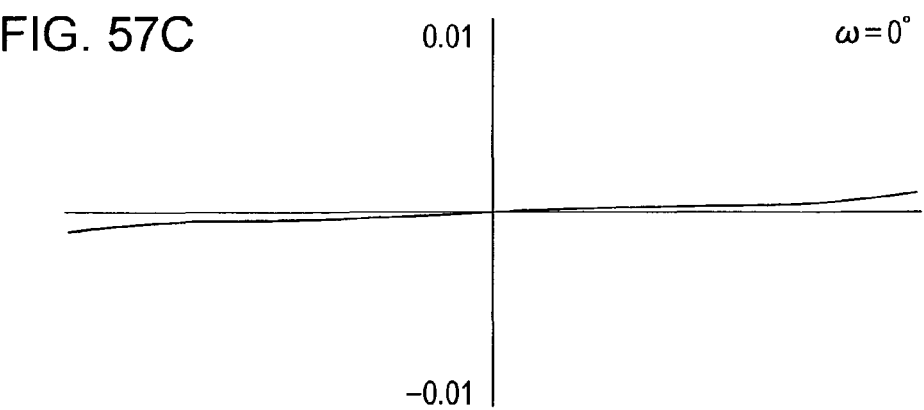
FIG. 57C  ω=0°

FIG. 58A  ω=31.2°
FIG. 58B  ω=1.0°
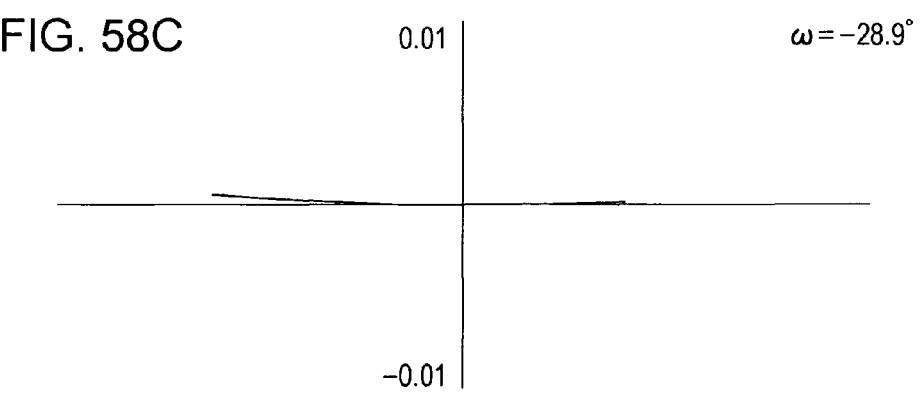
FIG. 58C  ω=−28.9°

FIG. 59A    0.01    ω=10.2°
           −0.01
FIG. 59B    0.01    ω=1.0°
           −0.01
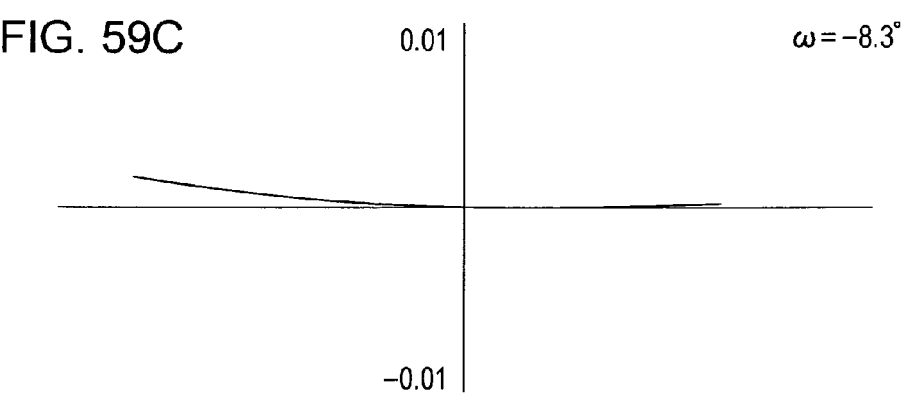
FIG. 59C    0.01    ω=−8.3°
           −0.01

FIG. 60A  0.01  ω=3.8°
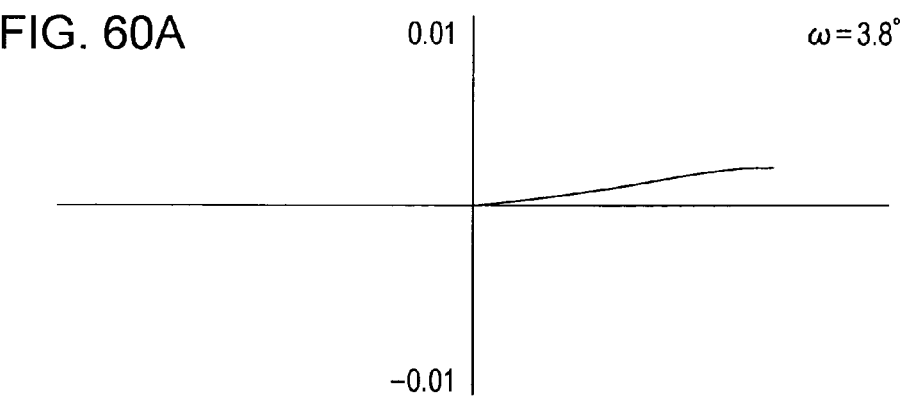
−0.01
FIG. 60B  0.01  ω=1.0°
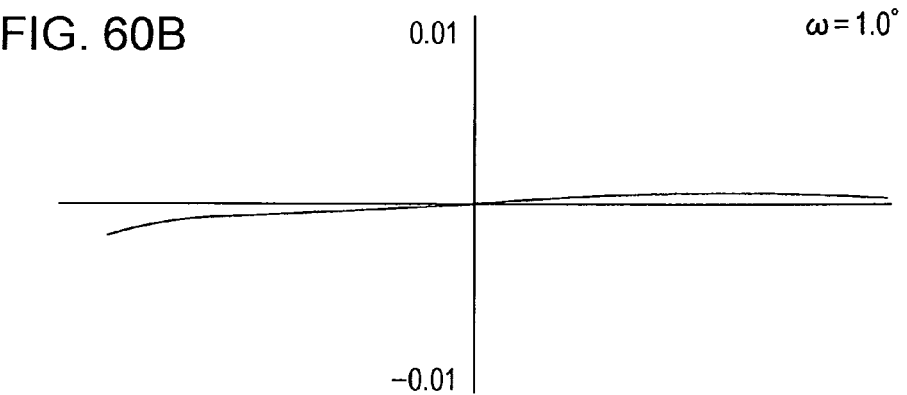
−0.01
FIG. 60C  0.01  ω=−1.8°
−0.01

ZOOM LENS AND IMAGING APPARATUS

BACKGROUND

The present disclosure relates to a zoom lens and an imaging apparatus, particularly, a zoom lens, which optically corrects image blur caused by hand shake and the like at the time of photography, and an imaging apparatus having the zoom lens.

Hand shake, which occurs at the time of photography, and vibration, which is transferred to a photographing system at the time of photographing in a moving object such as a vehicle, causes blurring in a photographed image. In particular, in an optical system of which the zoom ratio is large, the angle of view decreases in the telephoto end state, even minute hand shake causes large image blur. In order to correct such image blur, there have been hand shake correction optical systems that correct image blur by shifting a partial lens group constituting a lens system in a direction substantially perpendicular to the optical axis so as to shift image position and correct fluctuation in aberrations caused when the image position is shifted.

In the hand shake correction optical system, on the basis of a shake correction coefficient, shift of an image caused by hand shake and the like is corrected. Assuming that the focal length of the whole lens system is f and the angle of hand shake is θ, an amount of image shift yb caused by the hand shake is calculated by the following expression.

$$yb = f \tan \theta$$

Assuming that the shake correction coefficient of the shifted lens group is B, an amount of lens shift SL, which is necessary to correct the image shift amount yb, can be obtained by the following expression.

$$SL = -f \tan \theta / B$$

Hence, as the shake correction coefficient B is larger, it is possible to correct hand shake with a smaller amount of lens shift SL.

The hand shake correction optical system is able to function as an optical hand shake correction system by combining, for example, a detection system, a control system, and a driving system. Here, the detection system detects the shaking of the camera caused by hand shake. The control system applies an amount of correction to a lens position on the basis of the signal which is output from the detection system. The driving system shifts a prescribed lens on the basis of the output from the control system.

In the driving system of the hand shake correction optical system, there have been proposed driving systems that correct image blur by shifting a part of the third lens group or the whole third lens group (for example, refer to FIG. 1 of each of Japanese Unexamined Patent Application Publication Nos. 7-128619 and 7-199124). However, the third lens group is positioned in the vicinity of the aperture diaphragm, and the rays pass therethrough in a state where the diameter of rays is large. Hence, fluctuation in aberrations, which are caused by the shift of the shift lens group, such as coma aberration increases, and thus a correctable angle of hand shake is limited to about 0.5°. Further, a problem arises in that a driving mechanism, which shifts the shift lens group, tends to interfere with a mechanism, which drives the aperture diaphragm, or tends to interfere with a mechanism which drives a lens group such as the second lens group or the fourth lens group which is movable in the direction of the optical axis.

In this respect, there have been proposed techniques of shifting a part or the whole of the final lens group which is positioned to be closest to the image side (for example, refer to FIG. 1, FIG. 1, and FIG. 2 of Japanese Unexamined Patent Application Publication Nos. 2006-276475, 2006-330341, and 2008-134334, respectively). In this case, in the final lens group, the rays pass therethrough in a state where the diameter of rays is small. Hence, the shift lens group has many advantages such as a decrease in sensitivity to the eccentricity of the shift lens group.

SUMMARY

As it is, even when a part or the whole of the final lens group is shifted, in order to correct the hand shake angle of about 1.0°, the shift amount particularly in the telephoto end state extremely increases. For this reason, it is difficult to correct fluctuation in aberrations. Further, in order to secure the effective diameter of the shift lens, the outer diameter and the thickness thereof extremely increase. Thus, a problem arises in that the driving mechanism also increases in size.

The disclosure has been made in view of the above situation, and addresses the issue of sufficiently correcting hand shake in the entire zoom range and decreasing the size of the barrel including the driving mechanism.

According to an embodiment of the disclosure, provided are a zoom lens and an imaging apparatus using the zoom lens. The zoom lens has a plurality of lens groups and performs zooming by changing spaces between the plurality of lens groups. In the zoom lens, a final lens group positioned to be closest to an image side includes, in order from an object side to an image side: a first partial lens group GF that has a negative refractive power; a second partial lens group GS that has a positive refractive power; and a third partial lens group GR that has a positive refractive power. Image blur is corrected by shifting the second partial lens group GS in a direction substantially perpendicular to an optical axis. Assuming that a focal length of the first partial lens group GF is fGF, a focal length of the second partial lens group GS is fGS, and a focal length of a whole lens system of the plurality of lens groups in a telephoto end state is ft, the following Conditional Expressions are satisfied: (1) −0.24<fGF/ft<−0.09; and (2) 0.12<fGS/ft<0.32. With such a configuration, the following effects are obtained: the angle of hand shake of about 1.0° is corrected in the entire zoom range; and the size of the barrel including the driving mechanism decreases.

Further, in the embodiment of the disclosure, it is preferable that, assuming that a focal length of the third partial lens group GR is fGR, and a focal length of the final lens group GL is fGL, the following Conditional Expression should be satisfied: (3) 1.0<fGR/fGL<3.5. With such a configuration, the following effects are obtained: excellent imaging performance is secured up to the peripheral portion of the screen; and out-of-focus, which tends to occur at the time of image blur correction, is prevented from occurring.

Further, in the embodiment of the disclosure, it is preferable that the second partial lens group GS should have at least one aspheric surface. With such a configuration, the following effect is obtained: the fluctuation in aberrations, which is caused by the shift of the second partial lens group GS, is satisfactorily corrected.

Further, in the embodiment of the disclosure, it is preferable that the first partial lens group GF should have at least one aspheric surface. With such a configuration, the following effects are obtained: the shake correction coefficient of the second partial lens group GS is improved; and spherical aberration and astigmatism are satisfactorily corrected.

Further, in the embodiment of the disclosure, it is preferable that the second partial lens group GS should have at least one plastic lens. Since plastic is lighter than glass in specific gravity, by decreasing the weight of the shift lens group, the driving mechanism is miniaturized.

Further, in the embodiment of the disclosure, it is preferable that, assuming that a focal length of the whole lens system of the plurality of lens groups in a wide-angle end state is fw, the following Conditional Expression should be satisfied: (4) $0.5 < fGL/(fw \cdot ft)^{1/2} < 2.5$. With such a configuration, the following effect is obtained: an increase in angle of view and an increase in magnification are achieved while excellent imaging performance is maintained in the entire zoom range.

Further, in the embodiment of the disclosure, it is preferable that the plurality of lens groups should include, in order from the object side to the image side: a first lens group GR1 that has a positive refractive power and remains stationary in a direction of the optical axis; a second lens group GR2 that has a negative refractive power and moves in the optical axis so as to thereby perform zooming; a third lens group GR3 that has a positive refractive power and remains stationary in the direction of the optical axis; a fourth lens group GR4 that has a positive refractive power and moves in the optical axis so as to thereby correct variation in an imaging position and correct change in the imaging position caused by change in an object distance; and a fifth lens group GR5 that serves as the final lens group having a positive refractive power and remains stationary in the direction of the optical axis. With such a configuration, the following effects are obtained: the focal length at the wide-angle end is set to increase an angle of view, whereby an increase in magnification is achieved; and the driving mechanism is miniaturized.

According to the embodiment of the disclosure, the following advantages can be obtained: it is possible to sufficiently correct the angle of hand shake of about 1.0° in the entire zoom range; and it is possible to decrease the size of the barrel including the driving mechanism. Further, it is possible to achieve an increase in angle of view through the focal length at the wide-angle end and achieve an increase in magnification while securing excellent imaging performance at the time of photographing in the entire ranges from the wide-angle end to the telephoto end and from the infinity to the near distance.

BRIEF DESCRIPTION OF THE DRAWINGS

FIGS. 2A to 2C are diagrams illustrating spherical aberration, astigmatism, and distortion when the focus is at infinity in the wide-angle end state according to the first embodiment of the disclosure;

FIGS. 3A to 3C are diagrams illustrating lateral aberration when the focus is at infinity in the wide-angle end state according to the first embodiment of the disclosure;

FIGS. 4A to 4C are diagrams illustrating spherical aberration, astigmatism, and distortion when the focus is at infinity in the middle focus position state according to the first embodiment of the disclosure;

FIGS. 5A to 5C are diagrams illustrating lateral aberration when the focus is at infinity in the middle focus position state according to the first embodiment of the disclosure;

FIGS. 7A to 7C are diagrams illustrating lateral aberration when the focus is at infinity in the telephoto end state according to the first embodiment of the disclosure;

FIGS. 8A to 8C are diagrams illustrating lateral aberration in the wide-angle end state according to the first embodiment of the disclosure;

FIGS. 9A to 9C are diagrams illustrating lateral aberration in the middle focal length state according to the first embodiment of the disclosure;

FIG. 11 is a diagram illustrating an exemplary configuration of a zoom lens according to a second embodiment of the disclosure;

FIGS. 12A to 12C are diagrams illustrating spherical aberration, astigmatism, and distortion when the focus is at infinity in the wide-angle end state according to the second embodiment of the disclosure;

FIGS. 13A to 13C are diagrams illustrating lateral aberration when the focus is at infinity in the wide-angle end state according to the second embodiment of the disclosure;

FIGS. 14A to 14C are diagrams illustrating spherical aberration, astigmatism, and distortion when the focus is at infinity in the middle focus position state according to the second embodiment of the disclosure;

FIGS. 15A to 15C are diagrams illustrating lateral aberration when the focus is at infinity in the middle focus position state according to the second embodiment of the disclosure;

FIGS. 16A to 16C are diagrams illustrating spherical aberration, astigmatism, and distortion when the focus is at infinity in the telephoto end state according to the second embodiment of the disclosure;

FIGS. 17A to 17C are diagrams illustrating lateral aberration when the focus is at infinity in the telephoto end state according to the second embodiment of the disclosure;

FIGS. 18A to 18C are diagrams illustrating lateral aberration in the wide-angle end state according to the second embodiment of the disclosure;

FIGS. 19A to 19C are diagrams illustrating lateral aberration in the middle focal length state according to the second embodiment of the disclosure;

FIGS. 20A to 20C are diagrams illustrating lateral aberration in the telephoto end state according to the second embodiment of the disclosure;

FIGS. 22A to 22C are diagrams illustrating spherical aberration, astigmatism, and distortion when the focus is at infinity in the wide-angle end state according to the third embodiment of the disclosure;

FIGS. 23A to 23C are diagrams illustrating lateral aberration when the focus is at infinity in the wide-angle end state according to the third embodiment of the disclosure;

FIGS. 24A to 24C are diagrams illustrating spherical aberration, astigmatism, and distortion when the focus is at infinity in the middle focus position state according to the third embodiment of the disclosure;

FIGS. 28A to 28C are diagrams illustrating lateral aberration in the wide-angle end state according to the third embodiment of the disclosure;

FIGS. 30A to 30C are diagrams illustrating lateral aberration in the telephoto end state according to the third embodiment of the disclosure;

FIGS. 32A to 32C are diagrams illustrating spherical aberration, astigmatism, and distortion when the focus is at infinity in the wide-angle end state according to the fourth embodiment of the disclosure;

FIGS. 33A to 33C are diagrams illustrating lateral aberration when the focus is at infinity in the wide-angle end state according to the fourth embodiment of the disclosure;

FIGS. 34A to 34C are diagrams illustrating spherical aberration, astigmatism, and distortion when the focus is at infinity in the middle focus position state according to the fourth embodiment of the disclosure;

FIGS. 35A to 35C are diagrams illustrating lateral aberration when the focus is at infinity in the middle focus position state according to the fourth embodiment of the disclosure;

FIGS. 36A to 36C are diagrams illustrating spherical aberration, astigmatism, and distortion when the focus is at infinity in the telephoto end state according to the fourth embodiment of the disclosure;

FIGS. 37A to 37C are diagrams illustrating lateral aberration when the focus is at infinity in the telephoto end state according to the fourth embodiment of the disclosure;

FIGS. 38A to 38C are diagrams illustrating lateral aberration in the wide-angle end state according to the fourth embodiment of the disclosure;

FIGS. 39A to 39C are diagrams illustrating lateral aberration in the middle focal length state according to the fourth embodiment of the disclosure;

FIGS. 40A to 40C are diagrams illustrating lateral aberration in the telephoto end state according to the fourth embodiment of the disclosure;

FIG. 41 is a diagram illustrating an exemplary configuration of a zoom lens according to a fifth embodiment of the disclosure;

FIGS. 42A to 42C are diagrams illustrating spherical aberration, astigmatism, and distortion when the focus is at infinity in the wide-angle end state according to the fifth embodiment of the disclosure;

FIGS. 43A to 43C are diagrams illustrating lateral aberration when the focus is at infinity in the wide-angle end state according to the fifth embodiment of the disclosure;

FIGS. 44A to 44C are diagrams illustrating spherical aberration, astigmatism, and distortion when the focus is at infinity in the middle focus position state according to the fifth embodiment of the disclosure;

FIGS. 45A to 45C are diagrams illustrating lateral aberration when the focus is at infinity in the middle focus position state according to the fifth embodiment of the disclosure;

FIGS. 46A to 46C are diagrams illustrating spherical aberration, astigmatism, and distortion when the focus is at infinity in the telephoto end state according to the fifth embodiment of the disclosure;

FIGS. 47A to 47C are diagrams illustrating lateral aberration when the focus is at infinity in the telephoto end state according to the fifth embodiment of the disclosure;

FIGS. 48A to 48C are diagrams illustrating lateral aberration in the wide-angle end state according to the fifth embodiment of the disclosure;

FIGS. 49A to 49C are diagrams illustrating lateral aberration in the middle focal length state according to the fifth embodiment of the disclosure;

FIGS. 50A to 50C are diagrams illustrating lateral aberration in the telephoto end state according to the fifth embodiment of the disclosure;

FIGS. 52A to 52C are diagrams illustrating spherical aberration, astigmatism, and distortion when the focus is at infinity in the wide-angle end state according to the sixth embodiment of the disclosure;

FIGS. 53A to 53C are diagrams illustrating lateral aberration when the focus is at infinity in the wide-angle end state according to the sixth embodiment of the disclosure;

FIGS. 54A to 54C are diagrams illustrating spherical aberration, astigmatism, and distortion when the focus is at infinity in the middle focus position state according to the sixth embodiment of the disclosure;

FIGS. 56A to 56C are diagrams illustrating spherical aberration, astigmatism, and distortion when the focus is at infinity in the telephoto end state according to the sixth embodiment of the disclosure;

FIGS. 57A to 57C are diagrams illustrating lateral aberration when the focus is at infinity in the telephoto end state according to the sixth embodiment of the disclosure;

FIGS. 58A to 58C are diagrams illustrating lateral aberration in the wide-angle end state according to the sixth embodiment of the disclosure;

FIGS. 59A to 59C are diagrams illustrating lateral aberration in the middle focal length state according to the sixth embodiment of the disclosure;

FIGS. 60A to 60C are diagrams illustrating lateral aberration in the telephoto end state according to the sixth embodiment of the disclosure.

DETAILED DESCRIPTION OF EMBODIMENTS

Figure 1:
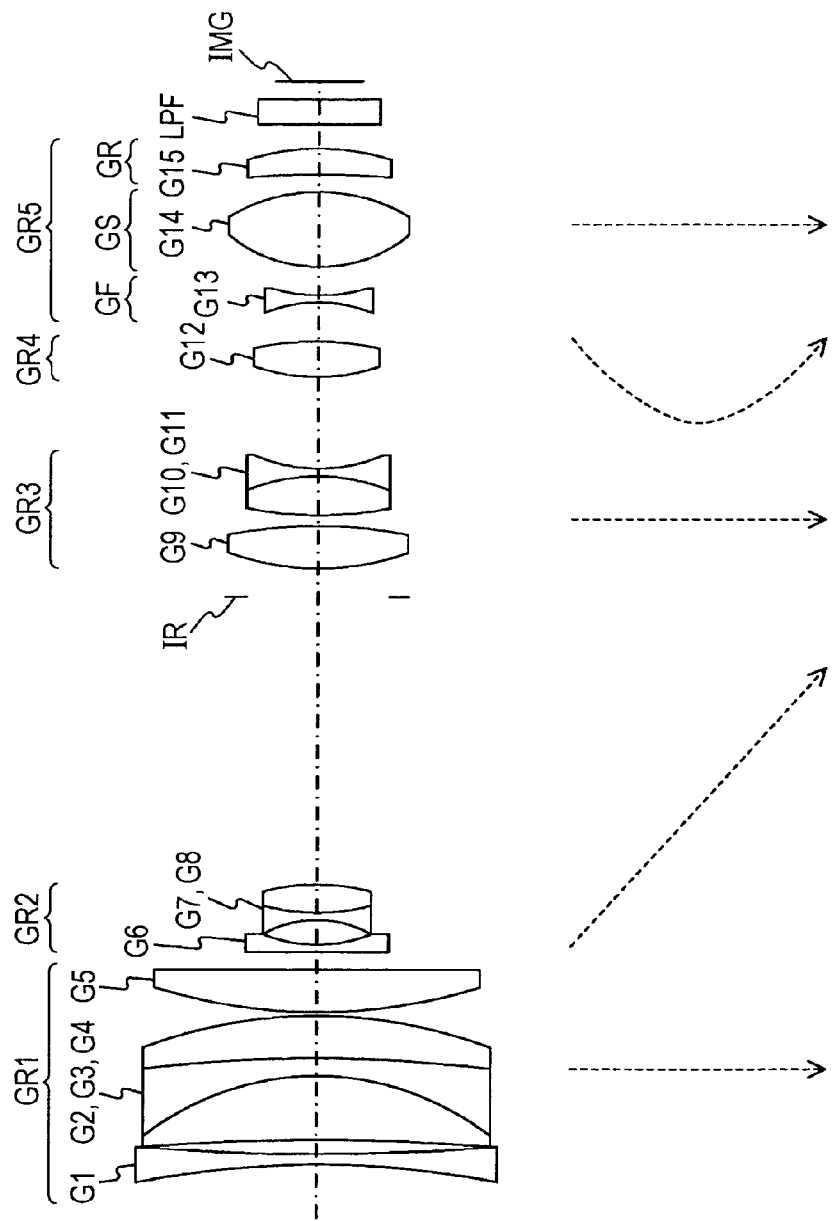
FIG. 1 is a diagram illustrating an exemplary configuration of a zoom lens according to a first embodiment of the disclosure.

A zoom lens according to an embodiment of the disclosure is formed of a plurality of lens groups, and performs zooming by changing spaces between lens groups. A final lens group GR5 positioned to be closest to an image side includes, in order from the object side to the image side, a partial lens group GF that has a negative refractive power, a partial lens group GS that has a positive refractive power, and a partial lens group GR that has a positive refractive power. It is possible to correct image blur by shifting the partial lens group GS in the direction substantially perpendicular to the optical axis. Assuming that a focal length of the partial lens group GF is fGF, a focal length of the partial lens group GS is fGS, and a focal length of a whole lens system of the plurality of lens groups in a telephoto end state is ft, the following Conditional Expressions are satisfied: (1) $-0.24 < fGF/ft < -0.09$; and (2) $0.12 < fGS/ft < 0.32$.

Conditional Expression (1) defines the magnitude of the focal length of the partial lens group GF relative to the focal length of the whole lens system at the telephoto end.

In order to suppress fluctuation in aberrations at the time of the shift of the partial lens group GS and sufficiently increase the shake correction coefficient of the partial lens group GS, it is preferable that on-axis rays, which are incident to the partial lens group GS, should become substantially telecentric. That is, it is preferable that the rays, which are incident to the final lens group GR5, should be deflected by a large negative refractive power of the partial lens group GF until the rays become substantially telecentric. When the lower limit of Conditional Expression (1) is exceeded, the power for deflecting rays through the partial lens group GF decreases, and the shake correction coefficient of the partial lens group GS decreases. Hence, when the hand shake of which the angle is 1.0 is corrected, the outer diameters and the thicknesses of the lenses in the partial lens group GS increase, and fluctuation in aberrations caused by the shift of the partial lens group GS. In contrast, when the upper limit of Conditional Expression (1) is exceeded, the power for deflecting rays through the partial lens group GF extremely increases, and the shake correction coefficient of the partial lens group GS increases. However, it becomes difficult to correct spherical aberration and astigmatism caused by the final lens group.

Conditional Expression (2) defines the magnitude of the focal length of the partial lens group GS relative to the focal length of the whole lens system at the telephoto end. When the lower limit of Conditional Expression (2) is exceeded, the positive refractive power of the partial lens group GS extremely increases, and the shake correction coefficient of the partial lens group GS increases. However, it becomes difficult to correct spherical aberration and astigmatism caused by the final lens group. In contrast, when the upper limit of Conditional Expression (2) is exceeded, the positive refractive power of the partial lens group GS decreases, and the shake correction coefficient of the partial lens group GS decreases. Hence, when the hand shake of which the angle is 1.0° is corrected, the outer diameters and the thicknesses of the lenses in the partial lens group GS increase, and fluctuation in aberrations caused by the shift of the partial lens group GS.

Accordingly, by making the zoom lens satisfy Conditional Expressions (1) and (2), even when the hand shake of which the angle is 1.0° is corrected, it is possible to obtain high imaging performance, for which aberrations are satisfactorily corrected, and decrease the size of the barrel including the driving mechanism of the partial lens group GS. In addition, in Conditional Expression (1), when the lower limit is set to −0.18 and the upper limit is set to −0.12, it is possible to further increase the effect thereof. Further, in Conditional Expression (2), when the lower limit is set to 0.16 and the upper limit is set to 0.26, it is possible to further increase the effect thereof.

It is preferable that the zoom lens according to the embodiment of the disclosure should satisfy Conditional Expression (3) 1.0<fGR/fGL<3.5 which defines the magnitude of the focal length of the partial lens group GR relative to the focal length of the final lens group GL. When the lower limit of Conditional Expression (3) is exceeded, the positive refractive power of the partial lens group GR extremely increases, and thus the off-axis rays, which pass through the final lens group, are distanced from the optical axis. Hence, it becomes difficult to correct coma aberration which occurs in the peripheral portion of the screen. In contrast, when the upper limit of Conditional Expression (3) is exceeded, the positive refractive power of the partial lens group GR decreases.

Hence, when the partial lens group GS is shifted, minute movement thereof, which is caused from the configuration of the mechanism, in the direction of the optical axis changes the position of the image plane in the direction of the optical axis, and thus so called out-of-focus tends to occur. Accordingly, by making the zoom lens satisfy Conditional Expression (3), it is possible to obtain high imaging performance, for which aberrations are corrected up to the periphery of the screen, and prevent out-of-focus from occurring even in the image blur correction state so as to thereby obtain high image qualify. In addition, in Conditional Expression (3), when the lower limit is set to 1.1 and the upper limit is set to 2.7, it is possible to further increase the effect thereof.

In the zoom lens according to the embodiment of the disclosure, it is preferable that the partial lens group GS should have at least one aspheric surface. When image blur is corrected by shifting a part or the whole of the final lens group, the amount of lens shift is proportional to the focal length. Thus, if the hand shake of which the angle is 1.0° is intended to be corrected in the entire zoom range, the shift amount is maximized in the telephoto end state. Hence, it is preferable that the partial lens group GS with a positive refractive power should have an aspheric surface shape in which the positive power is large in the vicinity of the optical axis and the positive refractive power gradually decreases as the distance from the optical axis increases. Thereby, it is possible to satisfactorily correct coma aberration even when hand shake is corrected in the telephoto end state in which the shift amount is maximized.

Further, it is preferable that the partial lens group GS should be made of only a low-dispersion lens which has a positive refractive power, or should be made of an achromatic lens in which a low-dispersion lens with a large positive refractive power and a high-dispersion lens with a small negative refractive power are combined. This configuration is for suppressing fluctuation in chromatic aberration at the time of lens shift.

In the zoom lens according to the embodiment of the disclosure, it is preferable that the partial lens group GF should have at least one aspheric surface. Thereby, until the on-axis rays, which are incident to the partial lens group GS, become substantially telecentric, rays can be deflected by the large negative refractive power of the partial lens group GF. This is for suppressing fluctuation in aberrations at the time of the shift of the partial lens group GS and for sufficiently increasing the shake correction coefficient of the partial lens group GS. The partial lens group GF with a negative refractive power has an aspheric surface shape in which the negative power is large in the vicinity of the optical axis and the negative refractive power gradually decreases as the distance from the optical axis increases. Thereby, it is possible to satisfactorily correct spherical aberration and astigmatism caused by the final lens group.

In the zoom lens according to the embodiment of the disclosure, it is preferable that the partial lens group GS should have at least one plastic lens. When the hand shake of which the angle is 1.0° is intended to be corrected in the entire zoom range, the effective diameter may be intended to be secured in the telephoto end state in which the shift amount is maximized. In this case, the outer diameters and the thicknesses of the lenses in the partial lens group GS increase, and thus weights of lens bodies tend to increase. When the weight of the partial lens group GS increases, it is necessary to increase a driving force of the driving mechanism, and thus the size of the driving mechanism increases. Hence, in order to miniaturize the driving mechanism, it is preferable that the partial lens group GS should include a lens made of plastic which is lighter than glass in specific gravity. Further, even in view of costs, it is advantageous to use a plastic lens.

It is preferable that the zoom lens according to the embodiment of the disclosure should satisfy Conditional Expression (4) $0.5 < fGL/(fw \cdot ft)^{1/2} < 2.5$ which defines the magnitude of the focal length of the final lens group GL relative to the square root of the product between the focal length of the whole lens system in the wide-angle end state and the focal length thereof in the telephoto end state. When the lower limit of Conditional Expression (4) is exceeded, it is possible to shorten the length of the whole lens system. Hence, this configuration is advantageous in an increase in angle of view and an increase in magnification. However, it becomes difficult to satisfactorily correct aberrations in the entire zoom range. In contrast, when the upper limit of Conditional Expression (4) is exceeded, the length of the whole lens system increases. Thus, it becomes difficult to achieve a sufficient wide angle and high magnification. Accordingly, by making the zoom lens satisfy Conditional Expression (4), it is possible to achieve a wide angle and high magnification while achieving sufficient miniaturization. In addition, in Conditional Expression (4), when the lower limit is set to 0.8 and the upper limit is set to 2.0, it is possible to further increase the effect thereof.

The zoom lens according to the embodiment of the disclosure may include, in order from the object side to the image side, first to fifth lens groups. The first lens group has a positive refractive power and remains stationary in the direction of the optical axis. The second lens group has a negative refractive power and moves in the optical axis so as to thereby perform a zooming operation. The third lens group has a positive refractive power and remains stationary in the direction of the optical axis. The fourth lens group has a positive refractive power and moves in the optical axis so as to thereby correct variation in an imaging position and correct change in the imaging position caused by change in an object distance. The fifth lens group has a positive refractive power and remains stationary in the direction of the optical axis. With such a configuration, it is possible to achieve miniaturization while achieving a wide angle and high magnification at the wide-angle end.

Further, in order to achieve miniaturization and prevent diffraction of the small aperture diaphragm from deteriorating, it is preferable to use an ND (Neutral Density) filter or a liquid crystal light control element instead of changing the aperture diaphragm diameter in order to adjust an amount of light.

Furthermore, by performing electric image processing, the diameters of the lenses in the first lens group decrease, and thus it is possible to further miniaturize the zoom lens.

Hereinafter, modes for carrying out the disclosure (hereinafter referred to as embodiments) will be described with reference to the accompanying drawings. The description will be given in order of the following items.

1. First Embodiment
2. Second Embodiment
3. Third Embodiment
4. Fourth Embodiment
5. Fifth Embodiment
6. Sixth Embodiment
7. Modified Example (Imaging Apparatus)

In addition, the reference signs and the like shown in the following tables and description are defined as follows. That is, "si" represents an i-th surface which is numbered from the object side. "ri" represents a radius of curvature of the i-th surface which is numbered from the object side. "di" represents an on-axis surface spacing between the i-th surface and the (i+1)th surface. "ni" represents a refractive index of the material of the lens having the i-th surface at the d-line (a wavelength of 587.6 nm). "vi" represents an Abbe number of the material of the lens having the i-th surface at the d-line. In terms of "ri", "INFINITY" represents that the corresponding surface is a flat surface. Further, in terms of "di", "variable" represents that the corresponding space is a variable space. "Fno" represents an F number. "ω" represents a half angle of view.

Some lenses used in the Numerical Example are configured so that the lens surface is formed to be aspheric. Assuming that the vertex of the surface is the origin, the direction of the optical axis is the X axis, and the height in the direction perpendicular to the optical axis is h, the aspheric surface shape is represented by the following expression.

$$X = \frac{h^2/R}{1 + \sqrt{1 - (1+K)h^2/R^2}} + \sum A_i h^i$$

Here, Ai represents an i-th order aspheric surface coefficient, R represents a radius of curvature, and K represents a conic constant.

In any one of the zoom lenses according to the first to sixth embodiments to be described later, the first to fifth lens groups (GR1 to GR5) are arranged in order from the object side to the image side. The first lens group GR1 is a lens group with a positive refractive power. The second lens group GR2 is a lens group with a negative refractive power. The third lens group GR3 is a lens group with a positive refractive power. The fourth lens group GR4 is a lens group with a positive refractive power. The fifth lens group GR5 as a final lens group is a lens group with a positive refractive power.

Further, in the zoom lenses according to the first to sixth embodiments, when the position state of the lens is changed from wide-angle end state to the telephoto end state, the second lens group GR2 moves toward the image side in the direction of the optical axis, and the fourth lens group GR4 moves on the optical axis. Furthermore, in the zoom lenses according to the first to sixth embodiments, when the position of the object is changed, by moving the fourth lens group GR4 in the direction of the optical axis, near focusing is performed.

In the first to sixth embodiments, the fifth lens group GR5 includes, in order from the object side to the image side: the partial lens group GF that has a large negative refractive power; the partial lens group GS that has a large positive refractive power; and the partial lens group GR that has a small positive refractive power. The refractive powers of the lenses depend on the radii of curvature of the lenses, the center thicknesses thereof, the refractive indices of their own materials. Since the partial lens group GF has a large negative refractive power, it is possible to make the rays, which are incident to the partial lens group GS, be in a substantially a focal state. Thus, it is possible to decrease aberrations at the time of shake correction.

Here, in the zoom lenses according to the first to sixth embodiments, the shake correction coefficient B is represented by the following expression.

$$B = (1 - \beta S) \times \beta R$$

Here, βS is a lateral magnification of the partial lens group GS, and βR is a lateral magnification of the partial lens group GR. When the shake correction coefficient B is intended to be large, it is preferable that βS should be set to be small and βR should be set to be large. That is, the positive refractive power of the partial lens group GS is set to be large, the positive refractive power of the partial lens group GR is set to be small, whereby it is possible to increase the shake correction coefficient B. Further, in order to make the rays, which are incident to the partial lens group GS, be in the substantially a focal state, it is necessary to increase the negative refractive power of the partial lens group GF.

That is, with such a configuration, by improving the shake correction coefficient, it is possible to secure a sufficient anti-vibration angle. In addition, the partial lens group GF has a single lens which is biconcave, and the partial lens group GS has a single lens which is biconvex, whereby it is possible to achieve sufficient miniaturization.

Then, in the zoom lenses according to the first to sixth embodiments, by shifting the partial lens group GS in the direction substantially perpendicular to the optical axis, image blur is corrected. By performing the image blur correction through the partial lens group GS in the fifth lens group GR5 as the final lens group, it is possible to easily arrange the anti-vibration driving mechanism and obtain high imaging performance even at the time of the image blur correction.

1. First Embodiment

Configuration of Zoom Lens

FIG. 1 is a diagram illustrating an exemplary configuration of a zoom lens according to a first embodiment of the disclosure. The dotted arrows on the lower part of the drawing represent positions of the respective lens groups changed during changing from the wide-angle end to the telephoto end as the arrow moves from the upper side to the lower side of the drawing. It is the same for the other embodiments.

The first lens group GR1 includes, in order from the object side to the image side: a negative lens G1; a cemented lens which is formed by cementing a positive lens G2, a negative lens G3, and a positive lens G4; and a positive lens G5 of which one image side surface is formed to be aspheric.

The second lens group GR2 includes, in order from the object side to the image side: a negative lens G6 of which both surfaces are formed to be aspheric; and a cemented lens which is formed by cementing a negative lens G7 and a positive lens G8.

The third lens group GR3 includes, in order from the object side to the image side: a positive lens G9 of which both surfaces are formed to be aspheric; and a cemented lens which is formed by cementing a positive lens G10 and a negative lens G11.

The fourth lens group GR4 includes a positive lens G12 of which both surfaces are formed to be aspheric.

The fifth lens group GR5 includes, in order from the object side to the image side: a negative lens G13 of which both surfaces are formed to be aspheric; a positive lens G14 of which both surfaces are formed to be aspheric; and a positive lens G15 of which one image side surface is formed to be aspheric. The negative lens G13 corresponds to the partial lens group GF with a large negative refractive power. The positive lens G14 corresponds to the partial lens group GS with a large positive refractive power. The positive lens G15 corresponds to the partial lens group GR with a small positive refractive power.

On the object side of the third lens group GR3, an aperture diaphragm IR is disposed at a position close to the third lens group GR3. The position of the aperture diaphragm IR is the aperture diaphragm surface s14. A low-pass filter LPF is disposed between the fifth lens group GR5 and an image plane IMG.

Specification of Zoom Lens

Table 1 shows lens data of Numerical Example 1 in which specific numerical values are applied to the zoom lens according to the first embodiment. In Numerical Example 1, it is assumed that the partial lens group GS is made of plastic. The plastic is lighter than glass in specific gravity, and is thus advantageous in terms of weight.

TABLE 1

| si | ri | di | ni | vi |
|---|---|---|---|---|
| 1 | r1 = −19.1606 | d1 = 0.287 | n1 = 2.00100 | v1 = 29.1 |
| 2 | r2 = 80.3153 | d2 = 0.214 | | |
| 3 | r3 = −58.9991 | d3 = 1.277 | n3 = 1.59282 | v3 = 68.6 |
| 4 | r4 = −4.7996 | d4 = 0.303 | n4 = 1.90366 | v4 = 31.3 |
| 5 | r5 = −33.1179 | d5 = 0.800 | n5 = 1.72916 | v5 = 54.7 |
| 6 | r6 = −7.2805 | d6 = 0.048 | | |
| 7 | r7 = 7.1434 | d7 = 0.872 | n7 = 1.85135 | v7 = 40.1 |
| 8 | r8 = −32.0626 | d8 = VARIABLE | | |
| 9 | r9 = −38.3212 | d9 = 0.208 | n9 = 1.88202 | v9 = 37.2 |
| 10 | r10 = 2.0542 | d10 = 0.464 | | |
| 11 | r11 = −2.4133 | d11 = 0.144 | n11 = 1.88300 | v11 = 40.8 |
| 12 | r12 = 3.0122 | d12 = 0.486 | n12 = 1.94595 | v12 = 18.0 |
| 13 | r13 = −7.9896 | d13 = VARIABLE | | |
| 14 | r14 = INFINITY | d14 = 0.495 | | APERTURE DIAPHRAGM |
| 15 | r15 = 3.6892 | d15 = 0.767 | n15 = 1.88202 | v15 = 37.2 |
| 16 | r16 = −7.9507 | d16 = 0.224 | | |
| 17 | r17 = 4.1823 | d17 = 0.744 | n17 = 1.48749 | v17 = 70.4 |
| 18 | r18 = −4.0352 | d18 = 0.144 | n18 = 2.00060 | v18 = 25.5 |
| 19 | r19 = 3.3975 | d19 = VARIABLE | | |
| 20 | r20 = 2.6620 | d20 = 0.677 | n20 = 1.55332 | v20 = 71.7 |
| 21 | r21 = −3.9843 | d21 = VARIABLE | | |
| 22 | r22 = −3.4775 | d22 = 0.224 | n22 = 1.88202 | v22 = 37.2 |
| 23 | r23 = 2.3331 | d23 = 0.447 | | |
| 24 | r24 = 2.0237 | d24 = 1.455 | n24 = 1.53460 | v24 = 56.3 |
| 25 | r25 = −2.0641 | d25 = 0.316 | | |
| 26 | r26 = −7.6599 | d26 = 0.479 | n26 = 1.53460 | v26 = 56.3 |
| 27 | r27 = −2.8741 | d27 = 0.435 | | |
| 28 | r28 = INFINITY | d28 = 0.540 | n28 = 1.51680 | v28 = 64.2 |
| 29 | r29 = INFINITY | d29 = 0.255 | | |

In the zoom lens according to the first embodiment, the surfaces s8 to s10, s15, s16, s20 to s25, and s27 are formed to be aspheric. The surface s8 is an image side surface of the positive lens G5 of the first lens group GR1. The surface s9 is an object side surface of the negative lens G6 of the second lens group GR2. The surface s10 is an image side surface of the negative lens G6 of the second lens group GR2. The surface s15 is an object side surface of the positive lens G9 of the third lens group GR3. The surface s16 is an image side surface of the positive lens G9 of the third lens group GR3. The surface s20 is an object side surface of the positive lens G12 of the fourth lens group GR4. The surface s21 is an image side surface of the positive lens G12 of the fourth lens group GR4. The surface s22 is an object side surface of the negative lens G13 of the fifth lens group GR5. The surface s23 is an image side surface of the negative lens G13 of the fifth lens group GR5. The surface s24 is an object side surface of the positive lens G14 of the fifth lens group GR5. The surface s25 is an image side surface of the positive lens G14 of the fifth lens group GR5. The surface s27 is an image side surface of the positive lens G15 of the fifth lens group GR5.

Table 2 shows the 4th-order, 6th-order, 8th-order, and 10th-order aspheric surface coefficients A4, A6, A8, and A10 of the aspheric surfaces together with the conic constant K in Numerical Example 1 of the zoom lens according to the first embodiment.

In Table 2 and the respective tables showing the aspheric surface coefficients to be described later, the reference sign "E-i" represents an exponential expression having a base of 10, that is, "$10^{-i}$". For example, "0.12345E−05" represents "$0.12345 \times 10^{-5}$".

TABLE 2

| si | K | $A_4$ | $A_6$ | $A_8$ | $A_{10}$ |
|---|---|---|---|---|---|
| 8  | 0 |  4.84185E−04 | −7.30657E−06 | −1.89960E−07 |  2.46552E−08 |
| 9  | 0 | −1.92177E−02 |  2.86840E−02 | −9.07830E−03 |  0.00000E+00 |
| 10 | 0 | −3.04466E−02 |  2.69806E−02 |  1.80995E−02 | −1.26046E−02 |
| 15 | 0 | −4.98834E−03 |  1.12802E−03 |  0.00000E+00 |  0.00000E+00 |
| 16 | 0 | −2.82963E−03 |  2.20819E−03 | −2.53557E−04 |  1.48778E−05 |
| 20 | 0 | −1.15713E−03 |  8.72308E−03 |  0.00000E+00 |  0.00000E+00 |
| 21 | 0 |  1.01814E−02 |  2.78019E−03 |  4.39223E−03 | −1.43377E−03 |
| 22 | 0 | −4.85768E−02 |  5.52253E−02 |  0.00000E+00 |  0.00000E+00 |
| 23 | 0 | −1.01460E−01 |  7.62273E−02 | −2.34659E−02 |  1.44526E−02 |
| 24 | 0 | −2.42722E−02 |  4.72927E−02 | −1.79768E−03 |  3.04912E−06 |
| 25 | 0 |  5.95776E−02 | −3.33092E−03 |  1.54207E−05 |  1.08795E−04 |
| 27 | 0 |  5.98079E−02 | −5.85830E−03 |  5.70440E−03 | −5.12280E−03 |

In the zoom lens according to the first embodiment, the on-axis surface spacings d8, d13, d19, and d21 change during zooming between the wide-angle end state and the telephoto end state. The on-axis surface spacing d8 is an on-axis surface spacing between the first lens group GR1 and the second lens group GR2. The on-axis surface spacing d13 is an on-axis surface spacing between the second lens group GR2 and the aperture diaphragm IR. The on-axis surface spacing d19 is an on-axis surface spacing between the third lens group GR3 and the fourth lens group GR4. The on-axis surface spacing d21 is an on-axis surface spacing between the fourth lens group GR4 and the fifth lens group GR5. Table 3 shows the variable spaces of the on-axis surface spacings in the wide-angle end state (focal length=1.00), the middle focus position state (focal length=3.53), and the telephoto end state (focal length=12.44) together with the F number Fno and the half angle of view ω in Numerical Example 1.

TABLE 3

|  | WIDE-ANGLE END | MIDDLE POSITION | TELEPHOTO END |
|---|---|---|---|
| FOCAL LENGTH | 1.00 | 3.53 | 12.44 |
| Fno | 1.85 | 2.72 | 3.48 |
| ω (DEGREE) | 36.97 | 10.48 | 2.96 |
| d8 | 0.224 | 3.369 | 5.294 |
| d13 | 5.518 | 2.372 | 0.447 |
| d19 | 1.726 | 0.798 | 1.011 |
| d21 | 0.695 | 1.623 | 1.410 |

Aberration of Zoom Lens

FIGS. 2A to 7C show diagrams of various aberrations of Numerical Example 1. FIGS. 2A to 2C are diagrams illustrating spherical aberration, astigmatism, and distortion when the focus is at infinity in the wide-angle end state (focal length=1.00). FIGS. 3A to 3C are diagrams illustrating lateral aberration when the focus is at infinity in the wide-angle end state (focal length=1.00). FIGS. 4A to 4C are diagrams illustrating spherical aberration, astigmatism, and distortion when the focus is at infinity in the middle focus position state (focal length=3.53). FIGS. 5A to 5C are diagrams illustrating lateral aberration when the focus is at infinity in the middle focus position state (focal length=3.53). FIGS. 6A to 6C are diagrams illustrating spherical aberration, astigmatism, and distortion when the focus is at infinity in the telephoto end state (focal length=12.44). FIGS. 7A to 7C are diagrams illustrating lateral aberration when the focus is at infinity in the telephoto end state (focal length=12.44).

Figure 6C:
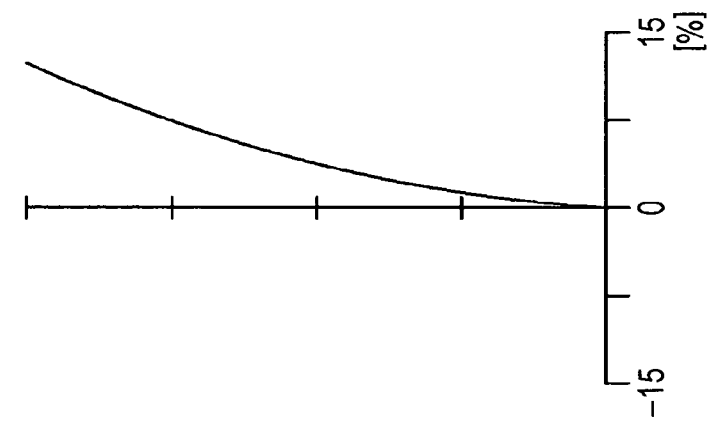
FIGS. 6A to 6C are diagrams illustrating spherical aberration, astigmatism, and distortion when the focus is at infinity in the telephoto end state according to the first embodiment of the disclosure.
Figure 6B:
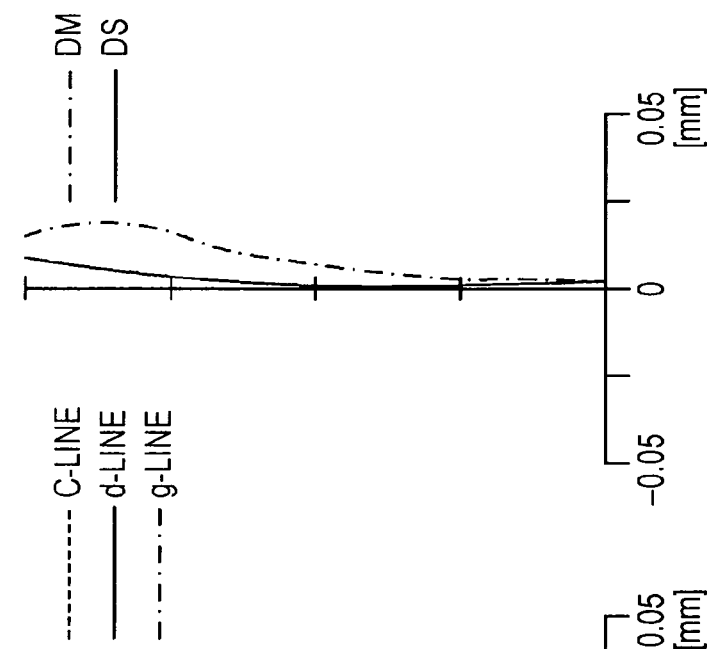
Figure 6A:
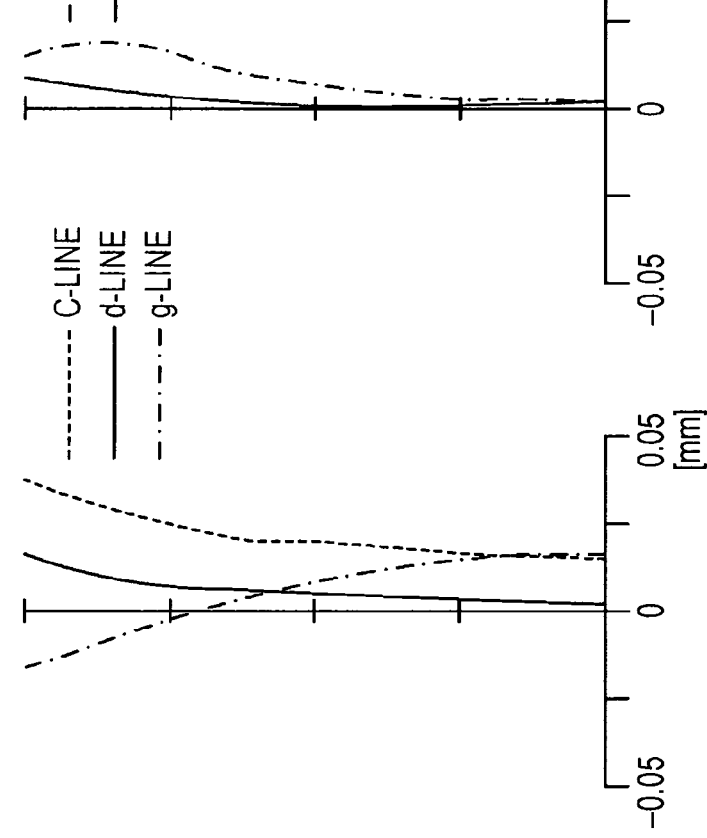
Figure 10A:
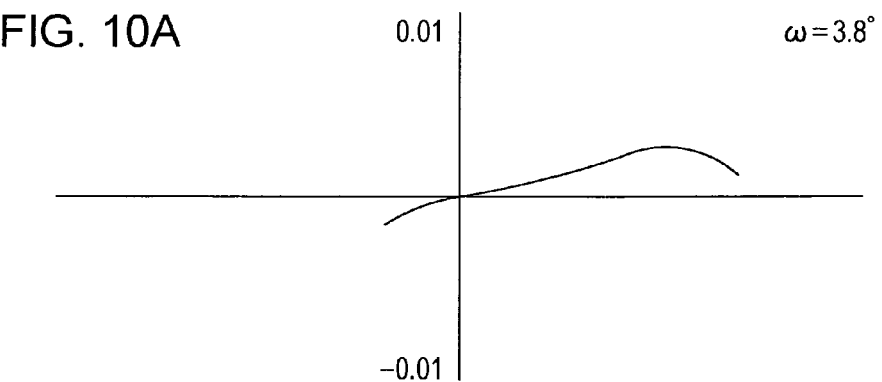
FIGS. 10A to 10C are diagrams illustrating lateral aberration in the telephoto end state according to the first embodiment of the disclosure.
Figure 10B:
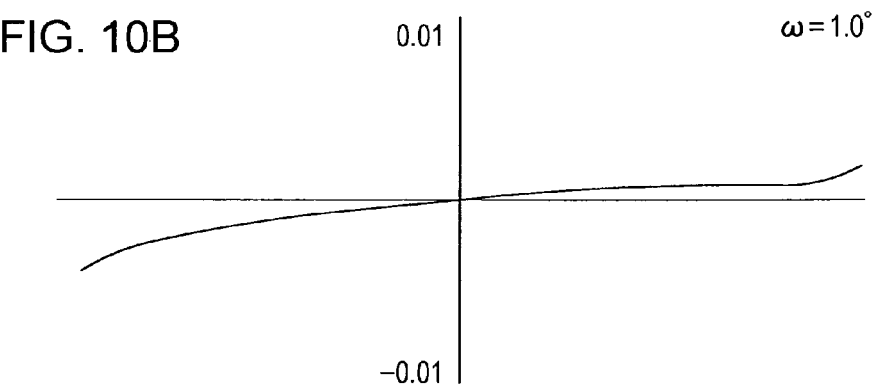
Figure 10C:

In the spherical aberration diagrams of FIGS. 2A, 4A, and 6A, the vertical axis represents a ratio of the spherical aberration to the open F number, and the horizontal axis represents the defocus. In addition, the solid line represents a value at the d-line (a wavelength of 587.6 nm), the chain line represents a value at the g-line (a wavelength of 435.8 nm), and the dotted line represents a value at the C-line (a wavelength of 656.3 nm). In the astigmatism diagrams of FIGS. 2B, 4B, and 6B, the vertical axis represents the angle of view, and the horizontal axis represents the defocus. In addition, the solid line represents a value on a sagittal image plane, and the dashed line represents a value on a meridional image plane. In the distortion diagrams of FIGS. 2C, 4C, and 6C, the vertical axis represents the angle of view, and the horizontal axis represents %. In the lateral aberration diagrams of FIGS. 3A to 3C, 5A to 5C, and 7A to 7C, ω represents the half angle of view. In addition, it is the same for diagrams of the various aberrations to be described later.

FIGS. 8A to 10O respectively show lateral aberrations in the lens shift state corresponding to 1.0° when the focus is at infinity in Numerical Example 1. Here, FIGS. 8A to 8C are diagrams illustrating lateral aberration in the wide-angle end state (focal length=1.00), FIGS. 9A to 9C are diagrams illustrating lateral aberration in the middle focal length state (focal length=3.53), and FIGS. 10A to 10C are diagrams illustrating lateral aberration in the telephoto end state (focal length=12.44). In the lateral aberration diagrams, ω represents the half angle of view. In addition, it is the same for diagrams of the various aberrations to be described later.

As can be clearly seen from the aberration diagrams, the various aberrations are satisfactorily corrected in Numerical Example 1, and imaging performance is excellent even in the hand shake correction state corresponding to about 1.0°.

2. Second Embodiment

Configuration of Zoom Lens

FIG. 11 is a diagram illustrating an exemplary configuration of a zoom lens according to a second embodiment of the disclosure.

The first lens group GR1 includes, in order from the object side to the image side: a negative lens G1; a cemented lens which is formed by cementing a positive lens G2, a negative lens G3, and a positive lens G4; and a positive lens G5 of which one image side surface is formed to be aspheric.

The second lens group GR2 includes, in order from the object side to the image side: a negative lens G6 of which both surfaces are formed to be aspheric; and a cemented lens which is formed by cementing a negative lens G7 and a positive lens G8.

The third lens group GR3 includes, in order from the object side to the image side: a positive lens G9 of which both surfaces are formed to be aspheric; and a cemented lens which is formed by cementing a positive lens G10 and a negative lens G11.

The fourth lens group GR4 includes a positive lens G12 of which both surfaces are formed to be aspheric.

The fifth lens group GR5 includes, in order from the object side to the image side: a negative lens G13 of which both surfaces are formed to be aspheric; a positive lens G14 of which both surfaces are formed to be aspheric; and a positive lens G15 of which one image side surface is formed to be aspheric. The negative lens G13 corresponds to the partial lens group GF with a large negative refractive power. The positive lens G14 corresponds to the partial lens group GS with a large positive refractive power. The positive lens G15 corresponds to the partial lens group GR with a small positive refractive power.

On the object side of the third lens group GR3, an aperture diaphragm IR is disposed at a position close to the third lens group GR3. The position of the aperture diaphragm IR is the aperture diaphragm surface s14. A low-pass filter LPF is disposed between the fifth lens group GR5 and an image plane IMG.

Specification of Zoom Lens

Table 4 shows lens data of Numerical Example 2 in which specific numerical values are applied to the zoom lens according to the second embodiment.

TABLE 4

| si | ri | di | ni | vi |
|---|---|---|---|---|
| 1 | r1 = −20.1326 | d1 = 0.302 | n1 = 2.00100 | v1 = 29.1 |
| 2 | r2 = 15.6357 | d2 = 0.625 | | |
| 3 | r3 = 11.2793 | d3 = 1.199 | n3 = 1.49700 | v3 = 81.6 |
| 4 | r4 = −10.8387 | d4 = 0.309 | n4 = 1.90366 | v4 = 31.3 |
| 5 | r5 = 33.5544 | d5 = 0.853 | n5 = 1.72916 | v5 = 54.7 |
| 6 | r6 = −9.7737 | d6 = 0.050 | | |
| 7 | r7 = 7.1221 | d7 = 0.903 | n7 = 1.85135 | v7 = 40.1 |
| 8 | r8 = −30.7160 | d8 = VARIABLE | | |
| 9 | r9 = −33.5544 | d9 = 0.218 | n9 = 1.88202 | v9 = 37.2 |
| 10 | r10 = 2.1367 | d10 = 0.518 | | |
| 11 | r11 = −2.4690 | d11 = 0.151 | n11 = 1.88300 | v11 = 40.8 |
| 12 | r12 = 3.1687 | d12 = 0.529 | n12 = 1.94595 | v12 = 18.0 |
| 13 | r13 = −8.2975 | d13 = VARIABLE | | |
| 14 | r14 = INFINITY | d14 = 0.520 | | APERTURE DIAPHRAGM |
| 15 | r15 = 3.7919 | d15 = 0.814 | n15 = 1.88202 | v15 = 37.2 |
| 16 | r16 = −7.7437 | d16 = 0.177 | | |

In the zoom lens according to the second embodiment, the surfaces s8 to s10, s15, s16, s20 to s25, and s27 are formed to be aspheric. The surface s8 is an image side surface of the positive lens G5 of the first lens group GR1. The surface s9 is an object side surface of the negative lens G6 of the second lens group GR2. The surface s10 is an image side surface of the negative lens G6 of the second lens group GR2. The surface s15 is an object side surface of the positive lens G9 of the third lens group GR3. The surface s16 is an image side surface of the positive lens G9 of the third lens group GR3. The surface s20 is an object side surface of the positive lens G12 of the fourth lens group GR4. The surface s21 is an image side surface of the positive lens G12 of the fourth lens group GR4. The surface s22 is an object side surface of the negative lens G13 of the fifth lens group GR5. The surface s23 is an image side surface of the negative lens G13 of the fifth lens group GR5. The surface s24 is an object side surface of the positive lens G14 of the fifth lens group GR5. The surface s25 is an image side surface of the positive lens G14 of the fifth lens group GR5. The surface s27 is an image side surface of the positive lens G15 of the fifth lens group GR5.

Table 5 shows the 4th-order, 6th-order, 8th-order, and 10th-order aspheric surface coefficients A4, A6, A8, and A10 of the aspheric surfaces together with the conic constant K in Numerical Example 2 of the zoom lens according to the second embodiment.

TABLE 5

| si | K | $A_4$ | $A_6$ | $A_8$ | $A_{10}$ |
|---|---|---|---|---|---|
| 8 | 0 | 6.20808E−04 | −9.08694E−06 | −5.73246E−08 | 1.71902E−08 |
| 9 | 0 | −8.51912E−03 | 1.59740E−02 | −4.84542E−03 | 0.00000E+00 |
| 10 | 0 | −1.92596E−02 | 2.07121E−02 | 8.46565E−03 | −6.48639E−03 |
| 15 | 0 | −3.51680E−03 | 6.43804E−04 | 0.00000E+00 | 0.00000E+00 |
| 16 | 0 | −6.14335E−04 | 1.15427E−03 | −7.87652E−05 | −3.70779E−06 |
| 20 | 0 | −6.20378E−03 | 2.31708E−03 | 0.00000E+00 | 0.00000E+00 |
| 21 | 0 | 1.09055E−02 | −2.39663E−03 | 2.76459E−03 | −7.05716E−04 |
| 22 | 0 | 6.82382E−03 | 1.56736E−02 | 0.00000E+00 | 0.00000E+00 |
| 23 | 0 | −3.75023E−02 | 3.01747E−02 | −1.08127E−02 | 4.78843E−03 |
| 24 | 0 | −2.36770E−02 | 2.85354E−03 | −1.02162E−03 | 4.95336E−05 |
| 25 | 0 | 4.90590E−02 | −3.71387E−03 | 4.03228E−04 | 1.77149E−04 |
| 27 | 0 | 5.26944E−02 | −2.10062E−02 | 1.70493E−02 | −6.17171E−03 |

TABLE 4-continued

| si | ri | di | ni | vi |
|---|---|---|---|---|
| 17 | r17 = 4.6539 | d17 = 0.760 | n17 = 1.48749 | v17 = 70.4 |
| 18 | r18 = −4.3680 | d18 = 0.151 | n18 = 2.00060 | v18 = 25.5 |
| 19 | r19 = 3.7534 | d19 = VARIABLE | | |
| 20 | r20 = 3.0015 | d20 = 0.697 | n20 = 1.55332 | v20 = 71.7 |
| 21 | r21 = −4.3077 | d21 = VARIABLE | | |
| 22 | r22 = −3.0864 | d22 = 0.235 | n22 = 1.88202 | v22 = 37.2 |
| 23 | r23 = 2.7088 | d23 = 0.470 | | |
| 24 | r24 = 2.1139 | d24 = 1.579 | n24 = 1.55332 | v24 = 71.7 |
| 25 | r25 = −2.1499 | d25 = 0.327 | | |
| 26 | r26 = −16.7772 | d26 = 0.649 | n26 = 1.68893 | v26 = 31.2 |
| 27 | r27 = −4.2346 | d27 = 0.319 | | |
| 28 | r28 = INFINITY | d28 = 0.567 | n28 = 1.51680 | v28 = 64.2 |
| 29 | r29 = INFINITY | d29 = 0.268 | | |

In the zoom lens according to the second embodiment, the on-axis surface spacings d8, d13, d19, and d21 change during zooming between the wide-angle end state and the telephoto end state. The on-axis surface spacing d8 is an on-axis surface spacing between the first lens group GR1 and the second lens group GR2. The on-axis surface spacing d13 is an on-axis surface spacing between the second lens group GR2 and the aperture diaphragm IR. The on-axis surface spacing d19 is an on-axis surface spacing between the third lens group GR3 and the fourth lens group GR4. The on-axis surface spacing d21 is an on-axis surface spacing between the fourth lens group GR4 and the fifth lens group GR5. Table 6 shows the variable spaces of the on-axis surface spacings in the wide-angle end state (focal length=1.00), the middle focus position state (focal length=3.65), and the telephoto end state (focal length=13.33) together with the F number Fno and the half angle of view ω in Numerical Example 2.

TABLE 6

|  | WIDE-ANGLE END | MIDDLE POSITION | TELEPHOTO END |
| --- | --- | --- | --- |
| FOCAL LENGTH | 1.00 | 3.65 | 13.33 |
| Fno | 1.86 | 2.77 | 3.51 |
| ω (DEGREE)' | 38.28 | 10.45 | 2.86 |
| d8 | 0.235 | 3.472 | 5.419 |
| d13 | 5.654 | 2.417 | 0.470 |
| d19 | 1.704 | 0.737 | 1.348 |
| d21 | 0.719 | 1.686 | 1.075 |

Aberration of Zoom Lens

FIGS. 12A to 17C show diagrams of various aberrations of Numerical Example 2. FIGS. 12A to 12C are diagrams illustrating spherical aberration, astigmatism, and distortion when the focus is at infinity in the wide-angle end state (focal length=1.00). FIGS. 13A to 13C are diagrams illustrating lateral aberration when the focus is at infinity in the wide-angle end state (focal length=1.00). FIGS. 14A to 14C are diagrams illustrating spherical aberration, astigmatism, and distortion when the focus is at infinity in the middle focus position state (focal length=3.65). FIGS. 15A to 15C are diagrams illustrating lateral aberration when the focus is at infinity in the middle focus position state (focal length=3.65). FIGS. 16A to 16C are diagrams illustrating spherical aberration, astigmatism, and distortion when the focus is at infinity in the telephoto end state (focal length=13.33). FIGS. 17A to 17C are diagrams illustrating lateral aberration when the focus is at infinity in the telephoto end state (focal length=13.33).

FIGS. 18A to 20C respectively show lateral aberrations in the lens shift state corresponding to 1.0° when the focus is at infinity in Numerical Example 2. Here, FIGS. 18A to 18C are diagrams illustrating lateral aberration in the wide-angle end state (focal length=1.00), FIGS. 19A to 19C are diagrams illustrating lateral aberration in the middle focal length state (focal length=3.65), and FIGS. 20A to 20C are diagrams illustrating lateral aberration in the telephoto end state (focal length=13.33).

As can be clearly seen from the aberration diagrams, the various aberrations are satisfactorily corrected in Numerical Example 2, and imaging performance is excellent even in the hand shake correction state corresponding to about 1.0°.

3. Third Embodiment

Configuration of Zoom Lens

Figure 21:
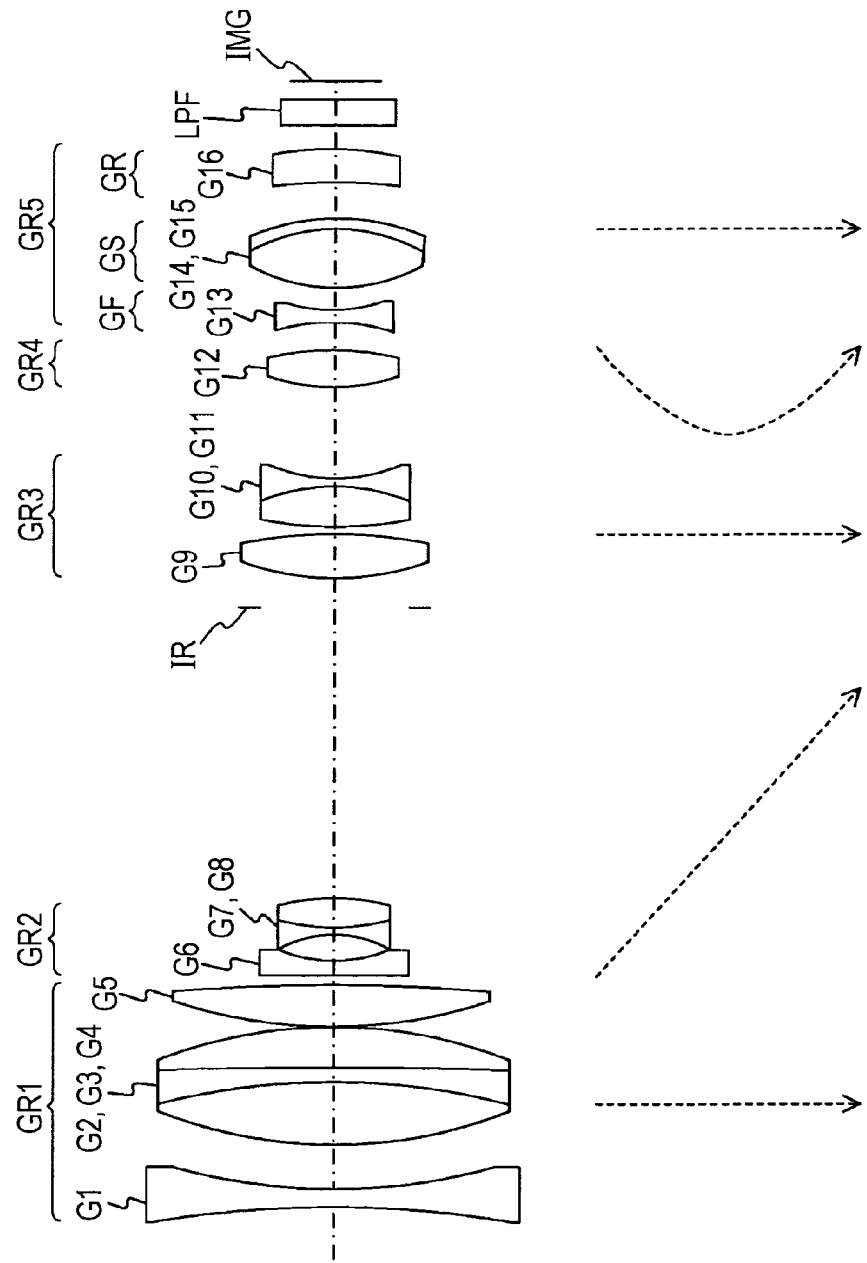
FIG. 21 is a diagram illustrating an exemplary configuration of a zoom lens according to a third embodiment of the disclosure.
Figure 25A:
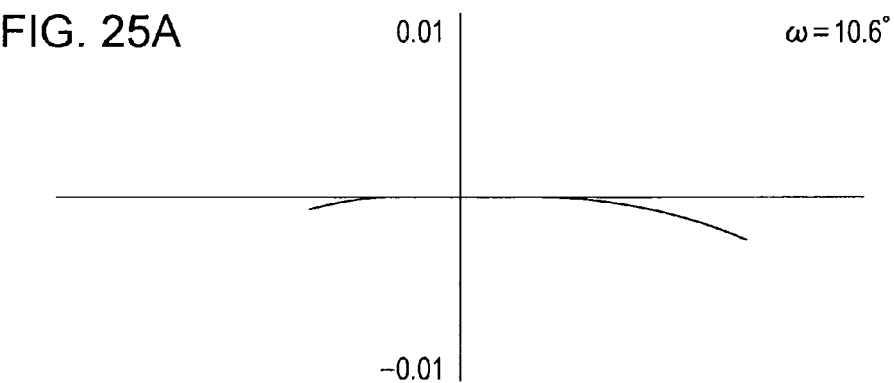
FIGS. 25A to 25C are diagrams illustrating lateral aberration when the focus is at infinity in the middle focus position state according to the third embodiment of the disclosure.
Figure 25B:
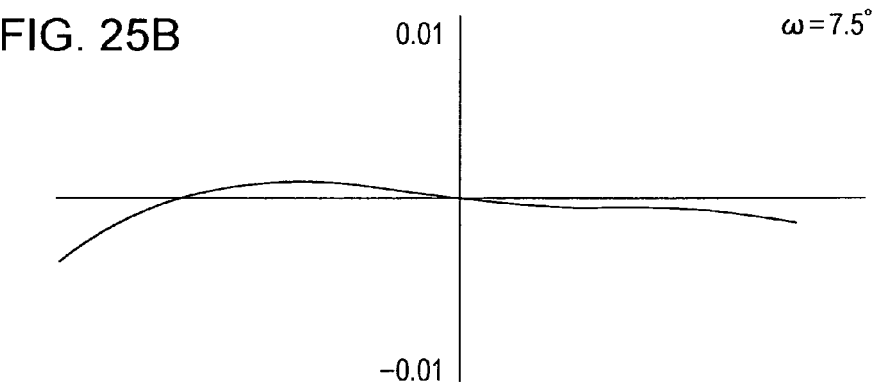
Figure 25C:
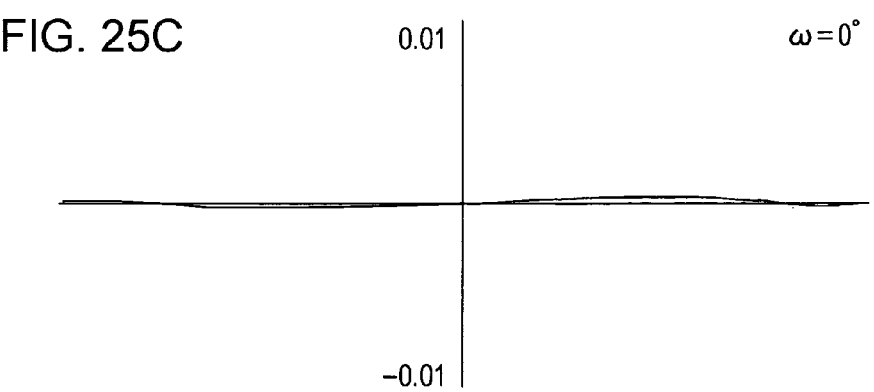
Figure 26C:
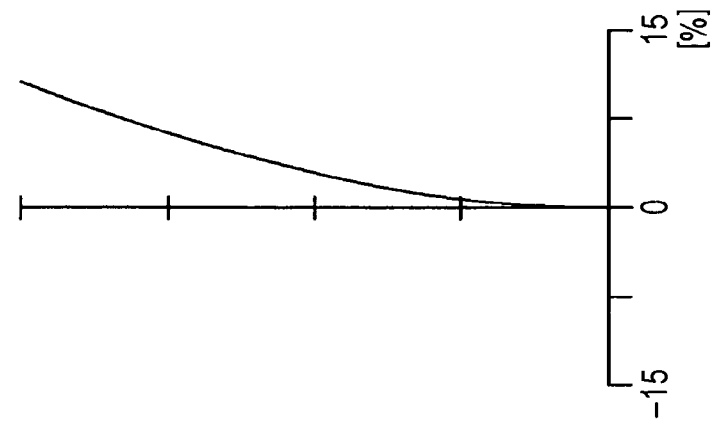
FIGS. 26A to 26C are diagrams illustrating spherical aberration, astigmatism, and distortion when the focus is at infinity in the telephoto end state according to the third embodiment of the disclosure.
Figure 26B:
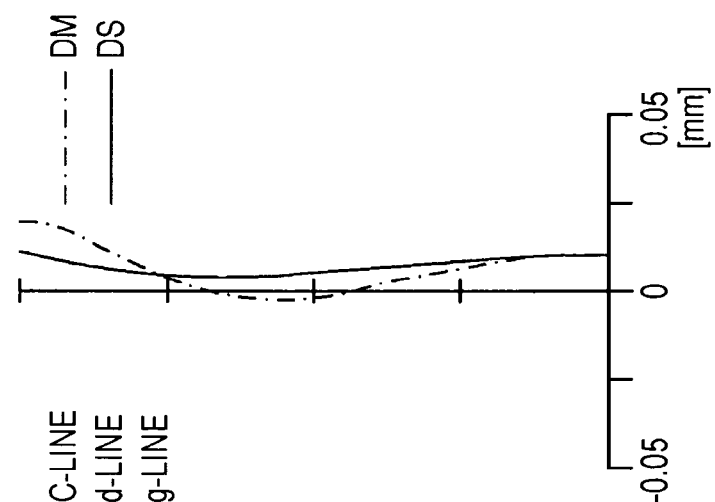
Figure 26A:
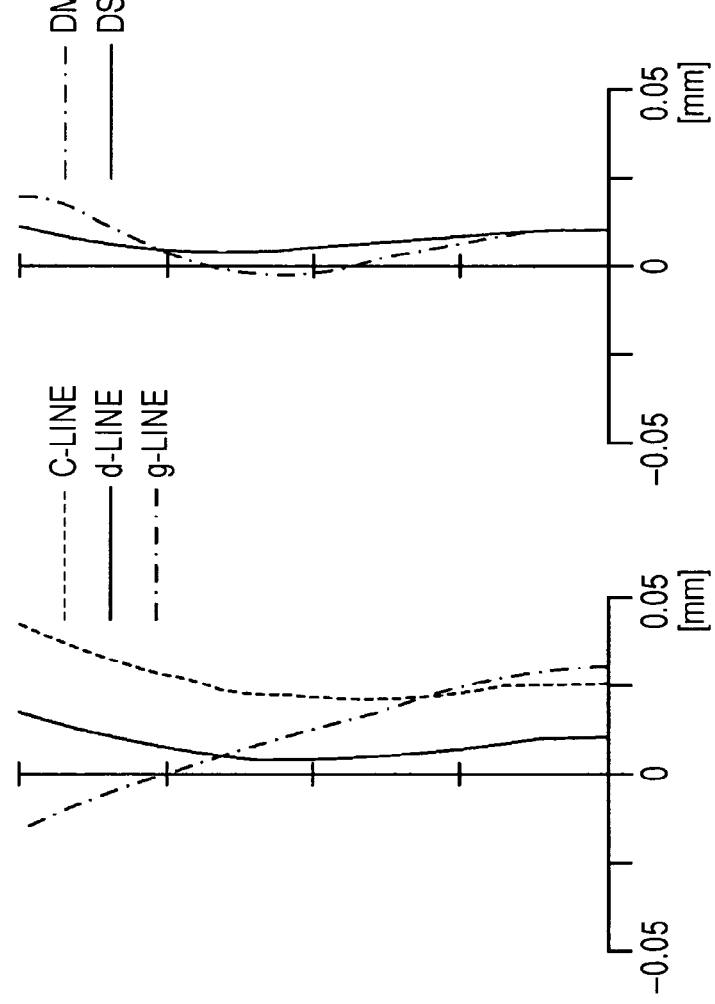

FIG. 21 is a diagram illustrating an exemplary configuration of a zoom lens according to a third embodiment of the disclosure.

The first lens group GR1 includes, in order from the object side to the image side: a negative lens G1; a cemented lens which is formed by cementing a positive lens G2, a negative lens G3, and a positive lens G4; and a positive lens G5 of which one image side surface is formed to be aspheric.

The second lens group GR2 includes, in order from the object side to the image side: a negative lens G6 of which both surfaces are formed to be aspheric; and a cemented lens which is formed by cementing a negative lens G7 and a positive lens G8.

The third lens group GR3 includes, in order from the object side to the image side: a positive lens G9 of which both surfaces are formed to be aspheric; and a cemented lens which is formed by cementing a positive lens G10 and a negative lens G11.

The fourth lens group GR4 includes a positive lens G12 of which both surfaces are formed to be aspheric.

The fifth lens group GR5 includes, in order from the object side to the image side, a negative lens G13, of which both surfaces are formed to be aspheric; a cemented lens which is formed by cementing a negative lens G15 and a positive lens G14 of which one object side surface is formed to be aspheric; and a positive lens G16 of which one image side surface is formed to be aspheric. The negative lens G13 corresponds to the partial lens group GF with a large negative refractive power. The cemented lens G14 and G15 corresponds to the partial lens group GS with a large positive refractive power. In the third embodiment, by using the cemented lenses G14 and G15 as a partial lens group GS, it is possible to decrease chromatic aberration. The positive lens G16 corresponds to the partial lens group GR with a small positive refractive power.

On the object side of the third lens group GR3, an aperture diaphragm IR is disposed at a position close to the third lens group GR3. The position of the aperture diaphragm IR is the aperture diaphragm surface s14. A low-pass filter LPF is disposed between the fifth lens group GR5 and an image plane IMG.

Specification of Zoom Lens

Table 7 shows lens data of Numerical Example 3 in which specific numerical values are applied to the zoom lens according to the third embodiment.

TABLE 7

| si | ri | di | ni | vi |
| --- | --- | --- | --- | --- |
| 1 | r1 = −23.0876 | d1 = 0.369 | n1 = 2.00100 | v1 = 29.1 |
| 2 | r2 = 10.7436 | d2 = 0.766 | | |
| 3 | r3 = 8.3885 | d3 = 1.248 | n3 = 1.49700 | v3 = 81.6 |
| 4 | r4 = −14.9748 | d4 = 0.309 | n4 = 2.00060 | v4 = 25.5 |
| 5 | r5 = −108.0341 | d5 = 0.671 | n5 = 1.72916 | v5 = 54.7 |
| 6 | r6 = −9.7869 | d6 = 0.050 | | |
| 7 | r7 = 7.4962 | d7 = 0.854 | n7 = 1.85135 | v7 = 40.1 |
| 8 | r8 = −34.1626 | d8 = VARIABLE | | |
| 9 | r9 = −33.5539 | d9 = 0.218 | n9 = 1.88202 | v9 = 37.2 |
| 10 | r10 = 2.2944 | d10 = 0.490 | | |
| 11 | r11 = −2.6256 | d11 = 0.151 | n11 = 1.88300 | v11 = 40.8 |
| 12 | r12 = 2.6692 | d12 = 0.523 | n12 = 1.94595 | v12 = 18.0 |
| 13 | r13 = −14.6013 | d13 = VARIABLE | | |
| 14 | r14 = INFINITY | d14 = 0.520 | | APERTURE DIAPHRAGM |
| 15 | r15 = 4.3757 | d15 = 0.795 | n15 = 1.88202 | v15 = 37.2 |
| 16 | r16 = −7.5001 | d16 = 0.101 | | |
| 17 | r17 = 4.8761 | d17 = 0.892 | n17 = 1.49700 | v17 = 81.6 |
| 18 | r18 = −3.3129 | d18 = 0.151 | n18 = 2.00100 | v18 = 29.1 |
| 19 | r19 = 5.2314 | d19 = VARIABLE | | |
| 20 | r20 = 3.0224 | d20 = 0.716 | n20 = 1.55332 | v20 = 71.7 |
| 21 | r21 = −3.9310 | d21 = VARIABLE | | |
| 22 | r22 = −4.7496 | d22 = 0.235 | n22 = 1.88202 | v22 = 37.2 |
| 23 | r23 = 2.3488 | d23 = 0.403 | | |
| 24 | r24 = 2.6862 | d24 = 1.191 | n24 = 1.69350 | v24 = 53.2 |
| 25 | r25 = −2.8881 | d25 = 0.151 | n25 = 1.92286 | v25 = 20.9 |
| 26 | r26 = −3.8935 | d26 = 0.671 | | |
| 27 | r27 = −19.1257 | d27 = 0.661 | n27 = 1.58313 | v27 = 59.5 |
| 28 | r28 = −3.9675 | d28 = 0.426 | | |
| 29 | r29 = INFINITY | d29 = 0.567 | n29 = 1.51680 | v29 = 64.2 |
| 30 | r30 = INFINITY | d30 = 0.268 | | |

In the zoom lens according to the third embodiment, the surfaces s8 to s10, s15, s16, s20 to s24, and s28 are formed to be aspheric. The surface s8 is an image side surface of the positive lens G5 of the first lens group GR1. The surface s9 is an object side surface of the negative lens' G6 of the second lens group GR2. The surface s10 is an image side surface of the negative lens G6 of the second lens group GR2. The surface s15 is an object side surface of the positive lens G9 of the third lens group GR3. The surface s16 is an image side surface of the positive lens G9 of the third lens group GR3. The surface s20 is an object side surface of the positive lens G12 of the fourth lens group GR4. The surface s21 is an image side surface of the positive lens G12 of the fourth lens group GR4. The surface s22 is an object side surface of the negative lens G13 of the fifth lens group GR5. The surface s23 is an image side surface of the negative lens G13 of the fifth lens group GR5. The surface s24 is an object side surface of the positive lens G14 of the fifth lens group GR5. The surface s28 is an image side surface of the positive lens G16 of the fifth lens group GR5.

Table 8 shows the 4th-order, 6th-order, 8th-order, and 10th-order aspheric surface coefficients A4, A6, A8, and A10 of the aspheric surfaces together with the conic constant K in Numerical Example 3 of the zoom lens according to the third embodiment.

TABLE 8

| si | K | $A_4$ | $A_6$ | $A_8$ | $A_{10}$ |
|---|---|---|---|---|---|
| 8  | 0 |  6.24953E−04 | −3.71727E−06 | −3.06231E−07 |  3.39224E−08 |
| 9  | 0 | −1.01490E−03 |  8.77267E−03 | −2.95694E−03 |  0.00000E+00 |
| 10 | 0 | −9.94911E−03 |  1.73167E−02 |  8.98786E−04 | −2.92988E−03 |
| 15 | 0 | −2.78882E−03 |  7.74261E−04 |  0.00000E+00 |  0.00000E+00 |
| 16 | 0 | −1.69391E−03 |  1.04992E−03 |  6.78979E−06 | −1.66932E−05 |
| 20 | 0 | −8.35156E−03 |  3.38207E−03 | −3.57184E−04 |  4.19672E−04 |
| 21 | 0 |  9.45680E−03 |  9.30981E−04 |  1.80279E−04 |  4.66263E−04 |
| 22 | 0 |  1.64707E−02 | −6.87438E−03 |  1.50053E−03 |  5.12418E−03 |
| 23 | 0 | −1.97999E−02 |  1.00321E−02 | −1.66741E−02 |  1.59505E−02 |
| 24 | 0 | −1.86465E−02 |  1.88216E−04 |  4.27601E−04 | −1.56154E−04 |
| 28 | 0 |  7.84114E−02 | −3.22023E−02 |  3.25477E−02 | −1.60098E−02 |

In the zoom lens according to the third embodiment, the on-axis surface spacings d8, d13, d19, and d21 change during zooming between the wide-angle end state and the telephoto end state. The on-axis surface spacing d8 is an on-axis surface spacing between the first lens group GR1 and the second lens group GR2. The on-axis surface spacing d13 is an on-axis surface spacing between the second lens group GR2 and the aperture diaphragm IR. The on-axis surface spacing d19 is an on-axis surface spacing between the third lens group GR3 and the fourth lens group GR4. The on-axis surface spacing d21 is an on-axis surface spacing between the fourth lens group GR4 and the fifth lens group GR5. Table 9 shows the variable spaces of the on-axis surface spacings in the wide-angle end state (focal length=1.00), the middle focus position state (focal length=3.65), and the telephoto end state (focal length=13.33) together with the F number Fno and the half angle of view ω in Numerical Example 3.

TABLE 9

|  | WIDE-ANGLE END | MIDDLE POSITION | TELEPHOTO END |
|---|---|---|---|
| FOCAL LENGTH | 1.00 | 3.65 | 13.33 |
| Fno | 1.84 | 2.70 | 3.39 |
| ω (DEGREE) | 38.51 | 10.60 | 2.92 |
| d8  | 0.235 | 3.478 | 5.423 |
| d13 | 5.657 | 2.414 | 0.470 |
| d19 | 1.673 | 0.757 | 1.194 |
| d21 | 0.568 | 1.483 | 1.047 |

Aberration of Zoom Lens

Figure 27A:
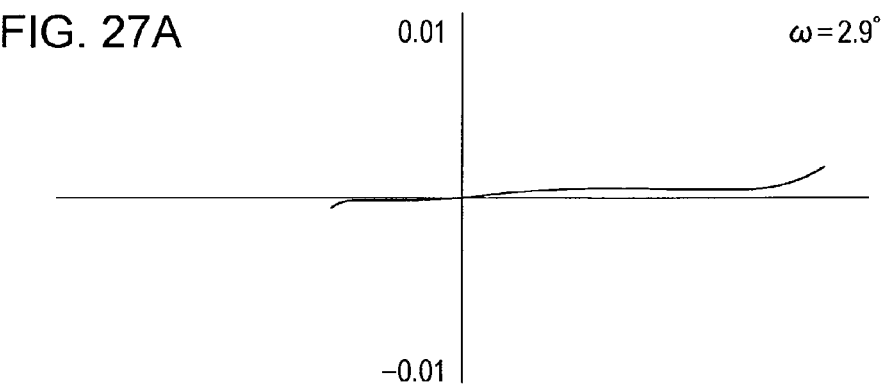
FIGS. 27A to 27C are diagrams illustrating lateral aberration when the focus is at infinity in the telephoto end state according to the third embodiment of the disclosure.
Figure 27B:
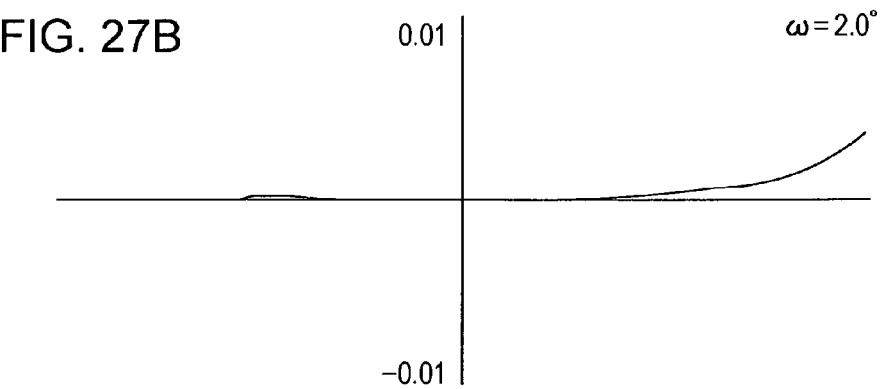
Figure 27C:
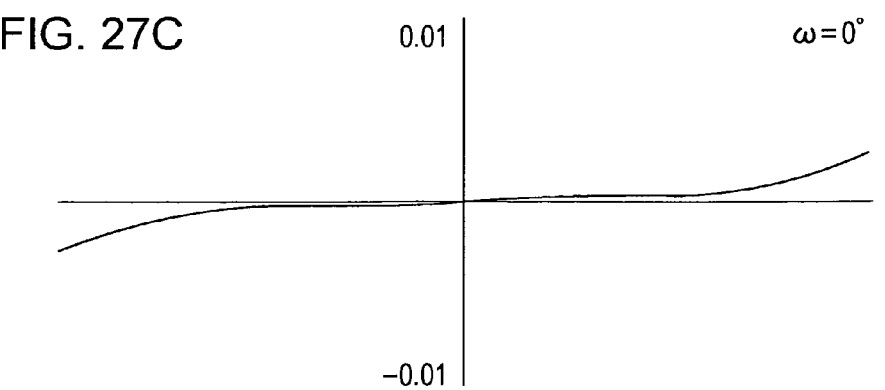
Figure 29A:
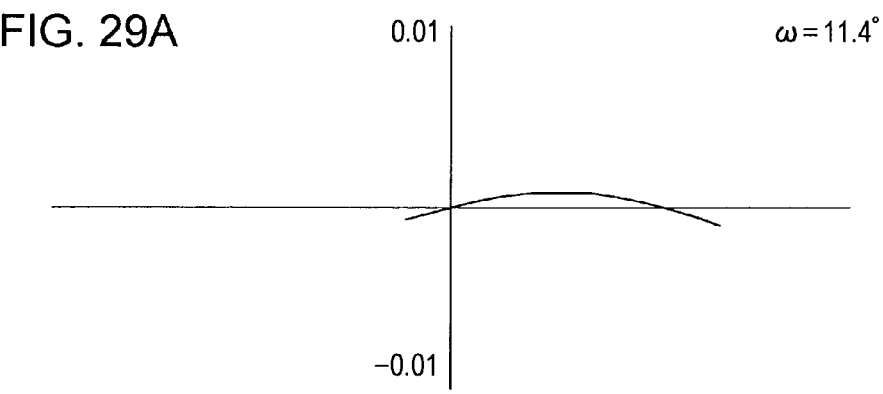
FIGS. 29A to 29C are diagrams illustrating lateral aberration in the middle focal length state according to the third embodiment of the disclosure.
Figure 29B:
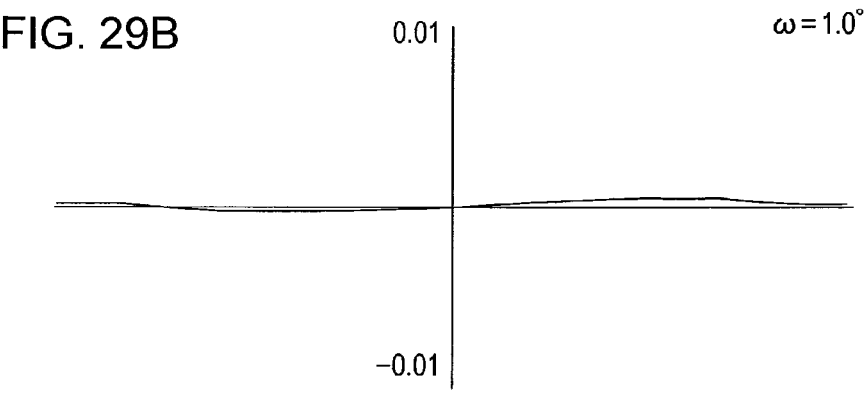
Figure 29C:
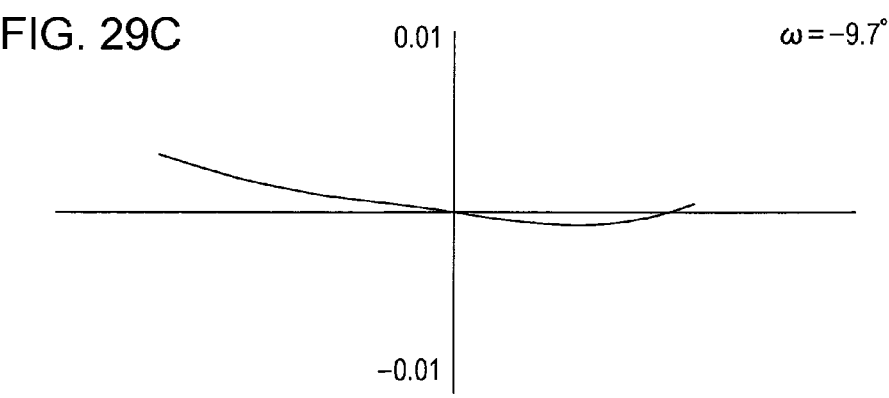

FIGS. 22A to 27C show diagrams of various aberrations of Numerical Example 3. FIGS. 22A to 22C are diagrams illustrating spherical aberration, astigmatism, and distortion when the focus is at infinity in the wide-angle end state (focal length=1.00). FIGS. 23A to 23C are diagrams illustrating lateral aberration when the focus is at infinity in the wide-angle end state (focal length=1.00). FIGS. 24A to 24C are diagrams illustrating spherical aberration, astigmatism, and distortion when the focus is at infinity in the middle focus position state (focal length=3.65). FIGS. 25A to 25C are diagrams illustrating lateral aberration when the focus is at infinity in the middle focus position state (focal length=3.65). FIGS. 26A to 26C are diagrams illustrating spherical aberration, astigmatism, and distortion when the focus is at infinity in the telephoto end state (focal length=13.33). FIGS. 27A to 27C are diagrams illustrating lateral aberration when the focus is at infinity in the telephoto end state (focal length=13.33).

FIGS. 28A to 30C respectively show lateral aberrations in the lens shift state corresponding to 1.0° when the focus is at infinity in Numerical Example 3. Here, FIGS. 28A to 28C are diagrams illustrating lateral aberration in the wide-angle end state (focal length=1.00), FIGS. 29A to 29C are diagrams illustrating lateral aberration in the middle focal length state (focal length=3.65), and FIGS. 30A to 30C are diagrams illustrating lateral aberration in the telephoto end state (focal length=13.33).

As can be clearly seen from the aberration diagrams, the various aberrations are satisfactorily corrected in Numerical Example 3, and imaging performance is excellent even in the hand shake correction state corresponding to about 1.0°.

4. Fourth Embodiment

Configuration of Zoom Lens

Figure 31:
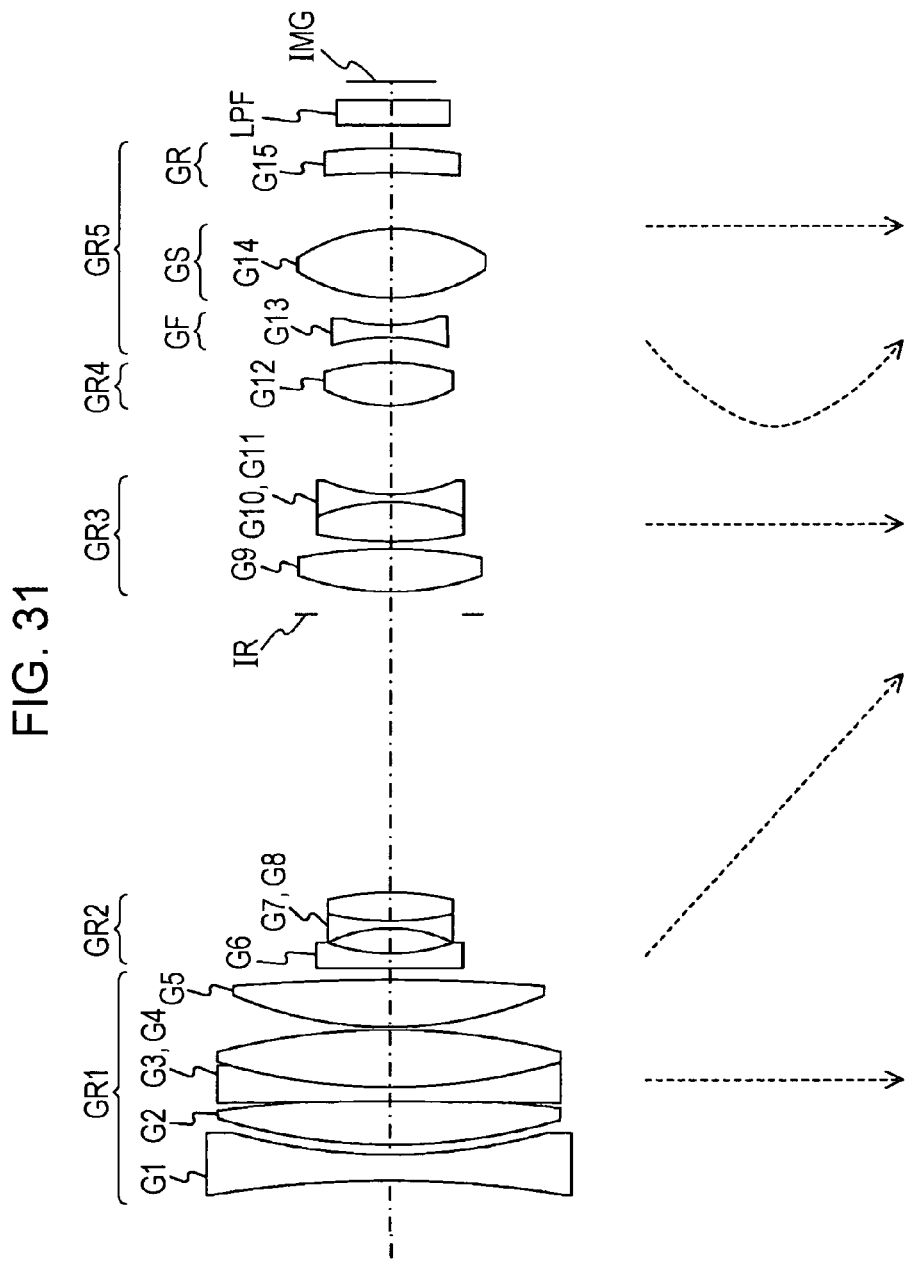
FIG. 31 is a diagram illustrating an exemplary configuration of a zoom lens according to a fourth embodiment of the disclosure.

FIG. 31 is a diagram illustrating an exemplary configuration of a zoom lens according to a fourth embodiment of the disclosure.

The first lens group GR1 includes, in order from the object side to the image side: a negative lens G1 of which both surfaces are formed to be aspheric; a cemented lens which is formed by cementing a positive lens G2, a negative lens G3, and a positive lens G4; and a positive lens G5.

The second lens group GR2 includes, in order from the object side to the image side: a negative lens G6 of which both surfaces are formed to be aspheric; and a cemented lens which is formed by cementing a negative lens G7 and a positive lens G8 of which one image side surface is formed to be aspheric.

The third lens group GR3 includes, in order from the object side to the image side: a positive lens G9 of which both surfaces are formed to be aspheric; and a cemented lens which is formed by cementing a positive lens G10 and a negative lens G11.

The fourth lens group GR4 includes a positive lens G12 of which both surfaces are formed to be aspheric.

The fifth lens group GR5 includes, in order from the object side to the image side: a negative lens G13 of which both surfaces are formed to be aspheric; a positive lens G14 of which both surfaces are formed to be aspheric; and a positive lens G15 of which one image side surface is formed to be aspheric. The negative lens G13 corresponds to the partial lens group GF with a large negative refractive power. The positive lens G14 corresponds to the partial lens group GS with a large positive refractive power. The positive lens G15 corresponds to the partial lens group GR with a small positive refractive power.

On the object side of the third lens group GR3, an aperture diaphragm IR is disposed at a position close to the third lens group GR3. The position of the aperture diaphragm IR is the aperture diaphragm surface s15. A low-pass filter LPF is disposed between the fifth lens group GR5 and an image plane IMG.

Specification of Zoom Lens

Table 10 shows lens data of Numerical Example 4 in which specific numerical values are applied to the zoom lens according to the fourth embodiment.

TABLE 10

| si | ri | di | ni | vi |
|---|---|---|---|---|
| 1 | r1 = −32.0889 | d1 = 0.314 | n1 = 1.83441 | v1 = 37.3 |
| 2 | r2 = 7.1922 | d2 = 0.238 | | |
| 3 | r3 = 10.3213 | d3 = 0.676 | n3 = 1.59282 | v3 = 68.6 |
| 4 | r4 = −46.4214 | d4 = 0.036 | | |
| 5 | r5 = −97.4670 | d5 = 0.222 | n5 = 1.84666 | v5 = 23.8 |
| 6 | r6 = 9.9272 | d6 = 0.919 | n6 = 1.72916 | v6 = 54.7 |
| 7 | r7 = −10.2798 | d7 = 0.036 | | |
| 8 | r8 = 6.4284 | d8 = 0.743 | n8 = 1.88300 | v8 = 40.8 |
| 9 | r9 = −46.6449 | d9 = VARIABLE | | |
| 10 | r10 = −9.6657 | d10 = 0.169 | n10 = 1.88202 | v10 = 37.2 |
| 11 | r11 = 1.9726 | d11 = 0.478 | | |
| 12 | r12 = −2.4673 | d12 = 0.109 | n12 = 1.83481 | v12 = 42.7 |
| 13 | r13 = 2.6762 | d13 = 0.417 | n13 = 2.00170 | v13 = 19.3 |
| 14 | r14 = −11.6539 | d14 = VARIABLE | | |
| 15 | r15 = INFINITY | d15 = 0.382 | | APERTURE DIAPHRAGM |
| 16 | r16 = 3.1776 | d16 = 0.639 | n16 = 1.88202 | v16 = 37.2 |
| 17 | r17 = −7.4958 | d17 = 0.072 | | |
| 18 | r18 = 3.3695 | d18 = 0.651 | n18 = 1.49700 | v18 = 81.6 |
| 19 | r19 = −3.8568 | d19 = 0.109 | n19 = 2.00100 | v19 = 29.1 |
| 20 | r20 = 2.7885 | d20 = VARIABLE | | |
| 21 | r21 = 2.4237 | d21 = 0.674 | n21 = 1.55332 | v21 = 71.7 |
| 22 | r22 = −3.2696 | d22 = VARIABLE | | |
| 23 | r23 = −3.7263 | d23 = 0.169 | n23 = 1.88202 | v23 = 37.2 |
| 24 | r24 = 2.4461 | d24 = 0.423 | | |
| 25 | r25 = 2.1264 | d25 = 1.123 | n25 = 1.55332 | v25 = 71.7 |
| 26 | r26 = −2.8418 | d26 = 0.900 | | |
| 27 | r27 = −19.2105 | d27 = 0.405 | n27 = 1.68893 | v27 = 31.2 |
| 28 | r28 = −4.1222 | d28 = 0.394 | | |
| 29 | r29 = INFINITY | d29 = 0.408 | n29 = 1.51680 | v29 = 64.2 |
| 30 | r30 = INFINITY | d30 = 0.193 | | |

In the zoom lens according to the fourth embodiment, the surfaces s1, s2, s10, s11, s14, s16, s17, s21 to s26, and s28 are formed to be aspheric. The surface s1 is an object side surface of the negative lens G1 of the first lens group GR1. The surface s2 is an image side surface of the negative lens G1 of the first lens group GR1. The surface s10 is an object side surface of the negative lens G6 of the second lens group GR2. The surface s11 is an image side surface of the negative lens G6 of the second lens group GR2. The surface s14 is an image side surface of the positive lens G8 of the second lens group GR2. The surface s16 is an object side surface of the positive lens G9 of the third lens group GR3. The surface s17 is an image side surface of the positive lens G9 of the third lens group GR3. The surface s21 is an object side surface of the positive lens G12 of the fourth lens group GR4. The surface s22 is an image side surface of the positive lens G12 of the fourth lens group GR4. The surface s23 is an object side surface of the negative lens G13 of the fifth lens group GR5. The surface s24 is an image side surface of the negative lens G13 of the fifth lens group GR5. The surface s25 is an object side surface of the positive lens G14 of the fifth lens group GR5. The surface s26 is an image side surface of the positive lens G14 of the fifth lens group GR5. The surface s28 is an image side surface of the positive lens G15 of the fifth lens group GR5.

Table 11 shows the 4th-order, 6th-order, 8th-order, and 10th-order aspheric surface coefficients A4, A6, A8, and A10 of the aspheric surfaces together with the conic constant K in Numerical Example 4 of the zoom lens according to the fourth embodiment.

TABLE 11

| si | K | $A_4$ | $A_6$ | $A_8$ | $A_{10}$ |
|---|---|---|---|---|---|
| 1 | 0 | −1.49986E−03 | 5.91229E−05 | 2.67494E−06 | −3.35153E−07 |
| 2 | 0 | −1.23685E−03 | 6.28495E−05 | 2.70448E−06 | −3.71325E−07 |
| 10 | 0 | −6.82518E−03 | 2.78245E−02 | −8.31499E−03 | 0.00000E+00 |
| 11 | 0 | −2.43935E−02 | 4.11126E−02 | −4.26221E−03 | 2.20336E−02 |
| 14 | 0 | 2.42443E−03 | −2.28888E−04 | −2.85247E−03 | −4.09254E−04 |
| 16 | 0 | −7.38232E−03 | 7.02370E−04 | 0.00000E+00 | 0.00000E+00 |
| 17 | 0 | −4.98211E−03 | 2.23450E−03 | −2.56951E04 | 9.46253E−06 |
| 21 | 0 | −1.91141E−02 | 7.78140E−03 | −6.28924E−03 | 3.39496E−03 |
| 22 | 0 | 1.27457E−02 | 4.48099E−04 | −2.76184E−03 | 2.74347E−03 |
| 23 | 0 | −3.87747E−03 | 4.50929E−02 | −3.12447E−02 | 1.03255E−02 |
| 24 | 0 | −4.47576E−02 | 6.35615E−02 | −4.28878E−02 | 1.58835E−02 |
| 25 | 0 | −2.35139E−02 | 3.23129E−03 | −4.21545E−03 | 1.69174E−04 |
| 26 | 0 | 2.11817E−02 | −3.25206E−04 | −3.86228E−03 | 3.79410E−04 |
| 28 | 0 | 8.32641E−02 | −4.44499E−02 | 3.85051E−02 | −1.69466E−02 |

In the zoom lens according to the fourth embodiment, the on-axis surface spacings d9, d14, d20, and d22 change during zooming between the wide-angle end state and the telephoto end state. The on-axis surface spacing d9 is an on-axis surface spacing between the first lens group GR1 and the second lens group GR2. The on-axis surface spacing d14 is an on-axis surface spacing between the second lens group GR2 and the aperture diaphragm IR. The on-axis surface spacing d20 is an on-axis surface spacing between the third lens group GR3 and the fourth lens group GR4. The on-axis surface spacing d22 is an on-axis surface spacing between the fourth lens group GR4 and the fifth lens group GR5. Table 12 shows the variable spaces of the on-axis surface spacings in the wide-angle end state (focal length=1.00), the middle focus position state (focal length=3.23), and the telephoto end state (focal length=10.41) together with the F number Fno and the half angle of view ω in Numerical Example 4.

TABLE 12

|  | WIDE-ANGLE END | MIDDLE POSITION | TELEPHOTO END |
|---|---|---|---|
| FOCAL LENGTH | 1.00 | 3.23 | 10.41 |
| Fno | 1.86 | 2.70 | 3.52 |
| ω (DEGREE) | 38.47 | 12.10 | 3.76 |
| d9 | 0.169 | 2.697 | 4.327 |
| d14 | 4.494 | 1.966 | 0.336 |
| d20 | 1.475 | 0.743 | 0.775 |
| d22 | 0.411 | 1.143 | 1.111 |

Aberration of Zoom Lens

FIGS. 32A to 37C show diagrams of various aberrations of Numerical Example 4. FIGS. 32A to 32C are diagrams illustrating spherical aberration, astigmatism, and distortion when the focus is at infinity in the wide-angle end state (focal length=1.00). FIGS. 33A to 33C are diagrams illustrating lateral aberration when the focus is at infinity in the wide-angle end state (focal length=1.00). FIGS. 34A to 34C are diagrams illustrating spherical aberration, astigmatism, and distortion when the focus is at infinity in the middle focus position state (focal length=3.23). FIGS. 35A to 35C are diagrams illustrating lateral aberration when the focus is at infinity in the middle focus position state (focal length=3.23). FIGS. 36A to 36C are diagrams illustrating spherical aberration, astigmatism, and distortion when the focus is at infinity in the telephoto end state (focal length=10.41). FIGS. 37A to 37C are diagrams illustrating lateral aberration when the focus is at infinity in the telephoto end state (focal length=10.41).

FIGS. 38A to 40C respectively show lateral aberrations in the lens shift state corresponding to 1.0° when the focus is at infinity in Numerical Example 4. Here, FIGS. 38A to 38C are diagrams illustrating lateral aberration in the wide-angle end state (focal length=1.00), FIGS. 39A to 39C are diagrams illustrating lateral aberration in the middle focal length state (focal length=3.23), and FIGS. 40A to 40C are diagrams illustrating lateral aberration in the telephoto end state (focal length=10.41).

As can be clearly seen from the aberration diagrams, the various aberrations are satisfactorily corrected in Numerical Example 4, and imaging performance is excellent even in the hand shake correction state corresponding to about 1.0°.

5. Fifth Embodiment

Configuration of Zoom Lens

FIG. 41 is a diagram illustrating an exemplary configuration of a zoom lens according to a fifth embodiment of the disclosure.

The first lens group GR1 includes, in order from the object side to the image side: a negative lens G1 of which one image side surface is formed as a compound aspheric surface; a cemented lens which is formed by cementing a positive lens G2, a negative lens G3, and a positive lens G4; and a positive lens G5.

The second lens group GR2 includes, in order from the object side to the image side: a negative lens G6 of which both surfaces are formed to be aspheric; and a cemented lens which is formed by cementing a negative lens G7 and a positive lens G8 of which one image side surface is formed to be aspheric.

The third lens group GR3 includes, in order from the object side to the image side: a positive lens G9 of which both surfaces are formed to be aspheric; and a cemented lens which is formed by cementing a positive lens G10 and a negative lens G11.

The fourth lens group GR4 includes a positive lens G12 of which both surfaces are formed to be aspheric.

The fifth lens group GR5 includes, in order from the object side to the image side: a negative lens G13 of which both surfaces are formed to be aspheric; a positive lens G14 of which both surfaces are formed to be aspheric; and a positive lens G15 of which one image side surface is formed to be aspheric. The negative lens G13 corresponds to the partial lens group GF with a large negative refractive power. The positive lens G14 corresponds to the partial lens group GS with a large positive refractive power. The positive lens G15 corresponds to the partial lens group GR with a small positive refractive power.

On the object side of the third lens group GR3, an aperture diaphragm IR is disposed at a position close to the third lens group GR3. The position of the aperture diaphragm IR is the aperture diaphragm surface s16. A low-pass filter LPF is disposed between the fifth lens group GR5 and an image plane IMG.

Specification of Zoom Lens

Table 13 shows lens data of Numerical Example 5 in which specific numerical values are applied to the zoom lens according to the fifth embodiment.

TABLE 13

| si | ri | di | ni | vi |
|---|---|---|---|---|
| 1 | r1 = −29.5634 | d1 = 0.230 | n1 = 1.91082 | v1 = 35.3 |
| 2 | r2 = 8.2093 | d2 = 0.024 | n2 = 1.53420 | v2 = 41.7 |
| 3 | r3 = 8.6589 | d3 = 0.531 |  |  |
| 4 | r4 = 19.0651 | d4 = 0.530 | n4 = 1.61800 | v4 = 63.4 |
| 5 | r5 = −31.8580 | d5 = 0.036 |  |  |
| 6 | r6 = 45.3376 | d6 = 0.222 | n6 = 1.84666 | v6 = 23.8 |
| 7 | r7 = 7.3101 | d7 = 0.933 | n7 = 1.72916 | v7 = 54.7 |
| 8 | r8 = −14.5162 | d8 = 0.036 |  |  |
| 9 | r9 = 6.3803 | d9 = 0.759 | n9 = 1.88300 | v9 = 40.8 |
| 10 | r10 = −35.0094 | d10 = VARIABLE |  |  |
| 11 | r11 = −9.6674 | d11 = 0.169 | n11 = 1.88202 | v11 = 37.2 |
| 12 | r12 = 2.0847 | d12 = 0.489 |  |  |
| 13 | r13 = −2.4591 | d13 = 0.109 | n13 = 1.78800 | v13 = 47.5 |
| 14 | r14 = 2.8608 | d14 = 0.399 | n14 = 2.00170 | v14 = 19.3 |
| 15 | r15 = −15.2541 | d15 = VARIABLE |  |  |
| 16 | r16 = INFINITY | d16 = 0.382 |  | APERTURE DIAPHRAGM |
| 17 | r17 = 3.0513 | d17 = 0.633 | n17 = 1.88202 | v17 = 37.2 |

TABLE 13-continued

| si | ri | di | ni | vi |
|---|---|---|---|---|
| 18 | r18 = −7.6178 | d18 = 0.181 | | |
| 19 | r19 = 3.6461 | d19 = 0.559 | n19 = 1.48749 | v19 = 70.4 |
| 20 | r20 = −5.4146 | d20 = 0.109 | n20 = 2.00060 | v20 = 25.5 |
| 21 | r21 = 2.7157 | d21 = VARIABLE | | |
| 22 | r22 = 2.3905 | d22 = 0.669 | n22 = 1.55332 | v22 = 71.7 |
| 23 | r23 = −3.3650 | d23 = VARIABLE | | |
| 24 | r24 = −2.8626 | d24 = 0.169 | n24 = 1.88202 | v24 = 37.2 |
| 25 | r25 = 2.7252 | d25 = 0.423 | | |
| 26 | r26 = 2.1268 | d26 = 1.081 | n26 = 1.59201 | v26 = 67.0 |
| 27 | r27 = −2.7003 | d27 = 0.496 | | |
| 28 | r28 = −20.6245 | d28 = 0.393 | n28 = 1.68893 | v28 = 31.2 |
| 29 | r29 = −5.0370 | d29 = 0.603 | | |
| 30 | r30 = INFINITY | d30 = 0.408 | n30 = 1.51680 | v30 = 64.2 |
| 31 | r31 = INFINITY | d31 = 0.193 | | |

In the zoom lens according to the fifth embodiment, the surfaces s3, s11, s12, s15, s17, s18, s22 to s27, and s29 are formed to be aspheric. The surface s3 is an image side of the negative lens G1 of the first lens group GR1. The surface s11 is an object side surface of the negative lens G6 of the second lens group GR2. The surface s12 is an image side surface of the negative lens G6 of the second lens group GR2. The surface s15 is an image side surface of the positive lens G8 of the second lens group GR2. The surface s17 is an object side surface of the positive lens G9 of the third lens group GR3. The surface s18 is an image side surface of the positive lens G9 of the third lens group GR3. The surface s22 is an object side surface of the positive lens G12 of the fourth lens group GR4. The surface s23 is an image side surface of the positive lens G12 of the fourth lens group GR4. The surface s24 is an object side surface of the negative lens G13 of the fifth lens group GR5. The surface s25 is an image side surface of the negative lens G13 of the fifth lens group GR5. The surface s26 is an object side surface of the positive lens G14 of the fifth lens group GR5. The surface s27 is an image side surface of the positive lens G14 of the fifth lens group GR5. The surface s29 is an image side surface of the positive lens G15 of the fifth lens group GR5.

Table 14 shows the 4th-order, 6th-order, 8th-order, and 10th-order aspheric surface coefficients A4, A6, A8, and A10 of the aspheric surfaces together with the conic constant K in Numerical Example 5 of the zoom lens according to the fifth embodiment.

TABLE 14

| si | K | $A_4$ | $A_6$ | $A_8$ | $A_{10}$ |
|---|---|---|---|---|---|
| 3 | 0 | 5.12421E−04 | 1.27782E−05 | −2.63271E−06 | 2.20605E−07 |
| 11 | 0 | 3.27428E−02 | −1.06953E−02 | 1.53569E−03 | 0.00000E+00 |
| 12 | 0 | 2.95087E−02 | 6.62079E−03 | 7.73681E−03 | −4.12861E−03 |
| 15 | 0 | 1.05500E−03 | −5.19960E−03 | 3.71170E−03 | −1.61702E−04 |
| 17 | 0 | −9.04898E−03 | 5.04725E−04 | 0.00000E+00 | 0.00000E+00 |
| 18 | 0 | −4.49498E−03 | 2.19784E−03 | −3.15141E−04 | 2.56765E−05 |
| 22 | 0 | −2.06794E−02 | 8.50045E−03 | −7.43788E−03 | 4.31314E−03 |
| 23 | 0 | 1.14149E−02 | 2.85778E−03 | −5.71701E−03 | 4.40243E−03 |
| 24 | 0 | 9.38224E−03 | 2.78041E−02 | −1.73924E−02 | 5.83517E−03 |
| 25 | 0 | −4.04338E−02 | 3.97019E−02 | −2.12340E−02 | 7.32049E−03 |
| 26 | 0 | −2.44745E−02 | 8.37892E−04 | −1.57344E−03 | −6.34599E−04 |
| 27 | 0 | 2.58151E−02 | −2.62882E−03 | −2.10872E−03 | −1.39325E−04 |
| 29 | 0 | 5.07684E−02 | −9.47983E−03 | 8.02871E−03 | −3.49488E−03 |

In the zoom lens according to the fifth embodiment, the on-axis surface spacings d10, d15, d21, and d23 change during zooming between the wide-angle end state and the telephoto end state. The on-axis surface spacing d10 is an on-axis surface spacing between the first lens group GR1 and the second lens group GR2. The on-axis surface spacing d15 is an on-axis surface spacing between the second lens group GR2 and the aperture diaphragm IR. The on-axis surface spacing d21 is an on-axis surface spacing between the third lens group GR3 and the fourth lens group GR4. The on-axis surface spacing d23 is an on-axis surface spacing between the fourth lens group GR4 and the fifth lens group GR5. Table 15 shows the variable spaces of the on-axis surface spacings in the wide-angle end state (focal length=1.00), the middle focus position state (focal length=2.95), and the telephoto end state (focal length=8.68) together with the F number Fno and the half angle of view ω in Numerical Example 5.

TABLE 15

| | WIDE-ANGLE END | MIDDLE POSITION | TELEPHOTO END |
|---|---|---|---|
| FOCAL LENGTH | 1.00 | 2.95 | 8.68 |
| Fno | 1.86 | 2.65 | 3.53 |
| ω (DEGREE) | 38.66 | 13.38 | 4.58 |
| d10 | 0.169 | 2.560 | 4.123 |
| d15 | 4.290 | 1.899 | 0.336 |
| d21 | 1.388 | 0.713 | 0.558 |
| d23 | 0.411 | 1.086 | 1.242 |

Aberration of Zoom Lens

FIGS. 42A to 47C show diagrams of various aberrations of Numerical Example 5. FIGS. 42A to 42C are diagrams illustrating spherical aberration, astigmatism, and distortion when the focus is at infinity in the wide-angle end state (focal length=1.00). FIGS. 43A to 43C are diagrams illustrating lateral aberration when the focus is at infinity in the wide-angle end state (focal length=1.00). FIGS. 44A to 44C are diagrams illustrating spherical aberration, astigmatism, and distortion when the focus is at infinity in the middle focus position state (focal length=2.95). FIGS. 45A to 45C are diagrams illustrating lateral aberration when the focus is at infinity in the middle focus position state (focal length=2.95). FIGS. 46A to 46C are diagrams illustrating spherical aberration, astigmatism, and distortion when the focus is at infinity in the telephoto end state (focal length=8.68). FIGS. 47A to 47C are diagrams illustrating lateral aberration when the focus is at infinity in the telephoto end state (focal length=8.68).

FIGS. 48A to 50C respectively show lateral aberrations in the lens shift state corresponding to 1.0° when the focus is at infinity in Numerical Example 5. Here, FIGS. 48A to 48C are diagrams illustrating lateral aberration in the wide-angle end state (focal length=1.00), FIGS. 49A to 49C are diagrams illustrating lateral aberration in the middle focal length state (focal length=2.95), and FIGS. 50A to 50C are diagrams illustrating lateral aberration in the telephoto end state (focal length=8.68).

As can be clearly seen from the aberration diagrams, the various aberrations are satisfactorily corrected in Numerical Example 5, and imaging performance is excellent even in the hand shake correction state corresponding to about 1.0°.

6. Sixth Embodiment

Configuration of Zoom Lens

Figure 51:
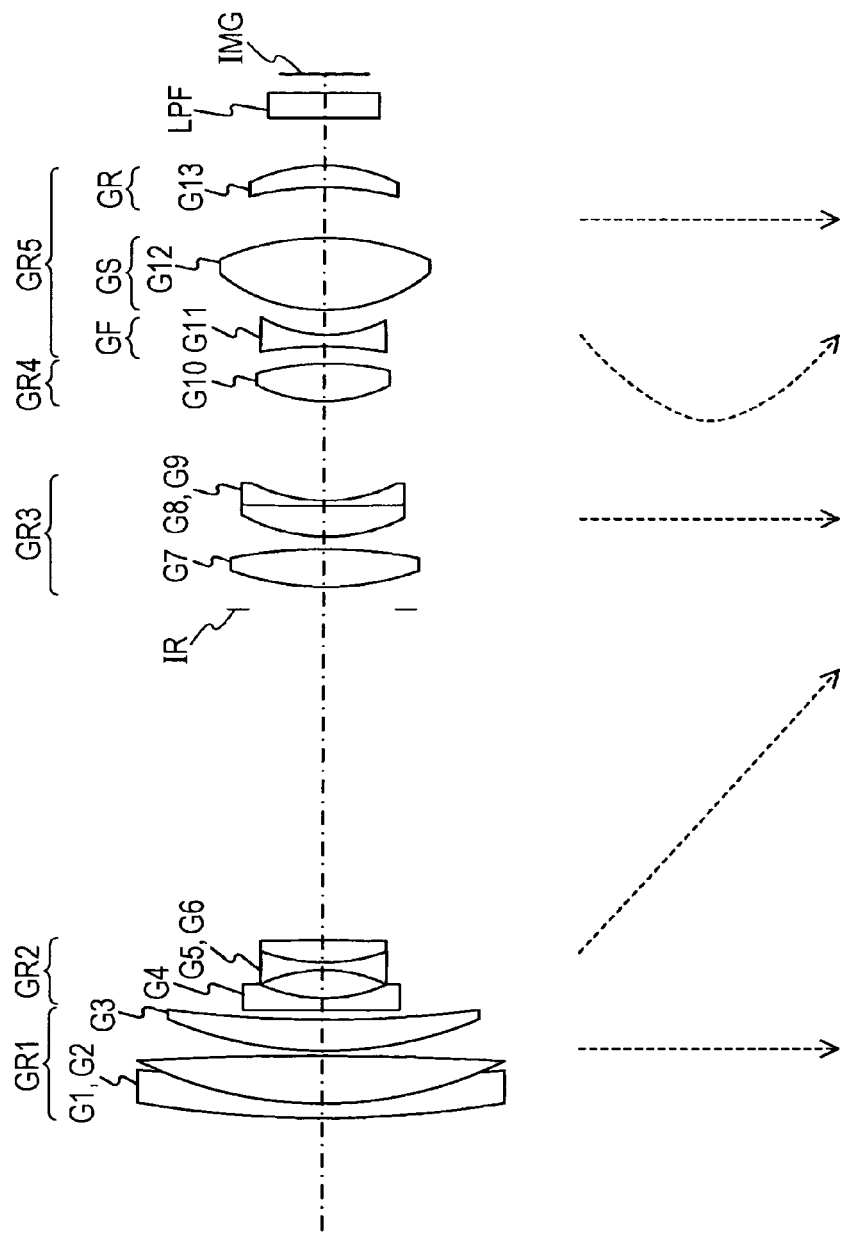
FIG. 51 is a diagram illustrating an exemplary configuration of a zoom lens according to a sixth embodiment of the disclosure.
Figure 55A:
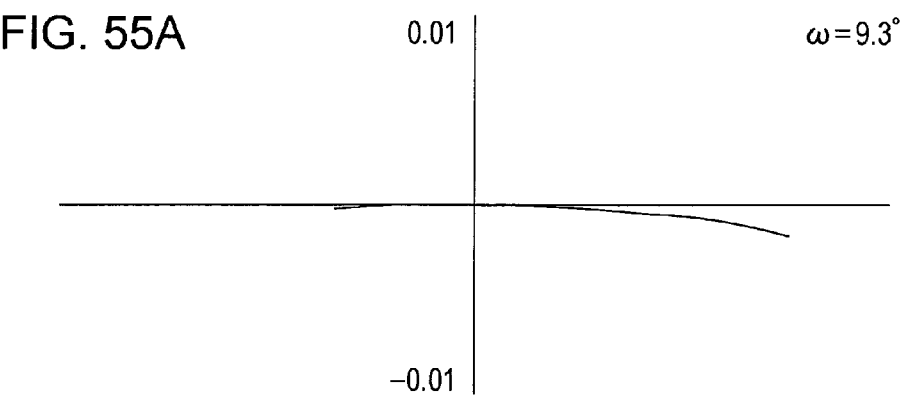
FIGS. 55A to 55C are diagrams illustrating lateral aberration when the focus is at infinity in the middle focus position state according to the sixth embodiment of the disclosure.
Figure 55B:
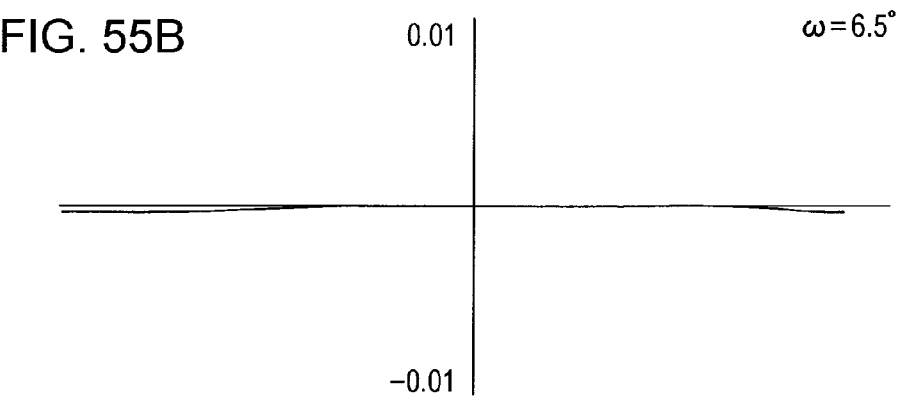
Figure 55C:
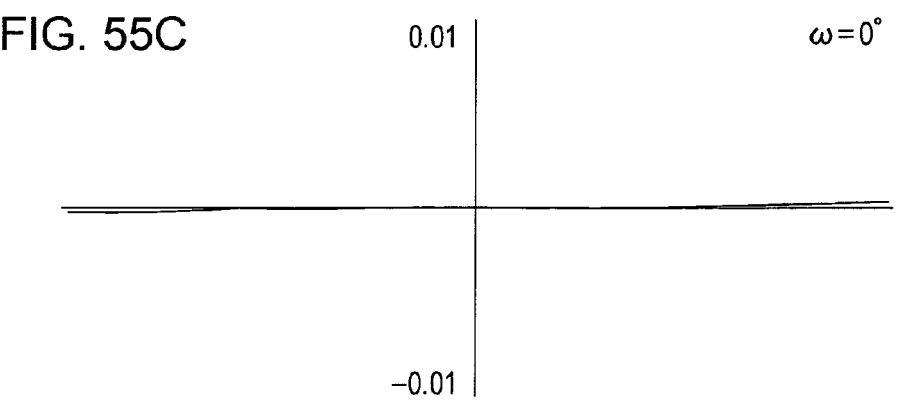

FIG. 51 is a diagram illustrating an exemplary configuration of a zoom lens according to a sixth embodiment of the disclosure.

The first lens group GR1 includes, in order from the object side to the image side: a cemented lens which is formed by cementing a negative lens G1 and a positive lens G2; and a positive lens G3.

The second lens group GR2 includes, in order from the object side to the image side: a negative lens G4 of which one image side surface is formed to be aspheric; and a cemented lens which is formed by cementing a negative lens G5 and a positive lens G6.

The third lens group GR3 includes, in order from the abject side to the image side: a positive lens G7 of which both surfaces are formed to be aspheric; a cemented lens which is formed by cementing a positive lens G8 and a negative lens G9.

The fourth lens group GR4 includes a positive lens G10 of which both surfaces are formed to be aspheric.

The fifth lens group GR5 includes, in order from the object side to the image side: a negative lens G11 of which one image side surface is formed to be aspheric; a positive lens G12 of which both surfaces are formed to be aspheric; and a positive lens G13 of which one image side surface is formed to be aspheric. The negative lens G11 corresponds to the partial lens group GF with a large negative refractive power. The positive lens G12 corresponds to the partial lens group GS with a large positive refractive power. The positive lens G13 corresponds to the partial lens group GR with a small positive refractive power.

On the object side of the third lens group GR3, an aperture diaphragm IR is disposed at a position close to the third lens group GR3. The position of the aperture diaphragm IR is the aperture diaphragm surface s11.

A low-pass filter LPF is disposed between the fifth lens group GR5 and an image plane IMG.

Specification of Zoom Lens

Table 16 shows lens data of Numerical Example 6 in which specific numerical values are applied to the zoom lens according to the sixth embodiment.

TABLE 16

| si | ri | di | ni | vi |
|----|----|----|----|----|
| 1 | r1 = 12.4867 | d1 = 0.179 | n1 = 1.84666 | v1 = 23.8 |
| 2 | r2 = 5.0431 | d2 = 0.608 | n2 = 1.69680 | v2 = 55.5 |
| 3 | r3 = −40.2251 | d3 = 0.027 | | |
| 4 | r4 = 4.7431 | d4 = 0.383 | n4 = 1.72916 | v4 = 54.7 |
| 5 | r5 = 16.1383 | d5 = VARIABLE | | |
| 6 | r6 = 42.5507 | d6 = 0.125 | n6 = 1.85135 | v6 = 40.1 |
| 7 | r7 = 1.8250 | d7 = 0.358 | | |
| 8 | r8 = −2.0801 | d8 = 0.080 | n8 = 1.83481 | v8 = 42.7 |
| 9 | rg = 1.9123 | d9 = 0.282 | n9 = 1.94595 | v9 = 18.0 |
| 10 | 10 = 55.3417 | d10 = VARIABLE | | |
| 11 | 11 = INFINITY | d11 = 0.282 | | APERTURE DIAPHRAGM |
| 12 | 12 = 2.6828 | d12 = 0.471 | n12 = 1.77377 | v12 = 47.2 |
| 13 | 13 = −6.0439 | d13 = 0.175 | | |
| 14 | 14 = 2.3481 | d14 = 0.346 | n14 = 1.48749 | v14 = 70.4 |
| 15 | 15 = 28.7853 | d15 = 0.089 | n15 = 2.00060 | v15 = 25.5 |
| 16 | 16 = 2.1178 | d16 = VARIABLE | | |
| 17 | 17 = 2.0411 | d17 = 0.417 | n17 = 1.55332 | v17 = 71.7 |
| 18 | 18 = −3.7131 | d18 = VARIABLE | | |
| 19 | 19 = −4.5886 | d19 = 0.134 | n19 = 1.69350 | v19 = 53.2 |
| 20 | 20 = 1.2836 | d20 = 0.312 | | |
| 21 | 21 = 1.6749 | d21 = 0.850 | n21 = 1.55332 | v21 = 71.7 |
| 22 | 22 = −3.0071 | d22 = 0.608 | | |
| 23 | 23 = −3.5712 | d23 = 0.251 | n23 = 1.53460 | v23 = 56.3 |
| 24 | 24 = −1.9428 | d24 = 0.627 | | |
| 25 | 25 = INFINITY | d25 = 0.302 | n25 = 1.51680 | v25 = 64.2 |
| 26 | 26 = INFINITY | d26 = 0.143 | | |

In the zoom lens according to the sixth embodiment, the surfaces s7, s12, s13, s17, s18, s20 to s22, and s24 are formed to be aspheric. The surface s7 is an image side surface of the negative lens G4 of the second lens group GR2. The surface s12 is an object side surface of the positive lens G7 of the third lens group GR3. The surface s13 is an image side surface of the positive lens G7 of the third lens group GR3. The surface s17 is an object side surface of the positive lens G10 of the fourth lens group GR4. The surface s18 is an image side surface of the positive lens G10 of the fourth lens group GR4. The surface s20 is an image side surface of the negative lens G11 of the fifth lens group GR5. The surface s21 is an object side surface of the positive lens G12 of the fifth lens group GR5. The surface s22 is an image side surface of the positive lens G12 of the fifth lens group GR5. The surface s24 is an image side surface of the positive lens G13 of the fifth lens group GR5.

Table 17 shows the 4th-order, 6th-order, 8th-order, and 10th-order aspheric surface coefficients A4, A6, A8, and A10 of the aspheric surfaces together with the conic constant K in Numerical Example 6 of the zoom lens according to the sixth embodiment.

TABLE 17

| si | K | $A_4$ | $A_6$ | $A_8$ | $A_{10}$ |
|----|---|-------|-------|-------|----------|
| 7 | 0 | −2.93754E−03 | 2.93186E−03 | 4.91396E−03 | −8.06274E−03 |
| 12 | 0 | −9.25108E−03 | −4.10733E−05 | 0.00000E+00 | 0.00000E+00 |
| 13 | 0 | 5.28781E−03 | 0.00000E+00 | 0.00000E+00 | 0.00000E+00 |
| 17 | 0 | −1.82296E−02 | 3.61642E−04 | 0.00000E+00 | 0.00000E+00 |
| 18 | 0 | 1.34388E−02 | 0.00000E+00 | 0.00000E+00 | 0.00000E+00 |

TABLE 17-continued

| si | K | $A_4$ | $A_6$ | $A_8$ | $A_{10}$ |
|---|---|---|---|---|---|
| 20 | 0 | −7.66682E−02 | −2.33187E−02 | 2.24503E−03 | −1.27195E−02 |
| 21 | 0 | −4.36928E−02 | 4.97617E−03 | −1.34413E−02 | 5.20181E−03 |
| 22 | 0 | 5.26793E−03 | 1.51026E−02 | −2.02260E−02 | 8.65682E−03 |
| 24 | 0 | 8.09901E−02 | −5.72108E−02 | 6.21483E−02 | −2.72098E−02 |

In the zoom lens according to the sixth embodiment, the on-axis surface spacings d5, d10, d16, and d18 change during zooming between the wide-angle end state and the telephoto end state. The on-axis surface spacing d5 is an on-axis surface spacing between the first lens group GR1 and the second lens group GR2. The on-axis surface spacing d10 is an on-axis surface spacing between the second lens group GR2 and the aperture diaphragm IR. The on-axis surface spacing d16 is an on-axis surface spacing between the third lens group GR3 and the fourth lens group GR4. The on-axis surface spacing d18 is an on-axis surface spacing between the fourth lens group GR4 and the fifth lens group GR5. Table 18 shows the variable spaces of the on-axis surface spacings in the wide-angle end state (focal length=1.00), the middle focus position state (focal length=3.30), and the telephoto end state (focal length=10.89) together with the F number Fno and the half angle of view ω in Numerical Example 6.

TABLE 18

| | WIDE-ANGLE END | MIDDLE POSITION | TELEPHOTO END |
|---|---|---|---|
| FOCAL LENGTH | 1.00 | 3.30 | 10.89 |
| Fno | 1.86 | 2.70 | 3.52 |
| ω (DEGREE) | 30.03 | 9.27 | 2.80 |
| d5 | 0.125 | 2.353 | 3.800 |
| d10 | 3.914 | 1.687 | 0.239 |
| d16 | 1.195 | 0.601 | 0.787 |
| d18 | 0.215 | 0.810 | 0.623 |

Aberration of Zoom Lens

FIGS. 52A to 57C show diagrams of various aberrations of Numerical Example 6. FIGS. 52A to 52C are diagrams illustrating spherical aberration, astigmatism, and distortion when the focus is at infinity in the wide-angle end state (focal length=1.00). FIGS. 53A to 53C are diagrams illustrating lateral aberration when the focus is at infinity in the wide-angle end state (focal length=1.00). FIGS. 54A to 54C are diagrams illustrating spherical aberration, astigmatism, and distortion when the focus is at infinity in the middle focus position state (focal length=3.30). FIGS. 55A to 55C are diagrams illustrating lateral aberration when the focus is at infinity in the middle focus position state (focal length=3.30). FIGS. 56A to 56C are diagrams illustrating spherical aberration, astigmatism, and distortion when the focus is at infinity in the telephoto end state (focal length=10.89). FIGS. 57A to 57C are diagrams illustrating lateral aberration when the focus is at infinity in the telephoto end state (focal length=10.89).

FIGS. 58A to 60C respectively show lateral aberrations in the lens shift state corresponding to 1.0° when the focus is at infinity in Numerical Example 6. Here, FIGS. 58A to 58C are diagrams illustrating lateral aberration in the wide-angle end state (focal length=1.00), FIGS. 59A to 59C are diagrams illustrating lateral aberration in the middle focal length state (focal length=3.30), and FIGS. 60A to 60C are diagrams illustrating lateral aberration in the telephoto end state (focal length=10.89).

As can be clearly seen from the aberration diagrams, the various aberrations are satisfactorily corrected in Numerical Example 6, and imaging performance is excellent even in the hand shake correction state corresponding to about 1.0°.

Summary of Conditional Expressions

Table 19 shows the respective values of Conditional Expressions (1) to (4) in Numerical Examples 1 to 6 according to the first to sixth embodiments.

TABLE 19

| CONDITIONAL EXPRESSION | NUMERICAL EXAMPLE 1 | NUMERICAL EXAMPLE 2 | NUMERICAL EXAMPLE 3 | NUMERICAL EXAMPLE 4 | NUMERICAL EXAMPLE 5 | NUMERICAL EXAMPLE 6 |
|---|---|---|---|---|---|---|
| (1)fGF/ft | −0.124 | −0.120 | −0.131 | −0.158 | −0.179 | −0.131 |
| (2)fGS/ft | 0.175 | 0.166 | 0.195 | 0.229 | 0.252 | 0.190 |
| (3)fGR/fGL | 2.493 | 2.605 | 1.340 | 1.563 | 1.897 | 1.153 |
| (4)fGL/√(fw · ft) | 0.942 | 0.840 | 1.719 | 1.483 | 1.700 | 1.979 |

Here, the respective numerical values are shown in Table 20.

TABLE 20

| SIGN | NUMERICAL EXAMPLE 1 | NUMERICAL EXAMPLE 2 | NUMERICAL EXAMPLE 3 | NUMERICAL EXAMPLE 4 | NUMERICAL EXAMPLE 5 | NUMERICAL EXAMPLE 6 |
|---|---|---|---|---|---|---|
| fGF | −1.545 | −1.595 | −1.743 | −1.642 | −1.551 | −1.427 |
| fGS | 2.174 | 2.212 | 2.599 | 2.383 | 2.185 | 2.072 |
| ft | 12.436 | 13.331 | 13.333 | 10.413 | 8.677 | 10.890 |
| fGR | 8.278 | 7.991 | 8.415 | 7.479 | 9.503 | 7.531 |
| fGL | 3.320 | 3.067 | 6.277 | 4.784 | 5.009 | 6.530 |
| fw | 1.000 | 1.000 | 1.000 | 1.000 | 1.000 | 1.000 |

As can be clearly seen from Table 19, the zoom lenses according to the first to sixth embodiments are configured to satisfy Conditional Expressions (1) to (4).

7. Modified Example

Configuration of Imaging Apparatus

Figure 61:
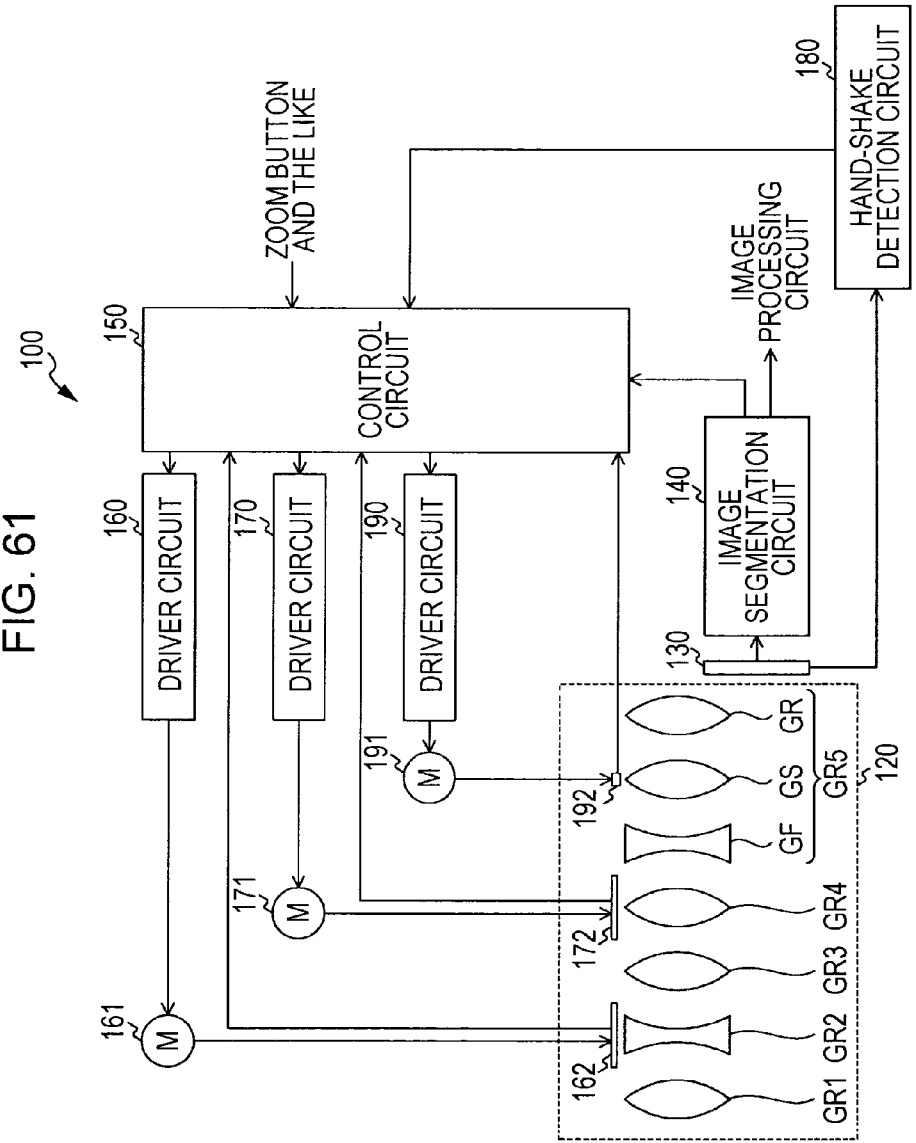
FIG. 61 is a diagram illustrating an example in which the zoom lens according to the first to sixth embodiments of the disclosure is applied to an imaging apparatus.

FIG. 61 is a diagram illustrating an example in which the zoom lens according to the first to sixth embodiments of the disclosure is applied to an imaging apparatus 100. The imaging apparatus 100 includes the zoom lens 120 according to the first to sixth embodiments, and an imaging device 130 that converts an optical image, which is formed by the zoom lens 120, into an electric signal. As the imaging device 130, a photoelectric conversion element such as CCD (Charge Coupled Device) or CMOS (Complementary Metal-Oxide Semiconductor) may be used. The zoom lens 120 is herein indicated in a way that simplifies each lens group according to the first to sixth embodiments as a single lens.

Regarding the electric signal which is generated by the imaging device 130, a signal for focus control is supplied to a control circuit 150 by an image segmentation circuit 140, and a signal for image is supplied to an image processing circuit at the subsequent stage (not shown). The signal, which is transmitted to the image processing circuit, is processed in a format appropriate for the subsequent processing, and is used in processing such as display, recording, and transmission.

The control circuit 150 receives an input of a signal of an operation such as an operation of a zoom button from the outside, and performs various kinds of processing in accordance with the operation signals. For example, when the zooming command is input through the zoom button, driving sections 161 and 171 are operated through driver circuits 160 and 170 in order to achieve the focal length state corresponding to the command, and the respective lens groups GR2 and GR4 are moved to prescribed positions. Position information pieces of the respective lens groups GR2 and GR4, which can be obtained by the respective sensor 162 and 172, are input to the control circuit 150, and are used as references when a command signal is output to the driver circuits 160 and 170. Further, the control circuit 150 checks the focus state on the basis of the signal which is transmitted from the image segmentation circuit 140, and controls the positions of the fourth lens group GR4 through the driver circuit 170 and the driving section 171 so as to attain the optimal focus state.

The imaging apparatus 100 has a hand shake correction function. For example, a hand shake detection circuit 180 detects shake of the imaging device 130 caused by the press of the shutter release button. The hand shake detection circuit 180 is embodied by, for example, a gyro sensor. When the signal transmitted from the hand shake detection circuit 180 is input to the control circuit 150, a blur correction angle for compensating image blur is calculated in the control circuit 150. On the basis of the calculated blur correction angle, the partial lens group GS of the fifth lens group GR5 operates a driving section 191 through a driver circuit 190, thereby shifting the partial lens group GS in the direction perpendicular to the optical axis. A sensor 192 detects the position of the partial lens group GS of the fifth lens group GR5, and the position information of the partial lens group GS, which can be obtained by the sensor 192, is input to the control circuit 150, and is used as a reference when the command signal is transmitted to the driver circuit 190.

Specific examples of the products, to which the imaging apparatus 100 is applicable, includes the following various applications. For example, the applications are camera sections of input/output apparatuses such as a digital still camera, a digital video camera, a mobile phone equipped with a camera, and a PDA (Personal Digital Assistant) equipped with a camera.

In addition, the embodiments of the disclosure are examples for embodying the disclosure, and as explicitly shown in the embodiments of the disclosure, the matters of the embodiments of the disclosure respectively correspond to the specific matters of the disclosure in claims. Likewise, the specific matters of the disclosure in claims respectively correspond to the matters, which are represented by the same names as the specific matters, in the embodiments of the disclosure.

The present disclosure contains subject matter related to that disclosed in Japanese Priority Patent Application JP 2010-236619 filed in the Japan Patent Office on Oct. 21, 2010, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A zoom lens that has a plurality of lens groups and performs zooming by changing spaces between the plurality of lens groups,
    wherein a final lens group positioned to be closest to an image side includes, in order from an object side to an image side,
        a first partial lens group that has a negative refractive power,
        a second partial lens group that has a positive refractive power, and
        a third partial lens group that has a positive refractive power,
    wherein image blur is corrected by shifting the second partial lens group in a direction substantially perpendicular to an optical axis, and
    wherein a focal length of the first partial lens group is fGF, a focal length of the second partial lens group is fGS, and a focal length of a whole lens system of the plurality of lens groups in a telephoto end state is ft, the following Conditional Expressions (1) and (2) are satisfied;

$$-0.24 < fGF/ft < -0.09 \quad (1)$$

$$0.12 < fGS/ft < 0.32, \quad (2)$$

wherein a focal length of the third partial lens group is fGR, and a focal length of the final lens group is fGL, the following Conditional Expression (3) is satisfied;

$$1.0 < fGR/fGL < 3.5. \quad (3)$$

2. The zoom lens according to claim 1, wherein the second partial lens group has at least one aspheric surface.

3. The zoom lens according to claim 1, wherein the first partial lens group has at least one aspheric surface.

4. The zoom lens according to claim 1, wherein the second partial lens group has at least one plastic lens.

5. The zoom lens according to claim 1, wherein a focal length of the whole lens system of the plurality of lens groups in a wide-angle end state is fw, the following Conditional Expression (4) is satisfied;

$$0.5 < fGL/(fw \cdot ft)^{1/2} < 2.5. \quad (4)$$

6. The zoom lens according to claim 1,
    wherein the plurality of lens groups include, in order from the object side to the image side, a first lens group that has a positive refractive power and remains stationary in a direction of the optical axis, a second lens group that has a negative refractive power and moves in the optical axis so as to thereby perform zooming, a third lens group that has a positive refractive power and remains stationary in the direction of the optical axis, a fourth lens group that has a positive refractive power and moves in the optical axis so as to thereby correct variation in an imaging position and correct change in the imaging position caused by change in an object distance, and a fifth lens group that serves as the final lens group having a positive refractive power and remains stationary in the direction of the optical axis.

7. An imaging apparatus comprising:

a zoom lens that has a plurality of lens groups and performs zooming by changing spaces between the plurality of lens groups; and an imaging device that converts an optical image, which is formed by the zoom lens, into an electric signal, wherein a final lens group positioned to be closest to an image side in the zoom lens includes, in order from an object side to an image side, a first partial lens group that has a negative refractive power, a second partial lens group that has a positive refractive power, and a third partial lens group that has a positive refractive power, wherein image blur is corrected by shifting the second partial lens group in a direction substantially perpendicular to an optical axis, and wherein a focal length of the first partial lens group is fGF, a focal length of the second partial lens group is fGS, and a focal length of a whole lens system of the plurality of lens groups in a telephoto end state is ft, the following Conditional Expressions (1) and (2) are satisfied:

$$-0.24 < fGF/ft < -0.09 \qquad (1)$$

$$0.12 < fGS/ft < 0.32, \qquad (2)$$

wherein a focal length of the third partial lens group is fGR, and a focal length of the final lens group is fGL, the following Conditional Expression (3) is satisfied:

$$1.0 < fGR/fGL < 3.5. \qquad (3)$$

* * * * *